US012439483B2

(12) United States Patent
Suetsugu et al.

(10) Patent No.: US 12,439,483 B2
(45) Date of Patent: Oct. 7, 2025

(54) HEAT-GENERATING PLATE

(71) Applicant: DAI NIPPON PRINTING CO., LTD., Tokyo (JP)

(72) Inventors: Hirotoshi Suetsugu, Tokyo-to (JP); Manabu Hirakawa, Tokyo-to (JP); Satoshi Goishihara, Tokyo-to (JP); Hidenori Nakamura, Tokyo-to (JP); Kazuo Matsufuji, Tokyo-to (JP); Koichi Kinoshita, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 638 days.

(21) Appl. No.: 17/329,778

(22) Filed: May 25, 2021

(65) Prior Publication Data

US 2021/0282235 A1 Sep. 9, 2021

Related U.S. Application Data

(62) Division of application No. 15/776,243, filed as application No. PCT/JP2016/084086 on Nov. 17, 2016, now abandoned.

(30) Foreign Application Priority Data

Nov. 17, 2015 (JP) .................................. 2015-224986
Dec. 4, 2015 (JP) .................................. 2015-237841

(Continued)

(51) Int. Cl.
*H05B 3/84* (2006.01)
*H05K 1/02* (2006.01)
*H02G 5/00* (2006.01)

(52) U.S. Cl.
CPC ............. *H05B 3/84* (2013.01); *H05K 1/0201* (2013.01); *H02G 5/00* (2013.01);
(Continued)

(58) Field of Classification Search
CPC ........ H05B 2203/002; H05B 2203/003; H05B 2203/004; H05B 2203/005;
(Continued)

(56) References Cited

U.S. PATENT DOCUMENTS 3,703,445 A 11/1972 Tarnopol et al.
3,729,616 A 4/1973 Gruss et al.
(Continued)

FOREIGN PATENT DOCUMENTS

CN 1056393 A 11/1991
CN 1613274 A 5/2005
(Continued)

OTHER PUBLICATIONS

English translation to JP 2011210487 (Year: 2011).*
(Continued)

*Primary Examiner* — Sang Y Paik
*Assistant Examiner* — Bonita Khlok
(74) *Attorney, Agent, or Firm* — Oliff PLC

(57) ABSTRACT

A heat-generating plate that generates heat when a voltage is applied, including a pair of glasses, a pair of bus bars to which the voltage is applied, and a heat-generating conductor that can couple between the pair of bus bars. The heat-generating conductor includes a plurality of conductive thin wires that linearly extends between the pair of bus bars and couples between the pair of bus bars. An average $W_{ave}$ of a width W of one of said conductive thin wires is within a range of the following formula(a) relative to a standard deviation $\sigma$ of distribution of the width W: $0 \leq 4\sigma/W_{ave} \leq 0.3$ (Formula(a)).

1 Claim, 49 Drawing Sheets

(30) Foreign Application Priority Data

| Dec. 7, 2015 | (JP) | 2015-238751 |
|---|---|---|
| Dec. 16, 2015 | (JP) | 2015-245413 |
| Dec. 16, 2015 | (JP) | 2015-245419 |
| Dec. 21, 2015 | (JP) | 2015-248646 |
| Jan. 8, 2016 | (JP) | 2016-002857 |

(52) U.S. Cl.
CPC .. *H05B 2203/002* (2013.01); *H05B 2203/005* (2013.01); *H05B 2203/011* (2013.01); *H05B 2203/013* (2013.01); *H05B 2203/017* (2013.01); *H05B 2203/035* (2013.01); *Y02B 30/00* (2013.01)

(58) Field of Classification Search
CPC ........ H05B 2203/007; H05B 2203/008; H05B 2203/013; H05B 2203/011; H05B 2203/014; H05B 2203/017; H05B 3/84; H05B 3/845; H05B 3/86; H05B 3/34–36; H05B 3/20–267; H05K 1/0212; H02G 5/00
USPC ........ 219/201–203, 219, 542–545; 338/306–309
See application file for complete search history.

(56) References Cited

U.S. PATENT DOCUMENTS

| 4,209,687 | A | 6/1980 | Bethge et al. |
|---|---|---|---|
| 4,844,985 | A | 7/1989 | Pharms et al. |
| 4,920,254 | A | 4/1990 | DeCamp et al. |
| 5,895,591 | A * | 4/1999 | Kojima .............. G01N 27/4067 204/426 |
| 6,011,244 | A | 1/2000 | Castle et al. |
| 6,891,517 | B2 | 5/2005 | Voeltzel |
| 7,297,902 | B2 | 11/2007 | Weiss |
| 8,759,717 | B2 | 6/2014 | Chamberlain |
| 10,397,985 | B2 | 8/2019 | Kramer et al. |
| 2002/0005398 | A1 | 1/2002 | Gillner et al. |
| 2003/0183322 | A1 | 10/2003 | Bolognese et al. |
| 2003/0196830 | A1 | 10/2003 | Koskenmaki et al. |
| 2004/0075528 | A1 | 4/2004 | Carbin et al. |
| 2004/0200821 | A1 | 10/2004 | Voeltzel |
| 2005/0167422 | A1 | 8/2005 | Kachi et al. |
| 2008/0290081 | A1 | 11/2008 | Biddell |
| 2009/0140938 | A1 | 6/2009 | Ishibashi et al. |
| 2009/0152257 | A1 | 6/2009 | Cheng et al. |
| 2009/0233121 | A1 | 9/2009 | Leconte |
| 2009/0277671 | A1 | 11/2009 | Hahn |
| 2010/0258547 | A1 | 10/2010 | Chamberlain et al. |
| 2011/0017726 | A1 | 1/2011 | Choi et al. |
| 2011/0042370 | A1 | 2/2011 | Choi et al. |
| 2011/0062146 | A1 | 3/2011 | Kuriki |
| 2011/0089160 | A1 | 4/2011 | Kuriki |
| 2012/0152930 | A1 | 6/2012 | Chamberlain |
| 2013/0175255 | A1 | 7/2013 | Kim et al. |
| 2013/0255998 | A1 | 10/2013 | Iwami et al. |
| 2013/0292373 | A1 | 11/2013 | Choi et al. |
| 2014/0083991 | A1 | 3/2014 | Choi et al. |
| 2014/0117003 | A1* | 5/2014 | Choi ...................... H01C 17/06 219/203 |
| 2016/0278166 | A1 | 9/2016 | Seong et al. |
| 2016/0311402 | A1 | 10/2016 | Suetsugu et al. |
| 2019/0159296 | A1 | 5/2019 | Suetsugu et al. |

FOREIGN PATENT DOCUMENTS

| CN | 101161219 A | 4/2008 |
|---|---|---|
| CN | 102206046 A | 10/2011 |
| DE | 10 2004 060032 A1 | 4/2006 |
| DE | 102010038079 A1 | 4/2012 |
| EP | 1605729 A2 | 12/2005 |
| EP | 1 672 960 A1 | 6/2006 |
| EP | 2 286 992 A1 | 2/2011 |
| JP | 852-047176 B2 | 11/1977 |
| JP | H08-0072674 A | 3/1996 |
| JP | H09-207718 A | 8/1997 |
| JP | 2001-217062 A | 8/2001 |
| JP | 2003-249330 A | 9/2003 |
| JP | 2004-520186 A | 7/2004 |
| JP | 2006-526944 A | 11/2006 |
| JP | 2007-237807 A | 9/2007 |
| JP | 2007237807 * | 9/2007 |
| JP | 2008-511529 A | 4/2008 |
| JP | 2009-218173 A | 9/2009 |
| JP | 2009-302035 A | 12/2009 |
| JP | 2010-003667 A | 1/2010 |
| JP | 2010-500703 A | 1/2010 |
| JP | 2010-118396 A | 5/2010 |
| JP | 2010-251230 A | 11/2010 |
| JP | 2011-066691 A | 3/2011 |
| JP | 2011-509214 A | 3/2011 |
| JP | 2011-514647 A | 5/2011 |
| JP | 2011-515809 A | 5/2011 |
| JP | 2011-210487 A | 10/2011 |
| JP | 2011-216378 A | 10/2011 |
| JP | 2011210487 * | 10/2011 |
| JP | 2012-014945 A | 1/2012 |
| JP | 2012-014956 A | 1/2012 |
| JP | 2012-023296 A | 2/2012 |
| JP | 2012-151116 A | 8/2012 |
| JP | 2012-178556 A | 9/2012 |
| JP | 2013-056811 A | 3/2013 |
| JP | 2013-516043 A | 5/2013 |
| JP | 2013-173402 A | 9/2013 |
| JP | 2013-238029 A | 11/2013 |
| JP | 2014-203664 A | 10/2014 |
| JP | 2015-131633 A | 7/2015 |
| KR | 10-2011-0109817 A | 10/2011 |
| RU | 2069455 * | 6/2009 |
| WO | 2007/083038 A2 | 7/2007 |
| WO | 2014/065383 A1 | 5/2014 |
| WO | 2014/117479 A1 | 8/2014 |
| WO | 2015/080482 A1 | 6/2015 |

OTHER PUBLICATIONS

English translation to JP 2007237807 (Year: 2007).*
English translation to RU 2069455 (Year: 2009).*
Mar. 31, 2022 Extended Search Report issued in European Patent Application No. 21197360.7.
May 10, 2023 Office Action Issued In U.S. Appl. No. 17/330,157.
May 23, 2023 Office Action Issued in U.S. Appl. No. 17/330,084.
Feb. 7, 2017 Search Report issued in International Patent Application No. PCT/JP2016/084086.
Feb. 23, 2016 Search Report issued in International Patent Application No. PCT/JP2015/082303.
Jul. 12, 2016 Office Action issued in Japanese Patent Application No. 2015-235194.
Aug. 23, 2016 Office Action issued in Japanese Patent Application No. 2015-235194.
Oct. 11, 2016 Office Action issued in Japanese Patent Application No. 2015-235194.
May 9, 2017 Office Action issued in Japanese Patent Application No. 2015-235194.
Sep. 29, 2017 Office Action issued in Japanese Patent Application No. 2015-235194.
Jun. 1, 2017 International Preliminary Report on Patentability issued in International Patent Application No. PCT/JP2015/082303.
May 22, 2018 International Preliminary Report on Patentability issued in International Patent Application No. PCT/JP2016/084086.
Jun. 18, 2018 Extended Search Report issued in European Patent Application No. 15861944.5.
Apr. 2, 2019 Office Action issued in Japanese Patent Application No. 2015-224879.
Apr. 2, 2019 Office Action issued in Japanese Patent Application No. 2015-224918.

(56) References Cited

OTHER PUBLICATIONS

Apr. 12, 2019 Office Action issued in Japanese Patent Application No. 2016-235135.
Jun. 3, 2019 Partial Supplementary Search Report issued in European Patent Application No. 16866382.1.
Sep. 6, 2019 Office Action issued in Japanese Patent Application No. 2015-245413.
Sep. 24, 2019 Office Action issued in Japanese Patent Application No. 2016-012549.
Oct. 2, 2019 Extended Search Report issued in European Patent Application No. 16866382.1.
Oct. 29, 2019 Office Action issued in Japanese Patent Application No. 2015-224879.
Oct. 29, 2019 Office Action issued in Japanese Patent Application No. 2015-224918.
Nov. 22, 2019 Office Action issued in Japanese Patent Application No. 2017-027863.
Dec. 6, 2019 Office Action issued in Japanese Patent Application No. 2016-002857.
Sep. 3, 2019 Office Action issued in Japanese Patent Application No. 2015-224986.
Feb. 13, 2020 Extended Search Report issued in European Patent Application No. 20151003.9.
Apr. 24, 2020 Office Action issued in Japanese Patent Application No. 2016-012549.
Apr. 28, 2020 Office Action issued in Japanese Patent Application No. 2015-224986.
Jun. 2, 2020 Office Action issued Japanese Patent Application No. 2016-002857.
Jun. 9, 2020 Decision of Rejection issued in Japanese Patent Application No. 2015-224918.
Jun. 9, 2020 Decision of Dismissal of Amendment issued in Japanese Patent Application No. 2015-224918.
Jul. 7, 2020 Office Action issued in Japanese Patent Application No. 2015-224879.
Sep. 1, 2020 Office Action issued in Chinese Patent Application No. 201680066949.9.
Sep. 18, 2020 Office Action issued in Japanese Patent Application No. 2015-224879.
Nov. 6, 2020 Office Action issued in Japanese Patent Application No. 2016-238722.
Nov. 6, 2020 Office Action issued in Japanese Patent Application No. 2016-238758.
Feb. 12, 2021 Office Action issued in Japanese Patent Application No. 2016-238722.
Feb. 12, 2021 Office Action issued in Japanese Patent Application No. 2016-238758.
Mar. 30, 2021 Office Action issued in Chinese Patent Application No. 201680066949.9.
Jan. 18, 2022 Extended Search Report issued in European Patent Application No. 21200990.6.
Jan. 27, 2023 Office Action issued in Canadian Patent Application No. 3,006,179.
Dec. 22, 2022 Office Action issued in U.S. Appl. No. 17/653,479.
Dec. 10, 2021 Office Action issued in European Patent Application No. 21197360.7.
Jun. 9, 2023 Office Action issued in U.S. Appl. No. 17/329,261.
Apr. 12, 2023 Office Action issued in U.S. Appl. No. 17/653,677.
Jul. 26, 2021 Office Action issued in Chinese Patent Application No. 201680066949.9.
May 28, 2021 Advisory Action issued in U.S. Appl. No. 15/776,243.
Oct. 13, 2023 U.S. Office Action issued U.S. Appl. No. 17/330,157.
Oct. 13, 2023 Office Action issued in U.S. Appl. No. 17/330,084.
Oct. 13, 2023 Office Action issued in U.S. Appl. No. 17/329,261.
Nov. 9, 2023 Office Action issued in U.S. Appl. No. 17/653,677.
Nov. 2, 2023 Office Action issued in European Application No. 21 200 990.6.
Jun. 20, 2023 Office Action issued in U.S. Appl. No. 17/653,479.
Dec. 15, 2023 Office Action issued in Canadian Patent Application No. 3,006,179.

* cited by examiner

HEAT-GENERATING PLATE

CROSS-REFERENCE TO RELATED APPLICATION

This is a Divisional of application Ser. No. 15/776,243 filed May 15, 2018, which in turn is a National Stage Application of PCT/JP2016/084086 filed Nov. 17, 2016, which claims the benefit of Japanese Patent Application No. 2015-224986 filed Nov. 17, 2015, Japanese Patent Application No. 2015-237841 filed Dec. 4, 2015, Japanese Patent Application No. 2015-238751 filed Dec. 7, 2015, Japanese Patent Application No. 2015-245413 filed Dec. 16, 2015, Japanese Patent Application No. 2015-245419 filed Dec. 16, 2015, Japanese Patent Application No. 2015-248646 filed Dec. 21, 2015, and Japanese Patent Application No. 2016-002857 filed Jan. 8, 2016. The disclosure of the prior applications are hereby incorporated by reference herein in its entirety.

TECHNICAL FIELD

One aspect of the present invention relates to a heating electrode device including a heat-generating conducting body that is energized to generate heat by Joule heat and an electrical heating glass using the same.

Another aspect of the present invention relates to a heat-generating plate having a heat-generating conductor, and a vehicle and a window for a building including such a heat-generating plate.

Still another aspect of the present invention relates to a sheet with a conductor having a heat-generating conductor, a heat-generating plate, and a vehicle and a window for a building including such a heat-generating plate.

Yet another aspect of the present invention relates to a conductive heat-generating body, a laminated glass, and a manufacturing method for a conductive heat-generating body.

Still yet another aspect of the present invention relates to a heat-generating plate, a conductive pattern sheet, and a vehicle and a window for a building including the heat-generating plate.

BACKGROUND ART

Conventionally, as disclosed in JP H08-72674 A, JP H09-207718 A, and JP 2013-56811 A, there is a technique for heating a glass window for a vehicle such as an automobile, a railway, an aircraft, and a ship and a glass window for a building by energization to eliminate freezing and fogging of the glass window. Such a glass window includes a heating electrode device between two glass plates. The heating electrode device includes a pair of bus bar electrodes arranged separated from each other and a plurality linear heat-generating conducting bodies arranged to connect the pair of bus bar electrodes, and the heat-generating conducting body can be energized by connecting the pair of bus bar electrodes to a power supply, and the heat-generating conducting body is heated so as to heat the glass window.

As a heater and a defroster, a heat-generating plate including the heat-generating conductor is used. For example, a vehicle using a transparent heat-generating plate for a front window (windshield) or a rear window has been known, and by heating the heat-generating conductor, excellent visibility can be secured by preventing frost, ice, and dew condensation on the vehicle window.

For example, JP 2013-173402 A discloses an anti-fog window for a vehicle in which an electric heater provided between transparent substrates heats the entire window. In addition, JP H08-72674 A discloses an electric heating window glass that melts ice, frost, and prevents fog by heating a resistance heating line provided between two plate glasses.

Conventionally, a heat-generating plate which generates heat when a voltage is applied has been known. As a representative application example, a transparent heat-generating plate is used as a defroster device or a heater. The heat-generating plate as a defroster device is used for a window glass such as a front window (windshield) of a vehicle or a rear window. For example, in JP H08-72674 A and JP 2013-173402 A, a heat-generating plate having a visually transmitting performance is used as a window glass. The heat-generating plate includes heat-generating conductors formed of tungsten lines and the like arranged across the entire heat-generating plate. In the heat-generating plate, by energizing the heat-generating conductor, the heat-generating conductor is heated by resistance heating. An increase in the temperature of a window glass including the heat-generating plate removes fogging of the window glass or melts snow or ice attached on the window glass, and a visually transmitting performance through the window glass can be secured.

Conventionally, a window glass in which the conductive heat-generating body including a heating wire is incorporated has been known as a defroster device used for a window glass such as a front window or a rear window of a vehicle. In such a defroster device, the conductive heat-generating body incorporated in the window glass is energized to increase the temperature of the window glass by resistance heating, and fogging of the window glass is removed, and snow or ice attached on the window glass is melted, and passenger's visibility can be secured.

As a material of the conductive heat-generating body, various materials have been conventionally used. However, there is a problem in that light beams diffracted by the conductive heat-generating body interfere with each other and cause a beam of light if the conductive heat-generating bodies are regularly arranged in the window glass. A beam of light is a phenomenon in which streaky light is visually recognized.

Furthermore, if the conductive heat-generating body is linearly extended, external light entering the conductive heat-generating body is reflected in the substantially same direction, and human eyes positioned in this direction feel strong flicker (glare).

JP 2011-210487 A discloses that the conductive heat-generating body is formed as a wavy path and each of a plurality of wavy lines forming each wavy path is irregularly formed for each half period to prevent flicker.

Conventionally, as a defroster device used for a window glass such as a front window or a rear window of a vehicle, a window glass having heating wires formed of tungsten lines and the like are arranged in the entire window glass has been known. In the related art, the heating wires arranged in the entire window glass are energized to increase the temperature of the window glass by resistance heating, and fogging on the window glass is removed or snow or ice attached on the window glass is melted, and the passenger's visibility can be secured.

Recently, a defroster device in which a conductive pattern is produced by using photolithography technique instead of the heating wires formed of tungsten lines and the like and the conductive pattern is energized to increase the temperature of the window glass by resistance heating has been known (refer to JP 2011-216378 A and JP 2012-151116 A). This method has an advantage such that a conductive pattern with a complicated shape can be easily formed. In JP 2011-216378 A and JP 2012-151116 A, for example, a conductive pattern having an irregular shape obtained from the Voronoi diagram generated from sites specifically and randomly distributed in a planer surface is formed and used as a heating wire for increasing the temperature of the window glass.

SUMMARY OF INVENTION

Technical Problem

As disclosed in JP H08-72674 A, JP H09-207718 A, and JP 2013-56811 A, the conventional heat-generating conducting body has been often formed by using a tungsten wire having a circular cross section.

Here, since the tungsten wire has a circular cross section, it is necessary to increase a wire diameter when increasing a cross sectional area to improve a heat generation performance (high output). In a case of the circular cross section, the cross sectional area is not maximized (conversely, minimized) relative to the diameter (corresponding to cross sectional area for interfering field of view).

As described above, conventionally, there has been a problem in that it is necessary to increase the diameter of the circular cross section to increase the cross sectional area of the heat-generating conducting body and the heat-generating conducting body is visually recognized due to an increase in the width of the heat-generating conducting body. As a result, it is difficult to achieve both of invisibility of the heat-generating conducting body and improvement of a heat generation performance.

Accordingly, a first object of the present invention is to provide a heating electrode device that efficiently increases a cross sectional area while preventing an increase in a width of a heat-generating conducting body and is hardly visually recognized even with a high output. Furthermore, an electrical heating glass having the heating electrode device is provided.

As disclosed in JP H08-72674 A, JP H09-207718 A, and JP 2013-56811 A, the heat-generating conducting body has been conventionally formed in a wavy form. This is to prevent a beam of light caused by a pattern of the heat-generating conducting bodies periodically arranged at predetermined intervals.

However, the heat-generating conducting body is formed in a wavy form, a heating value is reduced in comparison with a case where the heat-generating conducting body is linearly formed, and removal frost and fogging takes longer time.

Accordingly, a second object of the present invention is to provide a heating electrode device that can reduce a time to remove frost and fogging while preventing a beam of light. Furthermore, an electrical heating glass having the heating electrode device is provided.

In the heat-generating plate suitable for a heater and a defroster, thin linear heat-generating conductors (referred to as "conductive thin wire" below) are regularly arranged between plates. For example, in an anti-fog window for a vehicle disclosed in JP 2013-173402 A, a plurality of wavy conductive wires is printed and formed in the same arrangement pattern. In addition, in an electric heating window glass disclosed in JP H08-72674 A, a plurality of resistance heating lines having a sinusoidal shape is arranged in parallel.

When light emitted from a light source such as illumination (in particular, point light source) is viewed through a transparent heat-generating plate including a large number of conductive thin wires, a so-called "beam of light" occurs that is emitted, around the light source, to be observed as light extending in an elongated radial shape from the light source toward the surroundings. The beam of light affects the visibility. For example, when a beam of light occurs in light observed by a driver through a vehicle window, the beam of light may interfere the driver's visibility. Therefore, from the viewpoint of securing excellent visibility, it is preferable to prevent the occurrence of the beam of light as possible.

As a result of intensive research, the inventors of the present invention have found that a beam of light can occur due to diffraction of light by the heat-generating conductor (conductive thin wire) and newly found that occurrence of a beam of light can be effectively avoided by preventing visual recognition of diffraction light caused by the heat-generating conductor.

Furthermore, as a result of further research, the inventors of the present invention have acquired knowledges such that it is difficult to secure excellent visibility while preventing occurrence of a beam of light and preventing glare that may impair the field of view. Particularly, in a case where the heat-generating plate is used for a window, since the heat-generating conductor naturally exists in the field of view, it is very difficult to achieve both to secure clear visibility and to prevent dazzle and blur that may cause eyestrain at a high level.

The present invention has been made in consideration of above circumstances, and a third object of the present invention is to provide a heat-generating plate that can secure excellent visibility while preventing occurrence of a beam of light and a vehicle and a window for a building including the heat-generating plate.

In the conventional heat-generating plate, the conductive thin wire of the heat-generating conductor linearly extends to couple the pair of bus bars. In such a heat-generating plate, a portion where heat cannot be generated due to disconnection of the heat-generating conductor is made, and uneven heat generation is caused. As a result of intensive research by the inventors of the present invention, it has found that ease to disconnect the conductive thin wire of the heat-generating conductor depends on the width of the conductive thin wire. When the conductive thin wire is arranged in a curved shape, particularly in a portion where a curvature is large, a portion with a narrow line width is easily disconnected by etching in a manufacturing process.

It is considered to thicken the line width of the conductive thin wire to prevent the disconnection. However, when the line width is thicker, the conductive thin wire is visually recognized in an appearance of the heat-generating plate, and visibility and design are deteriorated. Therefore, it is necessary to form the conductive thin wire with the line width with which disconnection hardly occurs and the conductive thin wire is not visually recognized. The present invention has been made in consideration of above points, and a fourth object of the present invention is to provide a heat-generating plate with which disconnection of the conductive thin wire of the heat-generating conductor hardly occurs and the conductive thin wire is not visually recognized.

In the conventional heat-generating plate, the conductive thin wire of the heat-generating conductor linearly extends to couple the pair of bus bars. In such a heat-generating plate, a portion where heat cannot be generated due to disconnection of the heat-generating conductor is made, and uneven heat generation is caused. Therefore, it has been considered to connect between linearly extending conductive thin wires so as to maintain electric connection even when disconnection occurs. As the easiest method, to connect between the linearly extending conductive thin wires with a linear bridge is considered. However, in this case, an orientation direction of the bridge is conspicuous when an entire heat-generating plate is observed, and streaky light referred to as a beam of light occurs. Therefore, visibility through the heat-generating plate is deteriorated.

The present invention has been made in consideration of above points, and a fifth object is to provide a heat-generating plate that does not easily cause uneven heat generation even when the heat-generating conductor is disconnected and does not deteriorate visibility.

Furthermore, with a conductive film having a wavy path disclosed in JP 2011-210487 A, glare may be certainly reduced. However, since the shapes of the wavy paths are irregularly formed, there are a portion with a high temperature and a portion with a low temperature, and uneven heat may be caused. Therefore, for example, when the conductive film disclosed in JP 2011-210487 A is incorporated in a window glass of a vehicle, a place where fogging is removed and a place where fogging is not removed, or a place where snow or ice is melted or a place where snow or ice is not melted are made in the window glass, and there is a possibility that passenger's visibility cannot be satisfactorily secured.

The present invention has been made to solve the above problems, and a sixth object of the present invention is to provide a conductive heat-generating body and a laminated glass capable of preventing uneven heat while preventing a beam of light and flicker and a manufacturing method therefor.

FIG. 92 illustrates a partially enlarged conductive pattern 840 in a conventional defroster device disclosed in JP 2011-216378 A and JP 2012-151116 A. In the conventional defroster device, the conductive pattern 840 includes a plurality of connection elements 844 extending between two branch points 842 and defining an opening region 843, and each connection element 844 is formed of a single straight line segment. As a result of intensive research on the defroster device including such a connection element 844 by the inventors of the present invention, it has been found that an observer (for example, passenger such as driver) can visually recognize the conductive pattern 840 including the connection elements 844 depending on the shape of each connection element 844 formed of a single straight line segment. When light such as external light entering the defroster device enters a side surface formed by a flat surface of the connection element 844, the light that has entered each position on the side surface is reflected by the side surface in a substantially constant direction. Then, the reflected light is visually recognized by the observer so that the conductive pattern 840 including the connection elements 844 is visually recognized by the observer. The visual recognition of the conductive pattern 840 including the connection elements 844 by the observer such as a driver deteriorates visibility of the observer through the window glass.

The present invention has been made in consideration of these points, and a seventh object of the present invention is to improve invisibility of a conductive pattern of a defroster device.

Solution to Problem

The present invention will be described below. Here, for easy understanding, reference numerals in the drawings are attached. However, the present invention is not limited to this.

[First Invention]

One aspect of the present invention is a heating electrode device, for energizing and heating glass, that includes a plurality of heat-generating conducting bodies configured to extend as having a rectangular cross section and arranged in a direction different from the extending direction, in which regarding the heat-generating conducting body, when it is assumed that a thickness which is a size in a direction perpendicular to an arrangement direction of a cross section perpendicular to the extending direction be H and a size of a larger side of sides parallel to the arrangement direction be $W_B$, $H/W_B > 1.0$ is satisfied, and the problems are solved by the heating electrode device.

Another aspect of the present invention is the heating electrode device in which, in the cross section of the heat-generating conducting body perpendicular to the extending direction, when it is assumed that a size of an opposite side from the side having the size of $W_B$ be $W_T$, $W_B > W_T$, $3 \ \mu m \leq W_B \leq 15 \ \mu m$, and $1 \ \mu m \leq W_T \leq 12 \ \mu m$ are satisfied.

Still another aspect of the present invention is any one of the heating electrode devices that includes a transparent base material layer and in which the heat-generating conducting body is arranged on one surface of the base material layer, and one surface of the heat-generating conducting body has contact with the surface of the base material layer.

Still another aspect of the present invention is an electrical heating glass including a transparent first panel, a transparent second panel arranged as having a gap with the first panel, and any one of the heating electrode devices arranged in the gap between the first panel and the second panel.

According to each aspect of the present invention, in the heating electrode device and the electrical heating glass using the same, the cross sectional area is efficiently increased while preventing an increase in a width of the heat-generating conducting body, and the heat-generating conducting body can be hardly visually recognized while obtaining a high output. The function can be enhanced.

[Second Invention]

Another aspect of the present invention is a heating electrode device for energizing and heating glass that includes a plurality of linear heat-generating conducting bodies and in which, regarding the heat-generating conducting body, when it is assumed that a distance between both ends be D (mm) and a length along the heat-generating conducting body between both ends be L (mm), $1.02 \cdot D \leq L < 1.50 \cdot D$ is satisfied, and the heating electrode device solves the above problems.

Still another aspect of the present invention is the heating electrode device in which when it is assumed that a pitch of the plurality of heat-generating conducting bodies be P (mm), a surface area of one surface of the heat-generating conducting body in a thickness direction per length of 0.01 m in a plan view be $S_B$ ($\mu m^2$), and a surface area of the other surface per length of 0.01 m in a plan view be $S_T$ (µm²), 0.5 mm≤P≤5.00 mm and 0 µm²<$S_B$−$S_T$≤30000 µm² are satisfied.

Yet another aspect of the present invention is the heating electrode device in which, in the cross section perpendicular to the extending direction of the heat-generating conducting body, when it is assumed that a length of a side on the side of $S_B$(µm²) be $W_B$ (µm), and a length of a side on the side of $S_T$(µm²) be $W_T$ (µm), $W_B$>$W_T$, 3 µm≤$W_B$≤15 µm, and 1 µm≤$W_T$≤12 µm are satisfied.

Still yet another aspect of the present invention is any one of the heating electrode devices that includes a transparent base material layer and in which the heat-generating conducting body is arranged on one surface of the base material layer, and one surface of the heat-generating conducting body has contact with the surface of the base material layer.

Still another aspect of the present invention is an electrical heating glass including a transparent first panel, a transparent second panel arranged as having a gap with the first panel, and any one of the heating electrode devices arranged in the gap between the first panel and the second panel.

According to each aspect of the present invention, in the heating electrode device and the electrical heating glass using the same, a heating value can be satisfactorily secured while preventing a beam of light, and fogging and frost can be smoothly eliminated.

[Third Invention]

Another aspect of the present invention relates to a heat-generating plate that includes a supporting base material, a pair of bus bars to which a voltage is applied, and a heat-generating conductor supported by the supporting base material and connected to the pair of bus bars, in which the heat-generating conductor includes a conductive main thin wire that extends between the pair of bus bars and includes a first large curvature portion having a relatively large curvature and a first small curvature portion having a relatively small curvature, and an inclination of a cross sectional area of the first large curvature portion of the conductive main thin wire is larger than an inclination of the cross sectional area of the first small curvature portion.

According to the present aspect, even when the heat-generating conductor includes the conductive main thin wire, both of prevention of occurrence of a beam of light and antiglare can be achieved at a high level.

It is preferable that the cross sectional area of the conductive main thin wire be divided by a lower bottom having contact with the supporting base material, an upper bottom arranged at a position facing to the lower bottom, a first inclined portion extending between an end of the lower bottom and an end of the upper bottom, and a second inclined portion extending between the other end of the lower bottom and the other end of the upper bottom, and an inclination of the cross sectional area be expressed by each of an inclination of a straight line passing through the end of the lower bottom and the end of the upper bottom, and an inclination of a straight line passing through the other end of the lower bottom and the other end of the upper bottom.

According to the present aspect, the inclination of the cross sectional area of the conductive main thin wire is appropriately expressed.

A sum of projection sizes of the first inclined portion and the second inclined portion of the cross sectional area of the first small curvature portion on the supporting base material may be larger than a sum of projection sizes of the first inclined portion and the second inclined portion of the cross sectional area of the first large curvature portion on the supporting base material.

According to the present aspect, the sizes of the first inclined portion and the second inclined portion in the conductive main thin wire which easily contribute to generate glare by light reflection can be changed between the first large curvature portion and the first small curvature portion, and it is possible to prevent the glare from being emphasized by light reflection.

Projection of the cross sectional area of the first small curvature portion on the supporting base material may be larger than projection of the cross sectional area of the first large curvature portion on the supporting base material.

According to the present aspect, the size of the portion in the conductive main thin wire that can contribute to the reflection of light can be changed between the first large curvature portion and the first small curvature portion, and it is possible to prevent the glare such as dazzle and blur from being emphasized by light reflection.

A gap between the upper bottom and the lower bottom of the cross sectional area of the first small curvature portion may be equal to a gap between the upper bottom and the lower bottom of the cross sectional area of the first large curvature portion.

According to the present aspect, good workability of the heat-generating conductor is secured, and the first large curvature portion and the first small curvature portion can be easily formed.

The plurality of conductive main thin wires is provided, and the heat-generating conductor may further include a conductive sub thin wire for coupling the conductive main thin wires arranged adjacent to each other in at least a part of the plurality of conductive main thin wires.

According to the present aspect, since the conductive main thin wires are connected to each other with the conductive sub thin wire, even when a part of the conductive main thin wire is disconnected, electric power can be supplied from the other conductive main thin wire to the disconnected conductive main thin wire via the conductive sub thin wire. Therefore, uneven heat generation can be effectively reduced.

The conductive sub thin wire may include a second large curvature portion having a relatively large curvature and a second small curvature portion having a relatively small curvature.

According to the present aspect, the conductive sub thin wire is arranged in a curved shape, and a visible beam of light which can be effectively prevented.

The heat-generating plate may further include a covering member for covering the heat-generating conductor, and the heat-generating conductor may be arranged between the supporting base material and the covering member.

According to the present aspect, it is possible to provide the heat-generating plate in which the heat-generating conductor is arranged between the supporting base material and the covering member, and the heat-generating plate can be easily applied to various windows.

Another aspect of the present invention relates to a vehicle including the heat-generating plate.

Another aspect of the present invention relates to a window for a building including the heat-generating plate.

According to each aspect of the present invention, since the inclination of the cross sectional area of the "first large curvature portion having a relatively large curvature" of the cross sectional area of the conductive main thin wire of the heat-generating conductor is larger than the inclination of the cross sectional area of the "first small curvature portion having a relatively small curvature", both of prevention of occurrence of a beam of light and antiglare can be achieved at a high level.

[Fourth Invention]

A heat-generating plate according to another aspect of the present invention, which generates heat when a voltage is applied, includes a pair of glasses, a pair of bus bars to which a voltage is applied, and a heat-generating conductor that couples between the pair of bus bars, in which the heat-generating conductor includes a plurality of conductive thin wires that linearly extends between the pair of bus bars and couples between the pair of bus bars, and an average $W_{ave}$ of a width W of the conductive thin wire is within a range of the following formula (a) relative to a standard deviation σ of distribution of the width W.

$$0 \leq 4\sigma/W_{ave} \leq 0.3 \quad \text{Formula(a)}$$

In the heat-generating plate according to another aspect of the present invention, the conductive thin wire includes a large curvature portion having a relatively large curvature and a small curvature portion having a relatively small curvature, and the width W of the conductive thin wire may be thin in the large curvature portion and may be thick in the small curvature portion.

A vehicle according to another aspect of the present invention includes any one of the heat-generating plates according to the present invention.

A window for a building according to another aspect of the present invention includes any one of the heat-generating plates according to the present invention.

According to each aspect of the present invention, the conductive thin wire of the heat-generating conductor of the heat-generating plate can be hardly disconnected.

[Fifth Invention]

A heat-generating plate according to another aspect of the present invention is a heat-generating plate, which generates heat when a voltage is applied, includes a pair of glasses, a pair of bus bars to which a voltage is applied, and a heat-generating conductor that couples between the pair of bus bars, in which the heat-generating conductor includes a plurality of conductive thin wires that linearly extends between the pair of bus bars and couples between the pair of bus bars and a coupling conductive thin wire for coupling between two adjacent main conductive thin wires, and each coupling conductive thin wire has three or more different patterns.

In the heat-generating plate according to another aspect of the present invention, the pattern of the coupling conductive thin wire may be a straight line, a circular arc, or a combination of a straight line and a circular arc.

In the heat-generating plate according to another aspect of the present invention, each coupling conductive thin wire may have a pattern different from those of all the other coupling conductive thin wires.

A vehicle according to another aspect of the present invention includes any one of the heat-generating plates according to the present invention.

A window for a building according to another aspect of the present invention includes any one of the heat-generating plates according to the present invention.

A sheet with a conductor according to another aspect of the present invention is a sheet with a conductor, which is used for a heat-generating plate that generates heat when a voltage is applied, includes a base film, a pair of bus bars to which a voltage is applied, and a heat-generating conductor that couples between the pair of bus bars, in which the heat-generating conductor includes a plurality of conductive thin wires that linearly extends between the pair of bus bars and couples between the pair of bus bars and a coupling conductive thin wire for coupling between two adjacent main conductive thin wires, and each coupling conductive thin wire has three or more different patterns.

According to each aspect of the present invention, even when the heat-generating conductor of the heat-generating plate is disconnected, uneven heat generation hardly occurs, and it is possible to prevent deterioration in visibility.

[Sixth Invention]

To solve the above problems, in another aspect of the present invention, a conductive heat-generating body is provided which includes a plurality of curved heat-generating bodies arranged separated from each other in a first direction and extending in a second direction intersecting with the first direction, in which a ratio of an entire length of each of the plurality of curved heat-generating bodies in the second direction divided by a shortest distance between both ends of each of the plurality of curved heat-generating bodies is larger than 1.0 and equal to or less than 1.5.

Each of the plurality of curved heat-generating bodies may be formed by connecting a plurality of periodic curved lines having irregular periods and amplitudes for each period along the second direction.

End positions of ends of the plurality of curved heat-generating bodies in the second direction may be irregular.

A bypass heat-generating body that connects the two adjacent curved heat-generating bodies in the first direction may be included.

Connection positions of the bypass heat-generating body may be irregular for each of the plurality of curved heat-generating bodies.

A plurality of heat-generating body rows of which some of heat-generating body rows are aligned in each of the first direction and the second direction may be included, each of the plurality of heat-generating body rows may include the plurality of curved heat-generating bodies, and the corresponding curved heat-generating bodies in two heat-generating body rows arranged adjacent to each other in the second direction may be connected to each other.

A shortest distance between both ends of each of the plurality of curved heat-generating bodies included in each of the plurality of heat-generating body rows may be equal to or more than 50 mm.

A pair of bus bar electrodes arranged separated from each other in the second direction and extending in the first direction and a plurality of wavy line heat-generating bodies arranged separated from each other in the first direction and extending in the second direction to be connected to the pair of bus bar electrodes may be included, and the plurality of wavy line heat-generating bodies may be formed by connecting the plurality of curved heat-generating bodies included in each of the plurality of heat-generating body rows in the second direction.

A transparent base material layer in which the plurality of curved heat-generating bodies is arranged on one principal surface may be included.

A laminated glass may be used which includes a pair of glass substrates arranged to face to each other so as to sandwich the conductive heat-generating body.

In another aspect of the present invention, a manufacturing method for a conductive heat-generating body is provided that includes a step for generating a single curved heat-generating body by connecting a plurality of periodic curved lines having periods and amplitudes that are irregular for each period along a second direction intersecting with a first direction, a step for performing normalization processing for adjusting the periods of the plurality of periodic curved lines included in the curved heat-generating body so that a shortest distance is a first limited value in a case where the shortest distance between both ends of the curved heat-generating body exceeds the first limited value, a step for generating the single curved heat-generating body again when it is determined whether a ratio obtained by dividing an entire length of the normalized curved heat-generating body in the second direction by the first limited value is within a range larger than 1.0 and equal to or less than 1.5 and it is determined that the ratio is not within the range, a step for generating the plurality of curved heat-generating bodies arranged separated from each other in the first direction by repeating generation of the single curved heat-generating body and the normalization processing in a position with a predetermined interval from the normalized curved heat-generating body when it is determined that the ratio is within the range, a step for adjusting a phase to make the phases of the plurality of curved heat-generating bodies in the second direction be irregular and generating a heat-generating body row including the plurality of curved heat-generating bodies of which a phase has been adjusted, and a step for forming a pair of bus bar electrodes arranged separated from each other in the second direction on a transparent base material and extending along the first direction and arranging the plurality of heat-generating body rows in the first direction and the second direction between the pair of bus bar electrodes to form a plurality of wavy line conductors connected to the pair of bus bar electrodes and arranged separated from each other in the first direction.

According to each aspect of the present invention, uneven heat can be prevented while preventing a beam of light and flicker.

[Seventh Invention]

A heat-generating plate according to another aspect of the present invention includes a pair of glass plates, a conductive pattern arranged between the pair of glass plates and defining a plurality of opening regions, and a bonding layer arranged between the conductive pattern and at least one of the pair of glass plates, in which the conductive pattern includes a plurality of connection elements for extending between two branch points and defining the opening region, and the connection elements for connecting the two branch points as a straight line segment are less than 20% of the plurality of connection elements.

In the heat-generating plate according to the aspect of the present invention, an average distance between median points of the two adjacent opening regions may be equal to or more than 50 μm.

In the heat-generating plate according to the aspect of the present invention, the thickness of the conductive pattern may be equal to or more than 2 μm.

In the heat-generating plate according to the aspect of the present invention, an average of a ratio ($L_1/L_2$) of a length $L_1$ of each opening region along the first direction relative to a length $L_2$ of the opening region along the second direction perpendicular to the first direction may be equal to or more than 1.3 and equal to or less than 1.8.

A conductive pattern sheet according to another aspect of the present invention includes a base material and a conductive pattern provided on the base material and defining a plurality of opening regions, in which the conductive pattern includes a plurality of connection elements extending between two branch points and defining the opening region, and the connection elements for connecting the two branch points as a straight line segment are less than 20% of the plurality of connection elements.

A vehicle according to another aspect of the present invention includes the heat-generating plate described above.

A window for a building according to another aspect of the present invention includes the heat-generating plate described above.

According to each aspect of the present invention, invisibility of the conductive pattern of the defroster device can be improved.

DESCRIPTION OF EMBODIMENTS

Figure 1A:
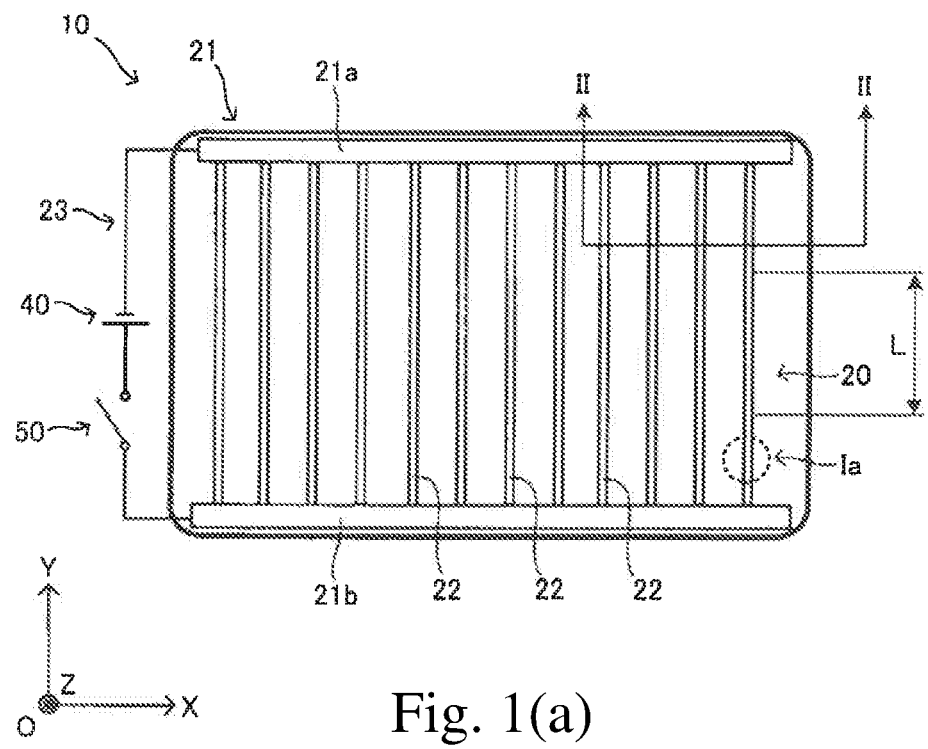
FIG. 1(a) is a plan view for explaining an electrical heating glass according to one embodiment.

The actions and advantages of the present invention described above will be clarified from the following embodiments. The present invention will be described based on the forms illustrated in the drawings. However, the present invention is not limited to these embodiments. It should be noted that the size and the shape of each member in the drawings may be exaggerated or deformed for easy understanding.

First Embodiment

FIG. 1(*a*) is a view for explaining one embodiment and is a conceptual view of an electrical heating glass 10 in a plan view. FIG. 1(*b*) is an enlarged view of a portion indicated by Ia in FIG. 1(*a*), and an enlarged view of a heat-generating conducting body 22L which is an example of a heat-generating conducting body 22 is illustrated. FIG. 1(*c*) is an enlarged view of a portion indicated by Ia in FIG. 1(*a*), and an enlarged view of a heat-generating conducting body 22M which is another example of the heat-generating conducting body 22 is illustrated. FIG. 2 is a cross-sectional view taken along a line II-II illustrated in FIG. 1 and is a view for explaining a layer structure along a thickness direction of the electrical heating glass 10. Such an electrical heating glass 10 is, for example, included in an automobile as a windshield of an automobile. In addition, the electrical heating glass 10 can be used as a window in a place having a so-called glass window, for example, a window of a vehicle such as a train, an aircraft, and a ship, including the automobile, and a window of a building.

As can be found from FIGS. 1 and 2, the electrical heating glass 10 has a plate-like shape as a whole, and a plurality of layers is laminated along the thickness direction (Z-axis direction in FIGS. 1 and 2). More specifically, as illustrated in the cross-sectional view in FIG. 2, the electrical heating glass 10 according to the present embodiment includes a first panel 11, an adhesive layer 12, a heating electrode device 20, an adhesive layer 14, and a second panel 15. Each component will be described below.

The first panel 11 and the second panel 15 are plate-like members having translucency, that is, transparent plate-like members and are arranged substantially in parallel to each other with an interval between plate surfaces arranged to face to each other. The electrical heating glass 10 has a so-called double panel structure. Here, the plate surface indicates two planes that are parallel to the XY plane and face to each other among the surfaces of the first panel 11 and the second panel 15 in FIG. 2. A base material layer 24 and the heating electrode device 20 are partially arranged between the first panel 11 and the second panel 15, and the base material layer 24 and the heating electrode device 20 are integrated with the adhesive layers 12 and 14. The first panel 11 and the second panel 15 can be formed of a plate glass. For these panels, the same plate glass can be used as that used for a window normally provided in a facility (for example, vehicle and building) to which the electrical heating glass 10 is applied. For example, sheet glass, float plate glass, reinforced plate glass, partial plate glass, and the like made of soda-lime glass (blue plate glass), borosilicate glass (white plate glass), quartz glass, soda glass, and potassium glass can be exemplified. In addition, the panels may have a three-dimensionally curved bent portion as necessary. However, the panel is not necessarily formed of a glass plate, and may be a resin plate made of a resin such as an acrylic resin or a polycarbonate resin. However, from the viewpoint of weather resistance property, heat resistance property, transparence, and the like, it is preferable that the plate be a plate glass. Although thicknesses of the first panel 11 and the second panel 15 are not particularly limited, the thicknesses are equal to or more than 1.5 mm and equal to or less than 5 mm in general.

The adhesive layer 12 is a layer formed of an adhesive laminated on the surface of the first panel 11 on the side of the second panel 15 and bonds the base material layer 24 to the first panel 11. Although the adhesive is not particularly limited, a polyvinyl butyral resin can be used from the viewpoint of adhesiveness, weather resistance property, heat resistance property, and the like. Although the thickness of the adhesive layer 12 is not particularly limited, the thickness is equal to or more than 0.2 mm and equal to or less than 1.0 mm in general.

Figure 2:
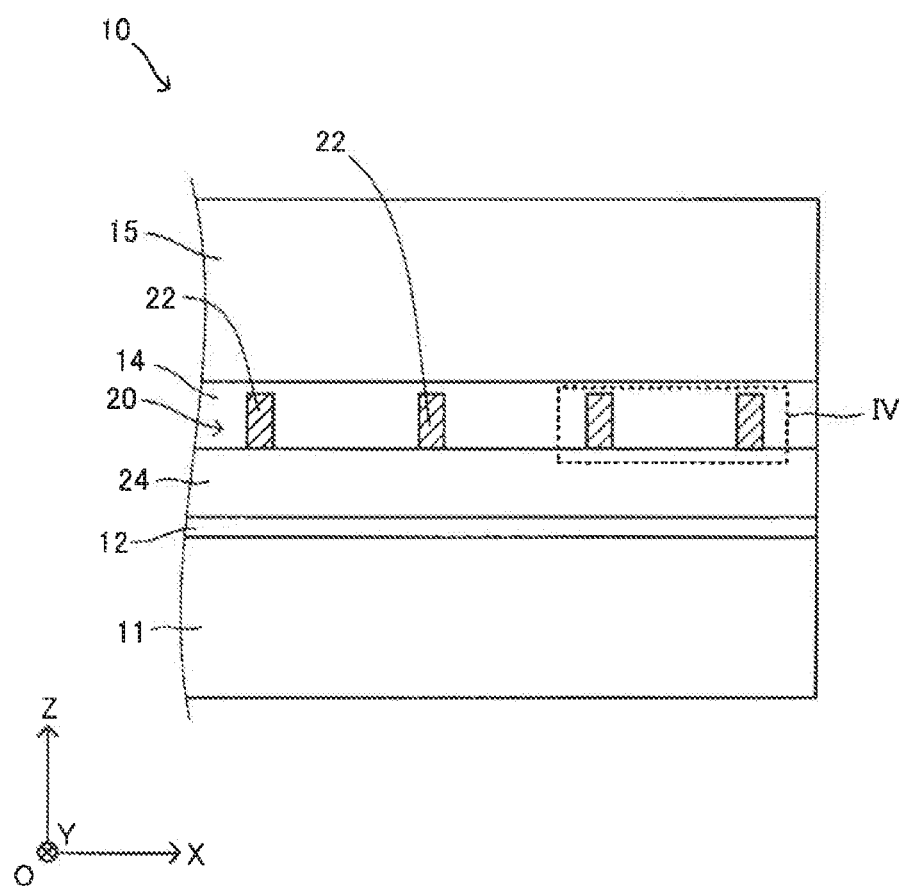
FIG. 2 is a cross-sectional view for explaining a layer structure of the electrical heating glass.
Figure 3:
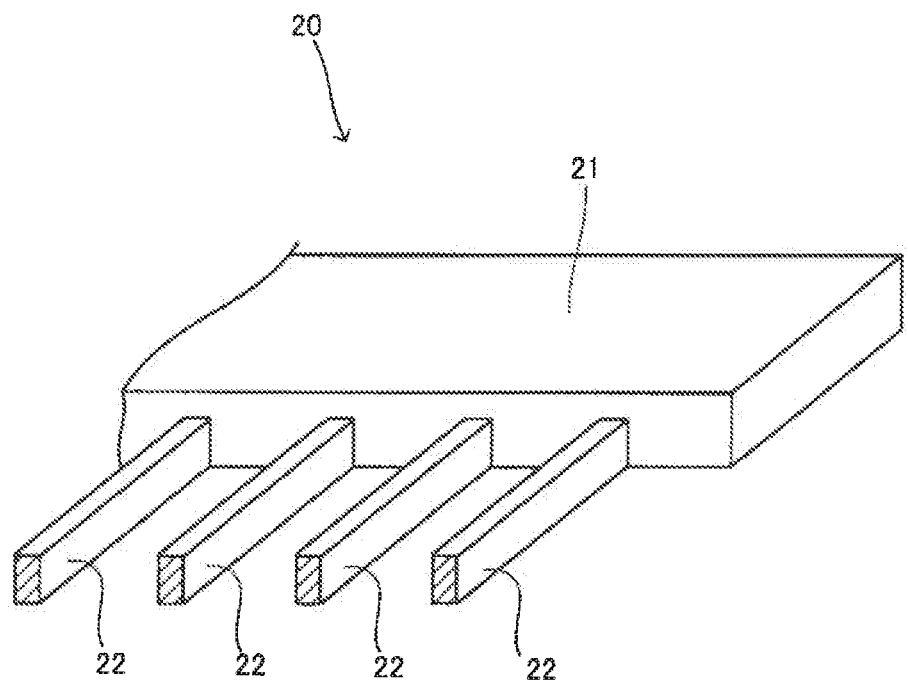
FIG. 3 is a perspective view for explaining a heating electrode device.
Figure 3:
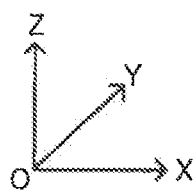

The heating electrode device 20 generates heat by being energized and heats the electrical heating glass 10. In FIG. 3, a perspective view of a part of the heating electrode device 20 is illustrated. As can be found from FIGS. 1 to 3, in the present embodiment, the heating electrode device 20 includes bus bar electrodes 21, the heat-generating conducting body 22, a power supply connecting wire 23, and the base material layer 24. For convenience of explanation, the base material layer 24 will be described first.

The base material layer 24 is a layer, having one surface on which the bus bar electrodes 21 and the heat-generating conducting body 22 of the heating electrode device 20 are particularly arranged, that functions as a base material of the bus bar electrodes 21 and the heat-generating conducting body 22. The base material layer 24 is a transparent plate-like member and is formed of a resin. As the resin for forming the base material layer 24, although any resin may be used as long as the resin can transmit light with a wavelength in a visible light wavelength band (380 nm to 780 nm), a thermoplastic resin can be preferably used. As the thermoplastic resin, for example, a polyester resin such as polyethylene terephthalate, polyethylene naphthalate, and amorphous polyethylene terephthalate (A-PET), a polyolefin resin such as polyethylene, polypropylene, polymethyl pentene, cyclic polyolefine, an acrylic resin such as polymethyl methacrylate, a cellulose resin such as triacetylcellulose (cellulose triacetate), a polycarbonate resin, a styrene resin such as polystyrene and acrylonitrile-styrene copolymer, and polyvinyl chloride can be exemplified. In particular, an acrylic resin and polyvinyl chloride are preferable since an acrylic resin and polyvinyl chloride are excellent in etching resistance, weather resistance property, and light resistance property. The thickness of the base material layer 24 is equal to or more than 20 μm and equal to or less than 300 μm in general. A uniaxially or biaxially stretched resin layer is used as a resin layer forming the base material layer 24 as necessary.

In the present embodiment, the bus bar electrodes 21 include a first bus bar electrode 21a and a second bus bar electrode 21b. Each of the first bus bar electrode 21a and the second bus bar electrode 21b has a band-like shape extending in one direction (X axis direction in FIG. 1), the first bus bar electrode 21a and the second bus bar electrode 21b are arranged to be extended toward the same direction (substantially parallel) with an interval. The first bus bar electrode 21a and the second bus bar electrode 21b can have a known form, and the width of each of the band-like electrodes is equal to or more than 3 mm and equal to or less than 15 mm in general.

The heat-generating conducting body 22 extends and is arranged along a direction intersecting with both bus bar electrodes 21a and 21b (Y-axis direction in FIG. 1) so as to connect the first bus bar electrode 21a to the second bus bar electrode 21b. The first bus bar electrode 21a and the second bus bar electrode 21b are electrically connected to each other with the heat-generating conducting body 22. The heat-generating conducting body 22 generates heat by being energized. The plurality of heat-generating conducting bodies 22 is arranged along the longitudinal direction of the first bus bar electrode 21a and the second bus bar electrode 21b (X axis direction in FIG. 1).

Figure 4:
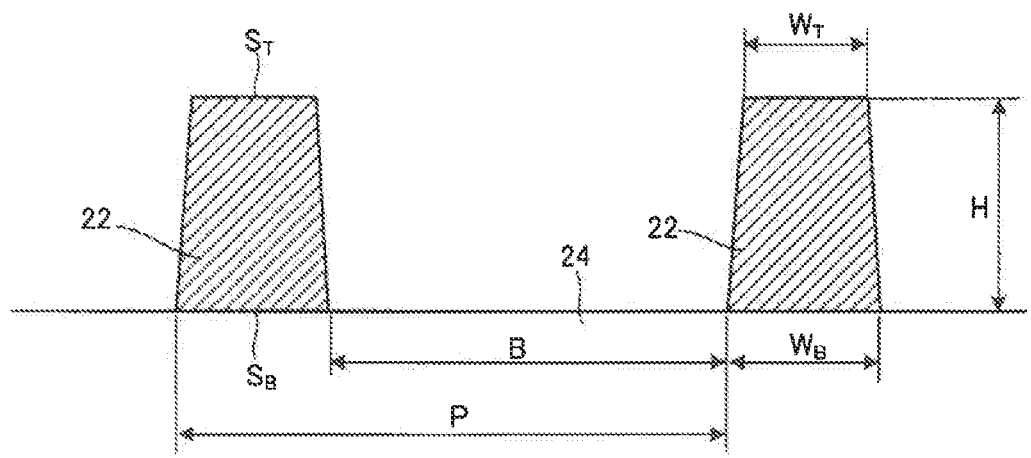
FIG. 4 is a view for explaining a form of the heat-generating conducting body.

The heat-generating conducting body 22 has the following shape. FIG. 4 is an enlarged view of a portion indicated by IV in FIG. 2. Regarding a cross section of the heat-generating conducting body 22 according to the present embodiment perpendicular to a direction in which the heat-generating conducting body 22 extends, when it is assumed that a length of a longer side of two sides parallel to a direction in which the plurality of heat-generating conducting bodies 22 is arranged (side having contact with base material layer 24 in the present embodiment) be a width $W_B$ and a length of the heat-generating conducting body 22 in a direction perpendicular to the direction in which the plurality of heat-generating conducting bodies 22 is arranged (thickness direction of heating electrode device 20, Z axis direction in FIG. 2) be a thickness H, $(H/W_B) > 1.0$ is satisfied. That is, the thickness H is larger than the width $W_B$. According to this, while reducing the width of the heat-generating conducting body 22 which causes visual recognition of the heat-generating conducting body 22, a cross sectional area of the heat-generating conducting body 22 can be larger by setting the thickness to be larger than the width. Therefore, the heat-generating conducting body can be hardly recognized in a visual way while having a high output (high heat generation performance).

It is preferable that other parts be formed as follows while satisfying the above conditions. In FIG. 4, reference numerals are applied for explanation. It is preferable that an interval B between the adjacent heat-generating conducting bodies 22 illustrated as B in FIG. 4 be equal to or more than 0.5 mm and equal to or less than 5.00 mm. More preferably, the interval B is equal to or more than 1.0 mm, and further preferably, the interval B is equal to or more than 1.25 mm. In the cross section, when it is assumed that the width be $W_B$ and the length of the side opposite to $W_B$ be $W_T$, it is preferable that $W_B > W_T$, 3 μm ≤ $W_B$ ≤ 15 μm, and 1 μm ≤ $W_T$ ≤ 12 μm are satisfied. The cross section is a surface that is cut to have a minimum cross sectional area in that portion. In a case where unevenness is formed on the surface of the heat-generating conducting body 22, a cross section with the minimum area including the unevenness is considered. Furthermore, it is preferable that the thickness H of the heat-generating conducting body 22 be equal to or larger than 5 μm and equal to or less than 30 μm.

In addition, it is preferable that a pitch P between the adjacent heat-generating conducting bodies 22 be equal to or more than 0.5 mm and equal to or less than 5.00 mm. When the pitch P is less than 0.5 mm, the heat-generating conducting bodies 22 are arranged close to each other and easily visually recognized. Preferably, the pitch P is equal to or more than 1.0 mm, and more preferably, the pitch P is equal to or more than 1.25 mm. On the other hand, if the pitch P is more than 5.00 mm, uniform heating performance may be deteriorated.

In the thickness direction of the heating electrode device 20, when it is assumed that a surface area of one surface (base material layer 24 in the present embodiment) of the heat-generating conducting body 22 per length of 0.01 m in a plan view be $S_B$ and a surface area of the other surface per length of 0.01 m in a plan view be $S_T$, it is preferable to satisfy $0 \ \mu m^2 < S_B - S_T \leq 30000 \ \mu m^2$. Here, as indicated by the reference L in FIG. 1, the "length" indicates a distance from one end of the extending heat-generating conducting body 22 to the other end. More preferably, $0 \ \mu m^2 < S_B - S_T \leq 15000 \ \mu m^2$ is satisfied. According to this, when it is assumed that a length of the heat-generating conducting body 22 in a direction along the surface of the base material layer 24 (horizontal direction in FIG. 4, X axis direction in FIG. 2) be the width of the heat-generating conducting body 22, a large cross sectional area can be obtained while suppressing an increase in the width even when the heat-generating conducting body is produced by etching. Although it is ideal if a rectangular shape (rectangle) can be produced, it is difficult to produce the rectangle by etching due to nature of a so-called side edge.

As a conductive material forming the heat-generating conducting body 22, for example, a band-shaped member pattern formed by etching a metal such as tungsten, molybdenum, nickel, chromium, copper, silver, platinum, and aluminum, and an alloy such as a nickel-chromium alloy, bronze, and brass including these metals can be exemplified.

To further enhance invisibility of the heat-generating conducting body 22, on any one or more of four surfaces around each heat-generating conducting body 22 (for example, top surface in FIG. 4 (surface with width $W_T$), lower surface (surface with width $W_B$), right surface, and left surface), more preferably, on four surfaces, a light-absorbing dark color layer can be laminated. As such a dark color layer, a layer formed of a material such as copper oxide (CuO), copper nitride, ferrosoferric oxide ($Fe_3O_4$), and copper-cobalt alloy can be formed by a method such as vapor deposition, sputtering, electrolyzation, or electroless plating as having a thickness of about 0.01 μm to 1 μm. As a dark color, in addition to black, a color with low intensity such as gray, brown, dark blue, dark green, dark purple, and dark red is appropriately selected. A hue and intensity of the dark color can be selected based on a material, a film thickness, and a crystal grain size of the dark color layer.

Figure 1B:
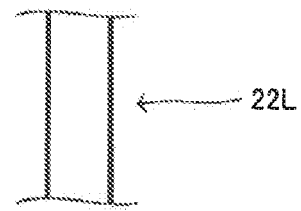
FIG. 1(b) is an enlarged view of a heat-generating conducting body which is one example of a heat-generating conducting body.
Figure 1C:
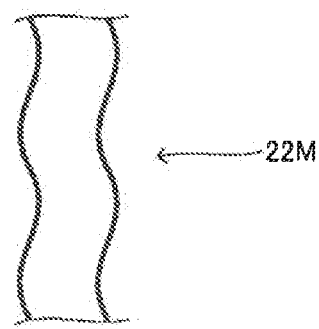
FIG. 1(c) is an enlarged view of a heat-generating conducting body which is another example of the heat-generating conducting body.

In the present embodiment, as indicated by the reference numeral 22L in the enlarged view of the heat-generating conducting body 22 illustrated in FIG. 1(b), the heat-generating conducting body 22 is linearly formed, and the heat-generating conducting bodies 22 form a parallel linear group. However, in addition to this, the heat-generating conducting body 22 may be formed in a band-like shape and in a wavy line shape as indicated by the reference numeral 22M in the enlarged view of the heat-generating conducting body 22 illustrated in FIG. 1(c).

As can be found from FIG. 1(a), the power supply connecting wire 23 connects a power supply 40 between the first bus bar electrode 21a and the second bus bar electrode 21b. The power supply 40 is not particularly limited as long as the power supply can supply power necessary for dissolving or evaporating water droplets (frosting), freezing (frosting) and the like, any known direct current or alternate current power supply having an appropriate voltage, current, or frequency may be used. In a case where the electrical heating glass 10 is applied to an automobile, as the power supply 40, for example, a battery such as a lead storage battery and a lithium ion storage battery provided in the automobile can be used as a DC power supply. At this time, for example, a positive electrode of the battery can be connected to the second bus bar electrode 21b, and a negative electrode can be connected to the first bus bar electrode 21a. Naturally, a dedicated power supply (battery cell, generator, and the like) may be used separately. Furthermore, in a case of a railway vehicle powered by an electric motor, DC or AC power supplied from an overhead wire can be used by appropriately converting the power into an appropriate voltage or current. The power supply connecting wire 23 may have a known structure.

The adhesive layer 14 bonds the base material layer 24 including the bus bar electrodes 21 and the heat-generating conducting bodies 22 to the second panel 15. The adhesive layer 14 can have the same structure as the adhesive layer 12.

With the above components, the electrical heating glass 10 is as follows. As can be found from FIG. 2, the adhesive layer 12 is laminated on one surface of the first panel 11, and the base material layer 24 is laminated on the first panel 11 via the adhesive layer 12. The heating electrode device 20 is arranged on a surface of the base material layer 24 opposite to the surface on which the adhesive layer 12 is arranged. Although the second panel 15 is arranged on the surface of the heating electrode device 20 opposite to the surface on which the base material layer 24 is arranged, the adhesive layer 14 is arranged to fill a space between the base material layer 24 and the heating electrode device 20 and the second panel 15. Accordingly, the second panel 15 is laminated on the base material layer 24 and the heating electrode device 20.

Such a heating electrode device 20 and the electrical heating glass 10 including the same can be manufactured, for example, as follows. FIGS. 5(a) to 5(d) are views for explanation.

Figure 5A:
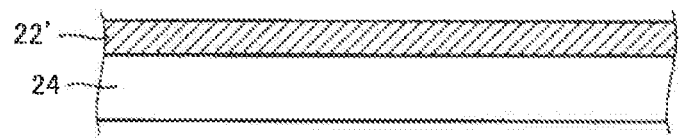
FIGS. 5(a) to 5(d) are diagrams for explaining a method for producing the electrical heating glass.
Figure 5B:
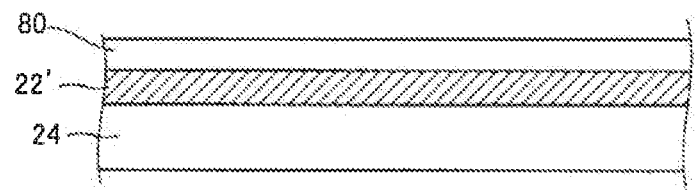

First, as illustrated in FIG. 5(a), a metal foil 22' is bonded to and laminated on the base material layer 24 formed of a resin film via an adhesive layer to manufacture a laminate. Next, as illustrated in FIG. 5(b), a photosensitive resist layer 80 is applied and formed on the metal foil 22' of the laminate.

Figure 5C:
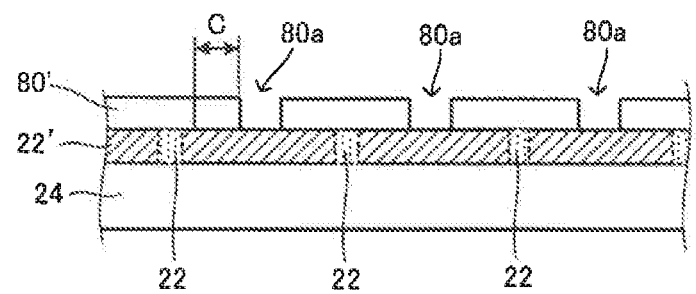

Next, a photomask is prepared that has a desired pattern, for example, a light-shielding pattern based on a plan view pattern of the heating electrode device 20 including the heat-generating conducting bodies 22 and the bus bar electrodes 21a and 21b arranged in a pattern in which band-like linear lines are arranged in parallel as illustrated in FIG. 1(b). Then, the photomask is placed in close contact with the photosensitive resist layer 80. Then, the photosensitive resist layer 80 is exposed to ultraviolet rays through the photomask, and the photomask is removed, and sequentially, the photosensitive resist layer which is not exposed is dissolved and removed by known developing processing, and a resist pattern layer 80' having a shape matching a desired pattern 80a is formed on the metal foil 22' as illustrated in FIG. 5(c). Here, in FIG. 5(c), positions and sizes of the heat-generating conducting bodies 22 to be formed are indicated by broken lines with a light color as a reference. As can be found from FIG. 5(c), this example is formed so that a distance from an edge of the resist pattern 80a formed on the resist pattern layer 80c to an edge of the heat-generating conducting body 22 to be formed is C. It is preferable that the distance C be equal to or longer than 5 μm and equal to or shorter than 30 μm. As a result, the heat-generating conducting body 22 having the above form can be obtained by etching.

Figure 5D:
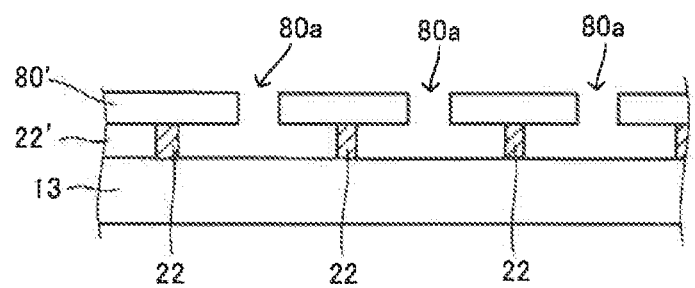

Next, etching (corrosion) processing using corrosive liquid is performed on the laminate from the resist pattern layer 80', and the resist pattern layer 80' and the metal foil 22' are corroded and removed as illustrated in FIG. 5(d). Then, the resist pattern layer is dissolved and removed (remove coating). As described above, a laminated structure in which the heat-generating conducting bodies 22 and the bus bar electrodes 21a and 21b with a predetermined pattern having a plan view shape in FIG. 1(a) and a cross section shape in FIG. 2 are formed on the base material layer 24 is manufactured.

Next, the first panel 11, the adhesive layer 12, the laminated structure including the base material layer 24 and the heating electrode device 20, the adhesive layer 14, and the second panel 15 are laminated in this order, and the plurality of layers is bonded, laminated, and integrated to each other. According to the above process, the electrical heating glass 10 illustrated in the plan view in FIG. 1(a) and the cross-sectional view in FIG. 2 is manufactured.

According to the electrical heating glass 10 described above, a heat-generating conducting body of which a shape of the cross section is close to a rectangle can be obtained by etching, the thickness and the cross sectional area can be increased while the length in the width direction is reduced than a heat-generating conducting body having a trapezoidal cross section in which a difference between an upper base and a lower base is large.

The electrical heating glass 10 is used and acts, for example, as follows. Here, as an example, a case where the electrical heating glass 10 is applied to a front panel of an automobile will be described. That is, in the embodiment in FIG. 1, the electrical heating glass 10 is arranged at a position of the front panel of the automobile, and the power supply connecting wire 23 is connected to the power supply 40 via a switch 50 at this time, and the heat-generating conducting body 22 can be heated via the bus bar electrodes 21. In the present embodiment, a battery provided in the automobile is used as the power supply 40. When the switch 50 is closed, the power supply 40 supplies a current. Since generated Joule heat of the heat-generating conducting body 22 heats the first panel 11 and the second panel 15 of the heat-generating conducting body 22, the temperature of the electrical heating glass 10 that functions as a front panel increases, and this eliminates freezing and fogging. In the present embodiment, since the heat generation can be facilitated by having a large cross section of the heat-generating conducting body 22, freezing and fogging can be eliminated earlier.

Second Embodiment

Figure 6A:
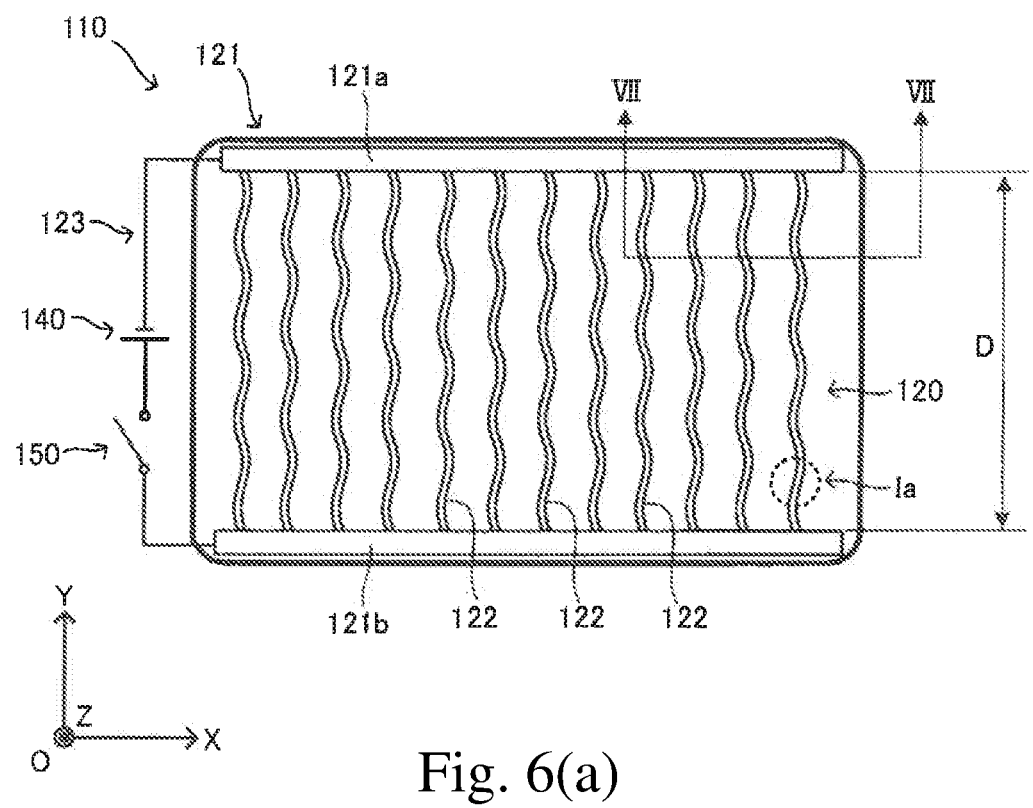
FIG. 6(a) is a plan view for explaining an electrical heating glass according to one embodiment.
Figure 6B:
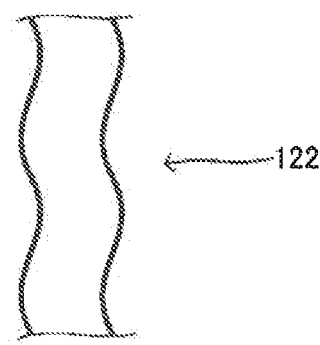
FIG. 6(b) is an enlarged view of a heat-generating conducting body which is one example of a heat-generating conducting body.
Figure 7:
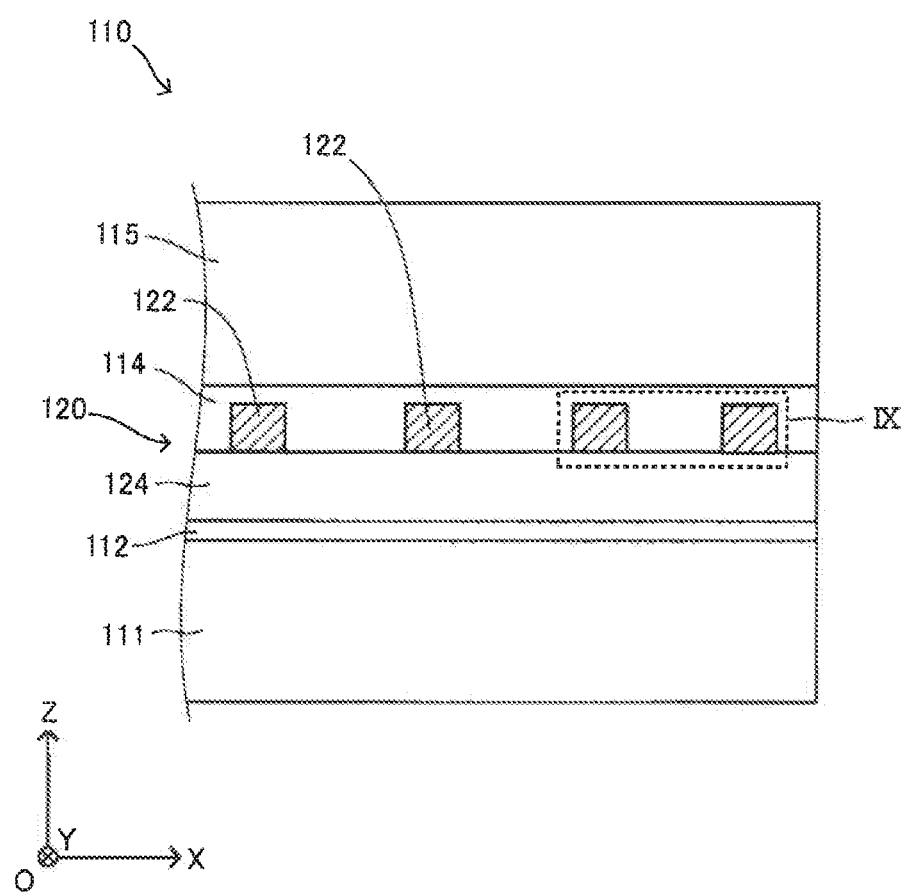
FIG. 7 is a cross-sectional view for explaining a layer structure of the electrical heating glass.

FIG. 6(a) is a view for explaining one embodiment and is a conceptual view of an electrical heating glass 110 in a plan view. FIG. 6(b) is an enlarged view of a portion indicated by Ia in FIG. 6(a), and an enlarged view of a heat-generating conducting body 122 which is an example of a heat-generating conducting body 122 is illustrated. FIG. 7 is a cross-sectional view taken along a line VII-VII illustrated in FIG. 6 and is a view for explaining a layer structure along a thickness direction of the electrical heating glass 110. Such an electrical heating glass 110 is, for example, included in an automobile as a windshield of an automobile. In addition, the electrical heating glass 10 can be used as a window in a place having a so-called glass window, for example, a window of a vehicle such as a train, an aircraft, and a ship, including the automobile, and a window of a building.

As can be found from FIGS. 6 and 7, the electrical heating glass 110 has a plate-like shape as a whole, and a plurality of layers is laminated along the thickness direction (Z-axis direction in FIGS. 6 and 7). More specifically, as illustrated in the cross-sectional view in FIG. 7, the electrical heating glass 110 according to the present embodiment includes a first panel 111, an adhesive layer 112, a heating electrode device 120, an adhesive layer 114, and a second panel 115. Each component will be described below.

The first panel 111 and the second panel 115 are plate-like members having translucency, that is, transparent plate-like members and are arranged in substantially parallel to each other with an interval between plate surfaces facing to each other. The electrical heating glass 110 has a so-called double panel structure. Here, the plate surface indicates two planes that are parallel to the XY plane and face to each other among the surfaces of the first panel 111 and the second panel 115 in FIG. 7. A part of the heating electrode device 120 is arranged between the first panel 111 and the second panel 115, and the heating electrode device 120 and the panels are integrated with the adhesive layers 112 and 114. The first panel 111 and the second panel 115 can be formed of a plate glass. For these panels, the same plate glass can be used as that used for a window normally provided in a facility (for example, vehicle and building) to which the electrical heating glass 110 is applied. For example, sheet glass, float plate glass, reinforced plate glass, partial plate glass, and the like made of soda-lime glass (blue plate glass), borosilicate glass (white plate glass), quartz glass, soda glass, and potassium glass can be exemplified. In addition, the panels may have a three-dimensionally curved bent portion as necessary. However, the panel is not necessarily formed of a glass plate, and may be a resin plate made of a resin such as an acrylic resin or a polycarbonate resin. However, from the viewpoint of weather resistance property, heat resistance property, transparence, and the like, it is preferable that the plate be a plate glass. Although thicknesses of the first panel 111 and the second panel 115 are not particularly limited, the thicknesses are equal to or more than 1.5 mm and equal to or less than 5 mm in general.

The adhesive layer 112 is a layer formed of an adhesive laminated on the surface of the first panel 111 on the side of the second panel 115 and bonds the base material layer 124 to the first panel 111. Although the adhesive is not particularly limited, a polyvinyl butyral resin can be used from the viewpoint of adhesiveness, weather resistance property, heat resistance property, and the like. Although the thickness of the adhesive layer 112 is not particularly limited, the thickness is equal to or more than 0.2 mm and equal to or less than 1.0 mm in general.

Figure 8:
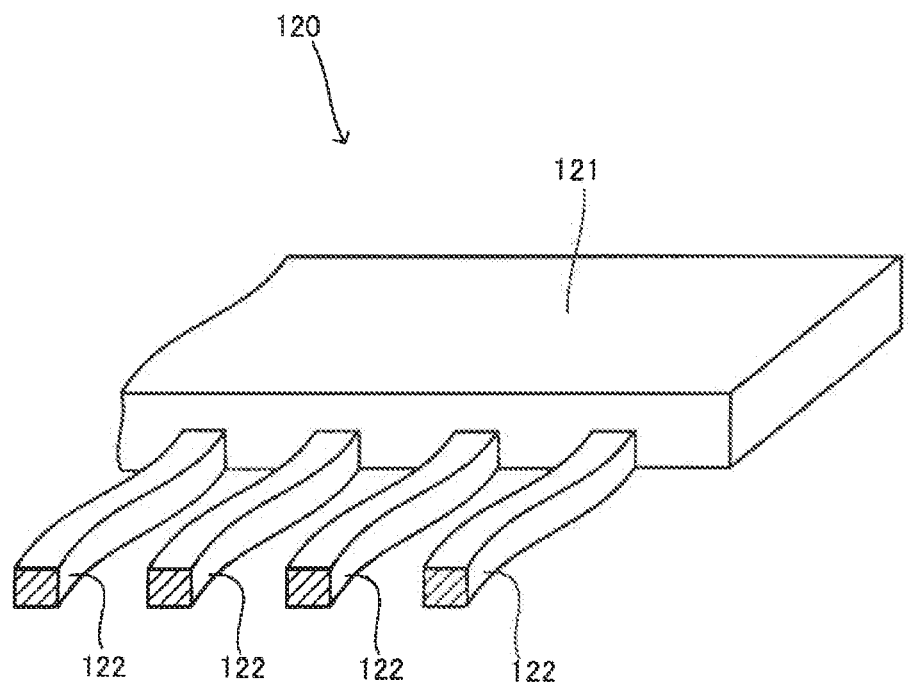
FIG. 8 is a perspective view for explaining the heating electrode device.

The heating electrode device 120 generates heat by being energized and heats the electrical heating glass 110. In FIG. 8, a perspective view of a part of the heating electrode device 120 is illustrated. As can be found from FIGS. 6 to 8, in the present embodiment, the heating electrode device 120 includes bus bar electrodes 121, the heat-generating conducting body 122, a power supply connecting wire 123, and the base material layer 124. For convenience of explanation, the base material layer 124 will be described first.

The base material layer 124 is a layer, having one surface on which the bus bar electrodes 121 and the heat-generating conducting body 122 of the heating electrode device 120 are particularly arranged, that functions as a base material of the bus bar electrodes 121 and the heat-generating conducting body 122. The base material layer 124 is a transparent plate-like member and is formed of a resin. As a resin for forming the base material layer 124, although any resin may be used as long as the resin can transmit light with a wavelength in a visible light wavelength band (380 nm to 780 nm), a thermoplastic resin can be preferably used. As a thermoplastic resin, for example, a polyester resin such as polyethylene terephthalate, polyethylene naphthalate, and amorphous polyethylene terephthalate (A-PET), a polyolefin resin such as polyethylene, polypropylene, polymethyl pentene, cyclic polyolefine, an acrylic resin such as polymethyl methacrylate, a cellulose resin such as triacetylcellulose (cellulose triacetate), a polycarbonate resin, a styrene resin such as polystyrene and acrylonitrile-styrene copolymer, and polyvinyl chloride can be exemplified. In particular, an acrylic resin and polyvinyl chloride are preferable since an acrylic resin and polyvinyl chloride are excellent in etching resistance, weather resistance property, and light resistance property. The thickness of the base material layer 124 is equal to or more than 20 μm and equal to or less than 300 μm in general. A uniaxially or biaxially stretched resin layer is used as a resin layer forming the base material layer 124 as necessary.

In the present embodiment, the bus bar electrodes 121 include a first bus bar electrode 121a and a second bus bar electrode 121b. Each of the first bus bar electrode 121a and the second bus bar electrode 121b has a band-like shape extending in one direction (X axis direction in FIG. 6), the first bus bar electrode 121a and the second bus bar electrode 121b are arranged to be extended toward the same direction (substantially parallel) with an interval. The first bus bar electrode 121a and the second bus bar electrode 121b can have a known form, and the width of each of the band-like electrodes is equal to or more than 3 mm and equal to or less than 15 mm in general.

The heat-generating conducting body 122 extends and is arranged along a direction intersecting with both bus bar electrodes 121a and 21b (Y-axis direction in FIG. 6) so as to connect the first bus bar electrode 121a to the second bus bar electrode 121b. The first bus bar electrode 121a and the second bus bar electrode 121b are electrically connected to each other with the heat-generating conducting body 122. The heat-generating conducting body 122 generates heat by being energized. The plurality of heat-generating conducting bodies 122 is arranged along the longitudinal direction of the first bus bar electrode 121a and the second bus bar electrode 121b (X axis direction in FIG. 6).

The heat-generating conducting body 122 has the following shape. As illustrated in FIG. 6, when it is assumed that an interval between the first bus bar electrode 121a and the second bus bar electrode 121b be D (mm) and a length of a single heat-generating conducting body 122 between the first bus bar electrode 121a and the second bus bar electrode 121b be L (mm), that is, when it is assumed that a distance between both ends of the heat-generating conducting body 122 be D (mm) and the length along the heat-generating conducting body 122 between the both ends be L (mm), $1.02 \cdot D \leq L < 1.50 \cdot D$ is satisfied. As a result, a form to prevent a beam of light can be formed, and unnecessary increase in the resistance of the heat-generating conducting body can be prevented, and accordingly, a heating value can be maintained at a high level. That is, it is possible to prevent a beam of light and to efficiently remove frost and fogging.

Although a specific form of the heat-generating conducting body is not particularly limited as long as the above condition is satisfied, to more reliably prevent a beam of light, it is preferable that the heat-generating conducting body 122 has a wavy form in a plan view (point of sight in FIG. 6).

Figure 9:
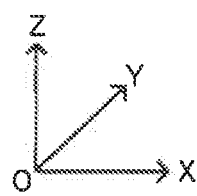
FIG. 9 is a view for explaining a form of the heat-generating conducting body.
Figure 9:
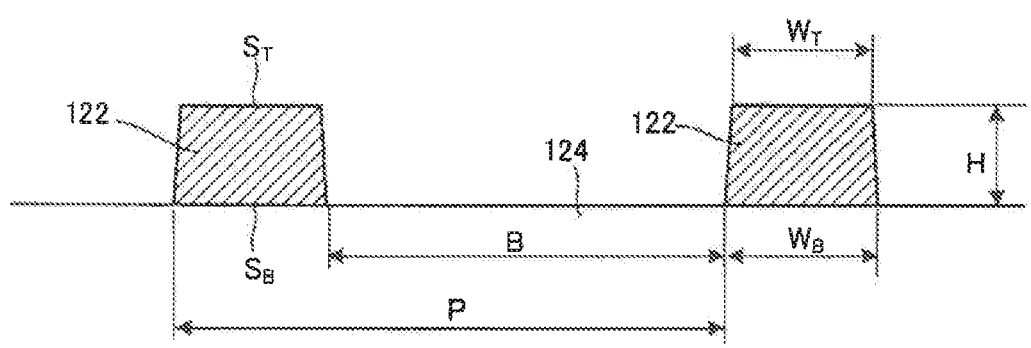

Furthermore, it is preferable that the heat-generating conducting body 122 be configured as follows. FIG. 9 is an enlarged view of a portion indicated by IX in FIG. 7. Regarding the heat-generating conducting body 122, in the thickness direction of the heating electrode device 120, when it is assumed that a surface area of one surface of (base material layer 124 in the present embodiment) the heat-generating conducting body 122 per length of 0.01 m in a plan view be $S_B$ ($\mu m^2$) and a surface area of the other surface per length of 0.01 m in a plan view be $S_T$ ($\mu m^2$), it is preferable to satisfy $0\ \mu m^2 < S_B - S_T \leq 30000\ \mu m^2$. Here, the "length" is a distance between one end and the other end when a certain portion of the extending heat-generating conducting body 122 having a length of 0.01 m is extracted. More preferably, $0\ \mu m^2 < S_B - S_T \leq 15000\ \mu m^2$ is satisfied. Accordingly, when the heat-generating conducting body 122 is produced with a width with which the heat-generating conducting body 122 cannot be visually recognized, the cross sectional area can be large, and a higher output (heating value) can be obtained. Although it is ideal if a rectangular shape (rectangle) can be produced, it is difficult to produce the rectangle by etching due to nature of a so-called side edge.

It is preferable that other parts be formed as follows while satisfying the above conditions. In FIG. 9, reference numerals are applied for explanation. It is preferable that an interval between the adjacent heat-generating conducting bodies 122 illustrated as B in FIG. 9 be equal to or more than 0.5 mm and equal to or less than 5.00 mm. More preferably, the interval is equal to or more than 1.0 mm, and further preferably, the interval B is equal to or more than 1.25 mm. In the cross section, when it is assumed that the width be $W_B$ ($\mu m$) and the length of the side opposite to $W_B$ be $W_T$ ($\mu m$), it is preferable that $W_B > W_T$, $3\ \mu m \leq W_B \leq 15\ \mu m$, and $1\ \mu m \leq W_T \leq 12\ \mu m$ be satisfied. The cross section is a surface that is cut to have a minimum cross sectional area in that portion. In a case where unevenness is formed on the surface of the heat-generating conducting body 122, a cross section with the minimum area including the unevenness is considered. Furthermore, it is preferable that the thickness H ($\mu m$) of the heat-generating conducting body 122 be equal to or larger than 5 $\mu m$ and equal to or less than 30 $\mu m$.

In addition, it is preferable that a pitch P (mm) between the adjacent heat-generating conducting bodies 122 be equal to or more than 0.5 mm and equal to or less than 5.00 mm. When the pitch P (mm) is less than 0.5 mm, the heat-generating conducting bodies 122 are arranged close to each other and easily visually recognized. Preferably, the pitch P (mm) is equal to or more than 1.0 mm, and more preferably, the pitch P (mm) is equal to or more than 1.25 mm. On the other hand, if the pitch P (mm) is more than 5.00 mm, uniform heating performance may be deteriorated.

As a conductive material forming the heat-generating conducting body 122, for example, a band-shaped member pattern formed by etching a metal such as tungsten, molybdenum, nickel, chromium, copper, silver, platinum, and aluminum, and an alloy such as a nickel-chromium alloy, bronze, and brass including these metals can be exemplified.

As can be found from FIG. 6(a), the power supply connecting wire 123 connects a power supply 140 between the first bus bar electrode 121a and the second bus bar electrode 121b. The power supply 140 is not particularly limited as long as the power supply can supply power necessary for dissolving or evaporating water droplets (fogging), freezing (frosting) and the like, any known direct current or alternate current power supply having an appropriate voltage, current, or frequency may be used. In a case where the electrical heating glass 110 is applied to an automobile, for example, as the power supply 140, a battery such as a lead storage battery and a lithium ion storage battery provided in the automobile can be used as a DC power supply. At this time, for example, a positive electrode of the battery can be connected to the second bus bar electrode 121b, and a negative electrode can be connected to the first bus bar electrode 121a. Naturally, a dedicated power supply (battery cell, generator, and the like) may be used separately. Furthermore, in a case of a railway vehicle powered by an electric motor, DC or AC power supplied from an overhead wire can be used by appropriately converting the power into an appropriate voltage or current. The power supply connecting wire 123 may have a known structure.

The adhesive layer 114 bonds the base material layer 124 including the bus bar electrodes 121 and the heat-generating conducting bodies 122 to the second panel 115. The adhesive layer 114 can have the same structure as the adhesive layer 112.

With the above components, the electrical heating glass 110 is formed as follows. As can be found from FIG. 7, the adhesive layer 112 is laminated on one surface of the first panel 111, and the base material layer 124 is laminated on the first panel 111 via the adhesive layer 112. The heating electrode device 120 is arranged on a surface of the base material layer 124 opposite to the surface on which the adhesive layer 112 is arranged. Although the second panel 115 is arranged on the surface of the heating electrode device 120 opposite to the surface on which the base material layer 124 is arranged, the adhesive layer 114 is arranged to fill a space between the base material layer 124 and the heating electrode device 120 and the second panel 115. Accordingly, the second panel 115 is laminated on the base material layer 124 and the heating electrode device 120.

Such a heating electrode device 120 and the electrical heating glass 110 including the same can be manufactured, for example, as follows. FIGS. 10(a) to 10(d) are views for explanation.

Figure 10A:
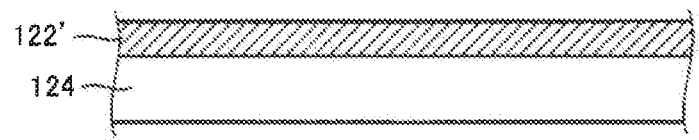
FIGS. 10(a) to 10(d) are diagrams for explaining a method for producing the electrical heating glass.
Figure 10B:
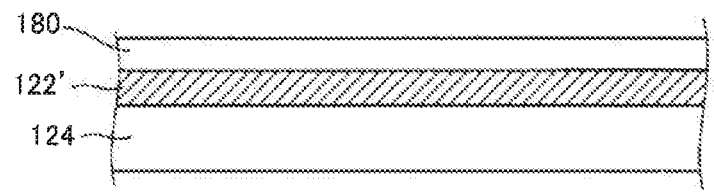

First, as illustrated in FIG. 10(a), a metal foil 122' is bonded to and laminated on the base material layer 124 formed of a resin film via an adhesive layer to manufacture a laminate. Next, as illustrated in FIG. 10(b), a photosensitive resist layer 180 is applied and formed on the metal foil 122' of the laminate.

Figure 10C:
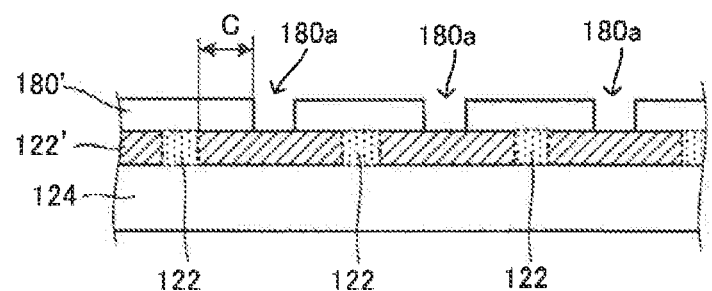

Next, a photomask is prepared that has a light-shielding pattern based on a plan view pattern of the heat-generating conducting bodies 122 and the bus bar electrodes 121 which is a desired pattern. Then, the photomask is placed in close contact with the photosensitive resist layer 180. Then, the photosensitive resist layer 180 is exposed to ultraviolet rays through the photomask, and the photomask is removed, and sequentially, the photosensitive resist layer which is not exposed is dissolved and removed by known developing processing, and a resist pattern layer 180' having a shape matching a desired pattern 180a is formed on the metal foil 122' as illustrated in FIG. 10(c). Here, in FIG. 10(c), positions and sizes of the heat-generating conducting bodies 122 to be formed are indicated by broken lines with a light color as a reference. As can be found from FIG. 10(c), this example is formed so that a distance from an edge of the resist pattern 180a formed on the resist pattern layer 180c to an edge of the heat-generating conducting body 122 to be formed is C (μm). It is preferable that the distance C be equal to or longer than 5 μm and equal to or shorter than 30 μm. As a result, the heat-generating conducting body 122 having the above form can be obtained by etching.

Figure 10D:
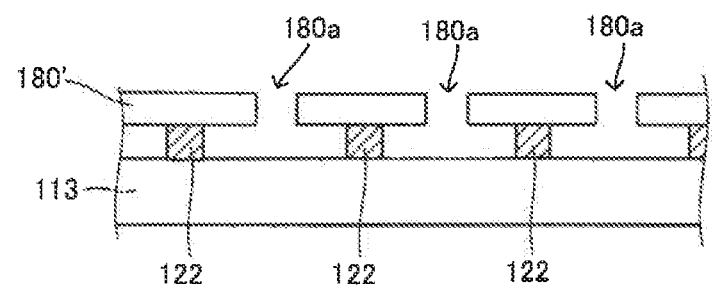

Next, etching (corrosion) processing using corrosive liquid is performed on the laminate from the resist pattern layer 180', and the resist pattern layer 180' and the metal foil 122' are corroded and removed as illustrated in FIG. 10(d). Then, the resist pattern layer is dissolved and removed (remove coating). As described above, a laminated structure in which the heat-generating conducting bodies 122 and the bus bar electrodes 121a and 21b with a predetermined pattern having a plan view shape in FIG. 6(a) and a cross section shape in FIG. 7 are formed on the base material layer 124 is manufactured.

In the present embodiment, since the cross section of the heat-generating conducting body 122 is defined as described above, the heat-generating conducting body 122 can be formed with high productivity.

Next, the adhesive layer 114 and the second panel 115 are laminated on the laminated structure, including the first panel 111, the adhesive layer 112, and the heating electrode device 120, in this order, and the plurality of layers is bonded, laminated, and integrated with each other. According to the above process, the electrical heating glass 110 illustrated in the plan view in FIG. 6(a) and the cross-sectional view in FIG. 7 is manufactured.

According to the manufacturing method for the electrical heating glass 110 described above, a heat-generating conducting body of which a shape of the cross section is close to a rectangle can be obtained by etching, the thickness and the cross sectional area can be increased while the length in the width direction is reduced than a heat-generating conducting body having a trapezoidal cross section in which a difference between an upper base and a lower base is large.

The electrical heating glass 110 is used and acts, for example, as follows. Here, as an example, a case where the electrical heating glass 110 is applied to a front panel of an automobile will be described. That is, in the embodiment in FIG. 6, the electrical heating glass 110 is arranged at a position of the front panel of the automobile, and the power supply connecting wire 123 is connected to the power supply 140 via a switch 150 at this time, and the heat-generating conducting body 122 can be heated via the bus bar electrodes 121. In the present embodiment, a battery provided in the automobile is used as the power supply 140. When the switch 150 is closed, the power supply 140 supplies a current. Since generated Joule heat of the heat-generating conducting body 122 heats the first panel 111 and the second panel 115 of the heat-generating conducting body 122, the temperature of the electrical heating glass 110 that functions as a front panel increases, and this eliminates freezing and fogging. In the present embodiment, since it is possible to prevent a beam of light and facilitate heat generation by setting the length of the heat-generating conducting body 122 to a length within a predetermined range, freezing and fogging can be efficiently eliminated while preventing a beam of light.

Example

In the example, a defrosting time and a beam of light are evaluated by changing a ratio of a length L (mm) of the heat-generating conducting body along the heat-generating conducting body relative to a distance D (mm) between ends of the heat-generating conducting body.

An electrical heating glass is produced as the example of the electrical heating glass 110. At this time, a vertical length and a horizontal length of a heat generating area are 300 mm, and a nickel electrode with a thickness of 50 μm and a width of 20 mm is provided on each end. It is assumed that the thickness of each heat-generating conducting body be 12 μm and a pitch between adjacent heat-generating conducting bodies be 1.25 mm. Table 1 illustrates a relationship between D and L in each example.

A test regarding a beam of light has been carried out as follows. First, the produced electrical heating glass is irradiated with light from a light source ((light of automobile manufactured by SUBARU CORPORATION, FORESTER (registered trademark)) arranged at a position 4 m separated from the electrical heating glass. At this time, the electrical heating glass is placed with an inclination of 60 degrees with respect to the vertical direction. Subsequently, the electrical heating glass is viewed from an opposite side of the light source across the electrical heating glass and from a position that is 50 cm separated from the electrical heating glass. In a case where a beam of light is generated, B is written, and in a case where a beam of light is not generated, A is written.

On the other hand, a test regarding defrosting (defroster performance test) has been carried out as conforming to JIS D 4501-1994, and a specimen is placed with an inclination with 60 degrees with respect to the vertical direction as in the test regarding the beam of light. In a state where the electrical heating glass is covered with ice, a time from the start of energization to a time when the ice is eliminated from an entire surface of the electrical heating glass is measured. Here, a voltage applied to the electrical heating glass is 4.2 V.

In Table 1, in addition to the length of the heat-generating conducting body, the defrosting time and whether the beam of light is generated are illustrated.

[Table 1]

TABLE 1

|  | LENGTH OF HEAT-GENERATING CONDUCTING BODY (mm) | DEFROSTING TIME (minute) | BEAM OF LIGHT |
|---|---|---|---|
| EXAMPLE 1 | 1.02 · D | 4.1 | A |
| EXAMPLE 2 | 1.10 · D | 4.4 | A |
| EXAMPLE 3 | 1.30 · D | 4.9 | A |
| COMPARATIVE EXAMPLE 1 | 1.00 · D | 4.0 | B |
| COMPARATIVE EXAMPLE 2 | 1.50 · D | 6.0 | A |

As can be found from Table 1, by satisfying the present embodiment, the beam of light can be prevented, and the preferable defrosting time can be obtained.

Third Embodiment

In the following description, terms of "plate", "sheet", and "film" are not distinguished from each other based on a difference in the name. For example, the term "sheet" is a concept that may include a member which can be called "plate" or "film", and these members are not necessarily distinguished from each other only based on the difference in the name. In addition, terms used herein for specifying shapes and geometric conditions and degrees thereof (for example, terms including "identical", "same", and "equal" and other terms indicating physical properties such as values of lengths and angles) are not limited to strict meanings and are interpreted as including a range of terms that can be expected to have a similar function.

In addition, each component illustrated in the drawing attached to the specification has a size and a position that do not necessarily coincide with those of a real one, and the components are illustrated as appropriately changing the scale, the dimensional ratio in the in the vertical and horizontal directions, the arrangement relationship, and the like.

First, regarding "prevention of generation of a beam of light", "antiglare", and "achievement of both of prevention of generation of a beam of light and antiglare" regarding a heat-generating plate (refer to reference numeral "210" in FIG. 14) including heat-generating conductors including a plurality of conductive thin wires, the findings of the inventors will be described.

<Prevention of Generation of Beam of Light>

As a result of intensive research, the inventors of the present invention have newly found that a thin-line heat-generating conductor (conductive thin wire) may cause a beam of light and that a beam of light is easily generated especially in a case where a large number of conductive thin wires are arranged in the same pattern. Generally, a beam of light is caused by diffraction of light. For example, when light enters a transparent heat-generating plate, the incident light is diffracted by each conductive thin wire. Particularly, diffraction light beams caused by conductive thin wires arranged in the same pattern interfere with each other and easily cause a beam of light that is elongated in a radial shape and can be visually recognized.

The inventors of the present invention have focused on a generation mechanism of a beam of light and have found that generation of the beam of light that can be visually recognized can be effectively prevented by irregularly arranging the plurality of conductive thin wires. That is, the inventors of the present invention have newly found that, from the viewpoints of preventing the generation of the beam of light that can be visually recognized, "the plurality of conductive thin wires linearly arranged in parallel" and "the plurality of conductive thin wires arranged in the same pattern" are not preferable and that "the plurality of conductive thin wires irregularly arranged with various curvatures in a plan view" is preferable (refer to reference numeral "230" in FIG. 15 described later). In a plan view, a shape of the heat-generating plate 210 including the heat-generating conductor 230 observed from a normal direction of a front and rear surfaces of the heat-generating plate 210 (Z direction in FIG. 15 to be described later), and FIG. 15 correctly illustrates the shape of the heat-generating conductor 230 in a plan view.

<About Antiglare>

In general, from a viewpoint of realizing an excellent visibility, a window that causes a phenomenon such as glare which may interfere the field of view is not preferable. For example, in a case where a transparent heat-generating plate is used for a vehicle window, when a so-called glare phenomenon such as dazzle or blur in which the conductive thin wire is visually recognized with sparkle in a case of a specific combination of an incident angle and a line of sight of an observer due to light reflection by the surface of the conductive thin wire (heat-generating conductor) occurs in light observed through the vehicle window, a field of view of a vehicle occupant such as a driver may be impaired, and in addition, eyestrain of the vehicle occupant is increased. Accordingly, even in a case where the "transparent heat-generating plate including the plurality of conductive thin wires irregularly arranged with various curvatures in a plan view" described above is used for a window, it is required to maintain excellent visibility by preventing a phenomenon such as glare.

Although a part of the light entering the transparent heat-generating plate including the plurality of conductive thin wires is reflected by each conductive thin wire, specific light reflection aspects in the conductive thin wires vary according to the shape of the cross sectional area of each conductive thin wire.

Figure 11A:
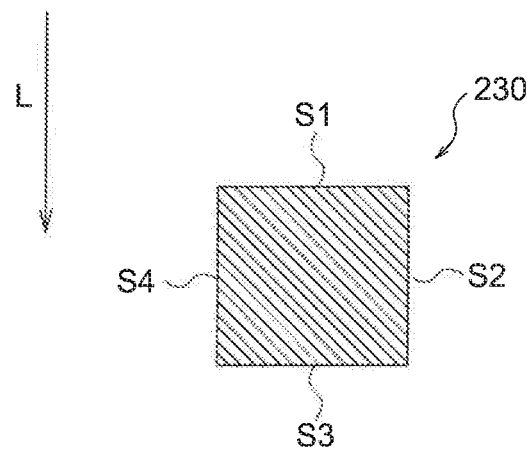
FIG. 11A is a diagram for explaining a relationship between a cross sectional shape of a thin linear heat-generating conductor and a light reflection aspect and indicates an example of the heat-generating conductor having a rectangular cross section.
Figure 11B:
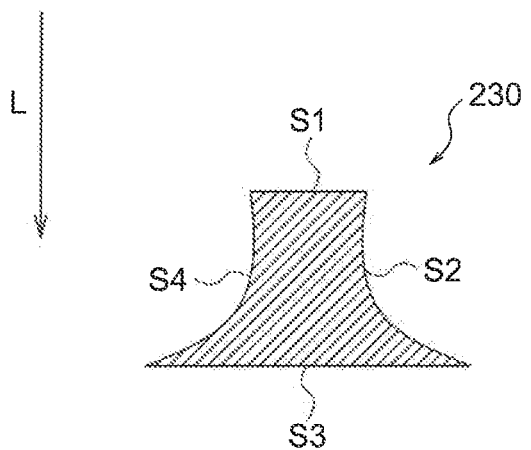
FIG. 11B is a diagram for explaining a relationship between a cross sectional shape of a thin linear heat-generating conductor and a light reflection aspect and indicates an example of the heat-generating conductor having a non-rectangular cross section.

FIGS. 11A and 11B are diagrams for explaining a relationship between a cross sectional shape of the thin linear heat-generating conductor 230 and a light reflection aspect. FIG. 11A illustrates an example of a heat-generating conductor 230 having a rectangular cross sectional area, and FIG. 11B illustrates an example of a heat-generating conductor 230 having a non-rectangular cross sectional area. Here, the cross sectional area indicates a cross section obtained by cutting a heat-generating conductor (conductive thin wire) along a direction perpendicular to an extending direction of the heat-generating conductor (conductive thin wire) (for example, direction of center line of conductive thin wire (length direction)). For example, FIGS. 17A and 17B to be described later illustrate the cross section of the heat-generating conductor. In addition, in FIGS. 17A and 17B, the extending direction is a Y direction, and the cross sectional area has a ZX plane.

As illustrated in FIG. 11A, the cross section of each heat-generating conductor 230 has a rectangular shape that is defined by two sides S2 and S4 extending along a direction same as an incident direction L of light and two sides S1 and S3 extending along a direction perpendicular to the incident direction L, light reflected by the side S1 in the direction perpendicular to the incident direction L travels in a direction opposite to the incident direction L, and the other sides S2 to S4 do not reflect light traveling in the incident direction L in principle. Therefore, if the cross sectional area of the heat-generating conductor 230 included in the heat-generating plate has a rectangular shape, a light component reflected by the heat-generating conductor 230 of the light traveling in the incident direction L does not enter and interfere a visual field of a vehicle occupant who observes light through the heat-generating plate (vehicle window).

However, in reality, it is very difficult to accurately process the cross section of the heat-generating conductor 230 into the rectangular shape, and especially, in a case where the heat-generating conductor 230 is formed by etching (corrosion processing), the heat-generating conductor 230 usually has a non-rectangular cross sectional area as illustrated in FIG. 11B by a so-called side etching phenomenon. The heat-generating conductor 230 illustrated in FIG. 11B is common to that in FIG. 11A in that two sides S1 (upper bottom) and S3 (lower bottom) extending along a direction perpendicular to the incident direction L of the light are included. However, extending directions of the sides S2 (first inclined portion) and S4 (second inclined portion) connecting the sides S1 and S3 extending in the direction perpendicular to the incident direction L do not coincide with the incident direction L. That is, each of the side S2 extending between one ends of the sides S1 and S3 extending along the direction perpendicular to the incident direction L and the side S4 extending between the other ends is curved with an inclination with respect to the incident direction L. Therefore, a part of the light traveling in the incident direction L is reflected by the inclined sides (referred to as "inclined portion" below) S2 and S4 of the heat-generating conductor 230 and subsequently travels in various directions different from the original incident direction L. Particularly, actual observed light entering the heat-generating plate (vehicle window and the like) does not necessarily include only optical components for traveling in one direction, the observed light includes optical components for travelling in various directions in most cases. Therefore, a part of the light reflected by the inclined portions S2 and S4 of the heat-generating conductor 230 may enter the visual field of the vehicle occupant. Such reflected light is light for traveling in a direction different from an original traveling direction, and the reflected light enters the visual field of a user (observer observing transmitted light) at an unexpected angle and causes glare such as dazzle or blur. Therefore, the reflected light is not preferable in a viewpoint for securing excellent visibility.

The inventors of the present invention have focused on a light reflection mechanism by the conductive thin wire and have newly found that glare such as dazzle or blur can be effectively prevented by adjusting a cross sectional shape of the conductive thin wire so that the inclined portion of each conductive thin wire has various angles as an inclination angle in the cross section. That is, if the inclination angles of the inclined portions of the cross sectional areas of all the conductive thin wires included in the heat-generating plate are common to each other, dazzle or blur may be emphasized in light observed by the user through the heat-generating plate. Therefore, the inventors of the present invention have newly found that glare is effectively prevented by giving various angles (inclination) to the plurality of conductive thin wires in the cross section.

<Achievement of Both of Prevention of Occurrence of Beam of Light and Antiglare>

In the window using the heat-generating plate, the conductive thin wire exists in the field of view of the user. However, from the viewpoint of realizing clear visibility, it is preferable to sufficiently thin the conductive thin wire so that the conductive thin wire is not visually recognized as possible.

However, when the conductive thin wire is thinned, it is difficult to apply angle variations to the inclination angle of the inclined portion of the cross sectional area of the conductive thin wire. That is, to realize a gentle inclination by reducing the inclination angle of the inclined portion of the cross sectional area in the extremely thin conductive thin wire, for example, in the example illustrated in FIG. 11B, a difference between lengths of a side S1 (upper bottom) and a side S3 (lower bottom) is increased, and the sufficient length of the shorter side S1 (upper bottom) cannot be especially secured. When the upper bottom S1 of the cross sectional area of the conductive thin wire is extremely short, a possibility that the conductive thin wire is disconnected due to a manufacturing error and the like is increased.

Therefore, by mixedly providing relatively thick portions and relatively thin portions in each conductive thin wire, desired angle variations can be easily applied to the inclination angle of the inclined portion of the cross sectional area of each conductive thin wire. In particular, it is desirable to realize a "gentle inclination with a small inclination angle" in the relatively thick inclined portion of the conductive thin wire and realize a "steep inclination with a large inclination angle" in the relatively thin inclined portion of the conductive thin wire from the viewpoint of preventing the disconnection of the conductive thin wire.

On the other hand, regarding the plurality of conductive thin wires arranged with various curvatures to prevent a beam of light, under constraints on the arrangement space, the width of the conductive thin wire is easily increased in a portion with a smaller curvature and a smaller curve than a portion with a larger curvature and a larger curve. Therefore, it is preferable to vary the inclination angle of the inclined portion by making the inclination of the inclined portion of the cross sectional area be gentle by thickening the portion with a small curvature in each conductive thin wire and making the inclination of the inclined portion of the cross sectional area be steep by thinning the portion with a large curvature.

As a method for forming the conductive thin wire, for example, a method for forming the conductive thin wire with a desired wiring shape by etching a film to be the conductive thin wire is preferably used. In a case where the conductive thin wire is formed by etching, the conductive thin wire having various inclined portions can be formed by making a degree of erosion of a film by etching be relatively stronger to form a steep inclination of the inclined portion and making a degree of erosion of a film by etching be relatively weaker to form a gentle inclination of the inclined portion. When the inclination of the inclined portion in the thin portion of the conductive thin wire is made to be gentle by etching, erosion of the side of the film covered with a resist and etched is more proceeded than erosion of other portions, and all the film portion covered with the resist may be eroded before etching on the entire conductive thin wire is completed, and the conductive thin wire may be disconnected.

Based on the analysis and findings, the inventors of the present invention have newly acquired knowledges such that prevention of occurrence of a beam of light and antiglare can be achieved at a high level by making the "inclination of the cross sectional area of the large curvature portion (first large curvature portion 231b in FIG. 15 to be described later) of the cross sectional area of the conductive thin wire (conductive main thin wire and conductive sub thin wire to be described later) be larger than the inclination of the cross sectional area of the small curvature portion (first small curvature portion 231a in FIG. 15 to be described later).

It is preferable to realize that "the conductive thin wire has different inclination of the cross sectional area according to the curvature" across the entire heat-generating plate (conductive thin wire). However, such inclinations may be realized only in a part of the heat-generating plate (conductive thin wire). For example, in a case where the heat-generating plate is applied to a vehicle window, the inclination of the cross sectional area of the conductive thin wire may be determined according to the curvature in a range corresponding to a part of or all of a normal visual field of a vehicle occupant in the vehicle window. In addition, in only a part of the conductive thin wire, the inclination of the cross sectional area of the conductive thin wire may be determined according to the curvature.

Hereinafter, a specific embodiment of the present invention based on the above analysis and findings will be described.

Figure 12:
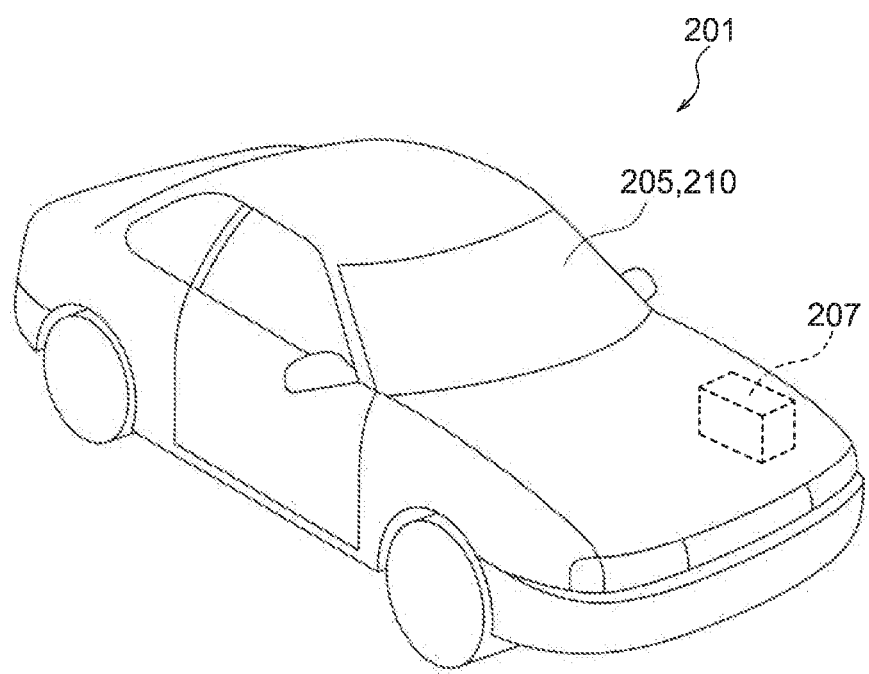
FIG. 12 is a perspective view for schematically illustrating an automobile (vehicle) on which a battery (power supply) is mounted.

FIG. 12 is a perspective view for schematically illustrating an automobile (vehicle) 201 on which a battery (power supply) 207 is mounted.

In general, the automobile 201 has various windows such as a front window, a rear window, side windows, and a sunroof window. Although a transparent heat-generating plate 210 according to the embodiment of the present invention can be applied to any window, an example in which the front window 205 is formed of the transparent heat-generating plate 210 will be described below.

Figure 13:
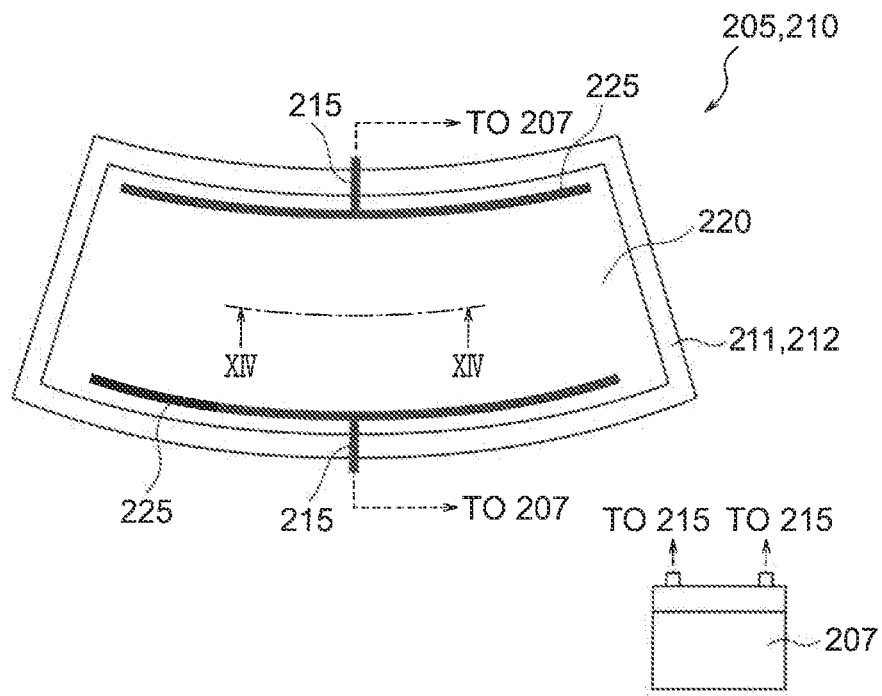
FIG. 13 is a front view of a front window including a transparent heat-generating plate.

FIG. 13 is a front view of the front window 205 formed of the transparent heat-generating plate 210.

The heat-generating plate 210 in this example includes a first transparent plate 211, a second transparent plate 212, and a conductor sheet 220 arranged between the first transparent plate 211 and the second transparent plate 212. The conductor sheet 220 includes a pair of bus bars 225 connected to a battery 207 via a wiring portion 215 and a heat-generating conductor (refer to reference numeral "230" in FIG. 14 to be described later) arranged between the bus bars 225 and connected to each of the pair of bus bars 225. When the battery 207 applies a voltage to the pair of bus bars 225, the heat-generating conductor connected to the pair of bus bars 225 is energized and generates heat by resistance heating. Although the conductor sheet 220 including the bus bars 225 and the heat-generating conductor is arranged in a sealed space between the first transparent plate 211 and the second transparent plate 212, the conductor sheet 220 is electrically connected to the battery 207 provided outside via the wiring portions 215 extending from the bus bars 225 to the outside of the first transparent plate 211 and the second transparent plate 212.

In the examples illustrated in FIGS. 12 and 13, the heat-generating plate 210 (front window 205), the first transparent plate 211, and the second transparent plate 212 are curved. However, for easy understanding, in other figures, the heat-generating plate 210, the first transparent plate 211, and the second transparent plate 212 having plate-like shape are illustrated.

Figure 14:
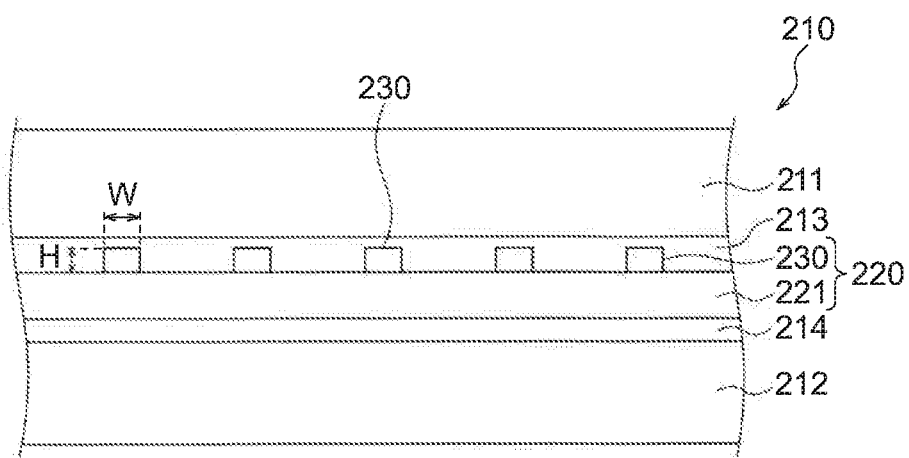
FIG. 14 is a cross-sectional view of the heat-generating plate (front window) taking along a line XIV-XIV illustrated in FIG. 13.

FIG. 14 is a cross-sectional view of the heat-generating plate 210 (front window 205) taking along a line XIV-XIV illustrated in FIG. 13.

The conductor sheet 220 includes a supporting base material 221 and a heat-generating conductor 230 arranged on and supported by the supporting base material 221. A surface of the supporting base material 221 on which the heat-generating conductor 230 is arranged is bonded to the first transparent plate 211 via a first bonding layer 213, and a surface of the supporting base material 221 opposite to the surface on which the heat-generating conductor 230 is arranged is bonded to the second transparent plate 212 via a second bonding layer 214. Therefore, in the heat-generating plate 210 in this example, the first transparent plate 211 functions as a covering member for covering the heat-generating conductor 230, and the heat-generating conductor 230 is arranged between the supporting base material 221 and the first transparent plate 211.

Heat generated by the heat-generating conductor 230 is transmitted to the first transparent plate 211 via the first bonding layer 213 and transmitted to the second transparent plate 212 via the supporting base material 221 and the second bonding layer 214. As a result, the first transparent plate 211 and the second transparent plate 212 are heated, and frost, ice (snow and the like), and water attached to the first transparent plate 211 and the second transparent plate 212 are removed, and the fogging of the first transparent plate 211 and the second transparent plate 212 can be eliminated. By using the heat-generating plate 210 as a defroster in this way, frost and ice formation and dew condensation on the front window 205 (particularly, first transparent plate 211 and second transparent plate 212) are prevented so as to keep an excellent visibility of a vehicle occupant.

Transparence of the heat-generating plate 210 according to the present embodiment is not particularly limited as long as the heat-generating plate 210 is transparent enough so that the heat-generating plate 210 can be viewed through from one side to the other side, and it is preferable that the heat-generating plate 210 have a visible light transmittance of, for example, equal to or higher than 30%, and more preferably, a visible light transmittance of equal to or higher than 70%. Here, the visible light transmittance is specified as an average value of transmittances in respective wavelengths when the transmittance is measured by a spectrophotometer (for example, "UV-3100PC" manufactured by SHIMADZU CORPORATION, conforming to JISK0115) within a measurement wavelength range of 380 nm to 780 nm.

In a case where the heat-generating plate 210 is used for the front window 205 as in this example, it is especially required to secure a clear visibility by using the heat-generating plate 210. Therefore, it is preferable that the first transparent plate 211 and the second transparent plate 212 included in the heat-generating plate 210 used for the front window 205 have a high visible light transmittance, for example, a visible light transmittance of equal to or higher than 90%. As a material of each of the first transparent plate 211 and the second transparent plate 212, various members can be selected, and for example, a resin plate and a glass plate can be used. As a resin material forming the first transparent plate 211 and the second transparent plate 212, acrylic resin polycarbonate such as polymethyl (meth) acrylate, polybutyl (meth) acrylate, methyl (meth) acrylate-butyl (meth) acrylate copolymer, and methyl (meth) acrylate-styrene copolymer can be exemplified. The term of "(meth) acrylate" used here means acrylate or methacrylate. The acrylic resin is suitable for the heat-generating plate 210, and especially, for the heat-generating plate 210 used for the front window 205 and the rear window in a point of high durability. In a part or all of the first transparent plate 211 and the second transparent plate 212, a visible light transmittance may be deteriorated due to coloring or the like. For example, to prevent an increase in a temperature in a vehicle on a sunny summer day by shielding direct sunlight or to make it difficult to visually recognize an interior of the vehicle from outside the vehicle, a part or all of the first transparent plate 211 and the second transparent plate 212 may have a relatively low visible light transmittance.

To secure high strength and excellent optical characteristics, it is preferable that the first transparent plate 211 and the second transparent plate 212 have a thickness of equal to or more than 2 mm and equal to or less than 20 mm. In addition, the first transparent plate 211 and the second transparent plate 212 may be formed of the same materials, may have the same structures, and at least one of the materials or structures of the first transparent plate 211 and the second transparent plate 212 may be different from each other. Furthermore, although the first transparent plate 211 and the second transparent plate 212 have substantially the same planar shape and size, the first transparent plate 211 and the second transparent plate 212 may have different planar shapes and sizes as necessary.

The "first bonding layer 213" for bonding the first transparent plate 211 to the conductor sheet 220 (supporting base material 221) and the "second bonding layer 214" for bonding the second transparent plate 212 and the conductor sheet 220 (supporting base material 221) are formed of materials having various adhesiveness and viscosity and can be formed in layers. From the viewpoint of securing a clear field of view, it is preferable that the first bonding layer 213 and the second bonding layer 214 be formed of a material with a high visible light transmittance, and typically, formed of polyvinyl butyral (PVB). The thickness of each of the first bonding layer 213 and the second bonding layer 214 is preferably equal to or more than 0.15 mm and equal to or less than 1 mm. In addition, the first bonding layer 213 and the second bonding layer 214 may be formed of the same materials, may have the same structures, and at least one of the materials or structures of the first bonding layer 213 and the second bonding layer 214 may be different from each other.

The transparent heat-generating plate 210 is not limited to the illustrated example, and other function layer that is expected to perform a specific function may be provided, for example, in addition to the above structure. Furthermore, each component of the heat-generating plate 210 may perform two or more functions, and for example, a function other than the above-described functions may be further added to at least one component of the first transparent plate 211, the second transparent plate 212, the first bonding layer 213, the second bonding layer 214, and the conductor sheet 220 (heat-generating conductor 230 and supporting base material 221). For example, a member or structure that provides at least one of an Anti-Reflection (AR) function, a Hard Coating (HG) function having scratch resistance, an infrared ray shielding (reflection) function, an ultraviolet ray shielding (reflection) function, an antifouling function, and other functions may be added to each component of the heat-generating plate 210.

<Conductor Sheet 220>

The conductor sheet 220 in this example includes the pair of bus bars 225 and the heat-generating conductor 230 as described above, has substantially the same planar shape and size as the first transparent plate 211 and the second transparent plate 212, and is arranged over the entire first transparent plate 211 and the entire second transparent plate 212 (heat-generating plate 210). However, the planar shape and the size of the conductor sheet 220 are not particularly limited, and the conductor sheet 220 may be smaller than the first transparent plate 211 and the second transparent plate 212. For example, the conductor sheet 220 may be provided on a part of the heat-generating plate 210 (first transparent plate 211 and second transparent plate 212) so that the conductor sheet 220 cover a specific area such as a front portion of a driver's seat.

A material of the supporting base material 221 of the conductor sheet 220 is not particularly limited if the supporting base material 221 can appropriately support the heat-generating conductor 230, and the material preferably has a high visible light transmittance in the viewpoint of securing a clear field of view. Therefore, a transparent electrically insulating film which can transmit light with wavelengths in a visible light wavelength range (for example, 380 nm to 780 nm) can be preferably used as the supporting base material 221. For example, the supporting base material 221 can be formed of a polyester resin such as polyethylene terephthalate, polyethylene naphthalate, polybutylene terephthalate, and ethylene-terephthalate-isophthalate copolymer. To appropriately support the heat-generating conductor 230 while keeping sufficient light transmittance, it is preferable that the supporting base material 221 have the thickness of equal to or more than 0.03 mm and equal to or less than 0.15 mm.

On the other hand, a material of the heat-generating conductor 230 is not particularly limited as long as the material can be heated by being energized. For example, the heat-generating conductor 230 can be formed of gold, silver, copper, platinum, aluminum, chromium, molybdenum, nickel, titanium, palladium, indium, tungsten, or an alloy thereof. The heat-generating conductor 230 may be formed of an opaque metal material. However, in a case where the heat-generating conductor 230 is formed of an opaque material or a material with low transparence, it is preferable to sufficiently thin the heat-generating conductor 230 so as not to excessively shield a field of view of a user.

Therefore, it is preferable that a proportion (that is, uncoating ratio) of a region that is not covered with the heat-generating conductor 230 of a planar area of the supporting base material 221 be set to high, for example, equal to or higher than 70% and equal to or lower than 98%. Furthermore, it is preferable that a line width of the conductive thin wire (conductive main thin wire 231 or conductive sub thin wire 232 to be described later) included in the heat-generating conductor 230 be about equal to or more than 2 μm and equal to or less than 20 μm. Specifically, regarding the sizes of the conductive thin wire, it is preferable that the width W in a direction along the plate surface of the transparent heat-generating plate 210 be about equal to or more than 2 μm and equal to or less than 20 μm, and it is preferable that the height (thickness) H in a normal direction of the plate surface of the transparent heat-generating plate 210 be equal to or more than 1 μm and equal to or less than 20 μm. If the heat-generating conductor 230 (conductive thin wire) has the width W and the height H as described above, the heat-generating conductor 230 is sufficiently thin and can be visually inconspicuous. By providing the heat-generating conductor 230 based on the uncoating ratio and the line width, the entire region where the heat-generating conductor 230 is provided has high transparence, and the heat-generating conductor 230 does not excessively impair visually transmitting performance of the transparent heat-generating plate 210.

As described above, the heat-generating conductor 230 is formed on the supporting base material 221 so as to increase the uncoating ratio, and the first bonding layer 213 has contact with the heat-generating conductor 230 and has contact with a portion (non-coated portion) of the supporting base material 221 that is not covered with the heat-generating conductor 230. Therefore, in the heat-generating plate 210 in this example, the heat-generating conductor 230 is embedded in the first bonding layer 213.

Regarding the heat-generating conductor 230, a surface portion may have a dark color layer (refer to "first dark color layer 237" and "second dark color layer 238" illustrated in FIG. 25 and the like to be described later), and at least a part of an energized portion at the center of the heat-generating conductor 230 (refer to "conductive layer 236" illustrated in FIG. 25 and the like) may be covered with the dark color layer. Depending on the material, the heat-generating conductor 230 may have a relatively high light reflectance, and there is a case where light reflected by the heat-generating conductor 230 is visually conspicuous. The light reflected by the heat-generating conductor 230 interferes the field of view of a vehicle occupant in a vehicle and deteriorates design by allowing the visual recognition of the heat-generating conductor 230 from the outside of the vehicle. Therefore, by forming a dark color layer such as black layer having lower visual light reflectance than that of the energized portion at the center of the heat-generating conductor 230 on the surface of the heat-generating conductor 230, reflection of light by the heat-generating conductor 230 can be prevented, and the deterioration in design can be prevented while securing an excellent field of view of a vehicle occupant.

Next, a wiring pattern of the heat-generating conductor 230 according to the present embodiment will be described.

Figure 15:
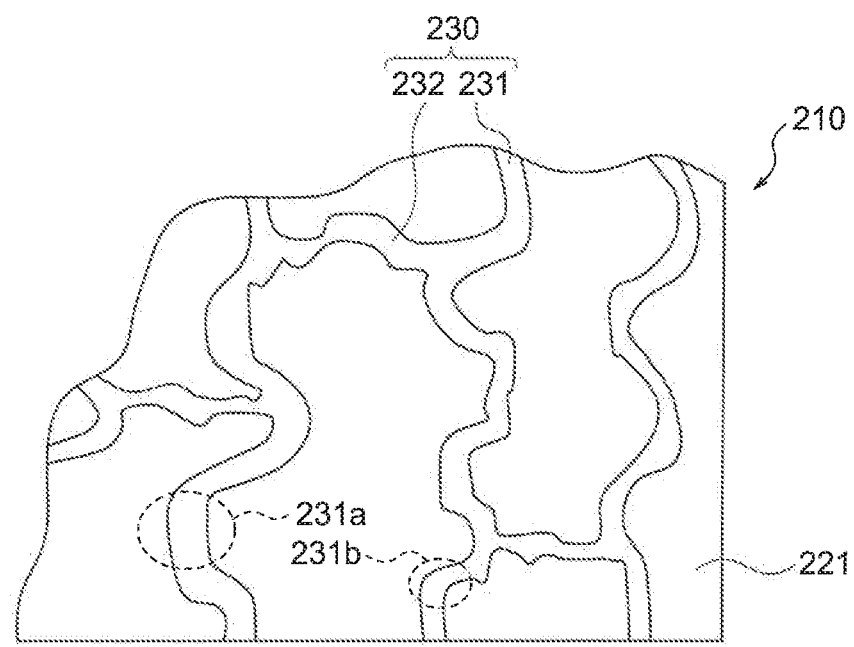
FIG. 15 is an enlarged plan view illustrating an exemplary wiring pattern of the heat-generating conductor.

FIG. 15 is an enlarged plan view illustrating an exemplary wiring pattern of the heat-generating conductor 230. In FIG. 15, for convenience of explanation, of the heat-generating plate 210, only the heat-generating conductor 230 and the supporting base material 221 are illustrated.

The heat-generating conductor 230 according to the present embodiment includes a plurality of conductive main thin wires 231 and conductive sub thin wires 232 for coupling the conductive main thin wires 231 arranged adjacent to each other. Each conductive main thin wire 231 extends in a direction from one bus bar 225 toward the other bus bar 225 (refer to Y direction in FIG. 15) between the pair of bus bars 225 (refer to FIG. 13) and are connected to the bus bars 225. Each conductive main thin wire 231 is curved in an irregular wavy shape and arranged on the supporting base material 221, and the conductive main thin wire 231 has a plurality of curved portions having different curvatures (that is, curved degree) from each other. In addition, the conductive main thin wires 231 have different wave shapes from each other.

The conductive sub thin wire 232 is provided on at least a part of the plurality of conductive main thin wires 231 and is discretely arranged. That is, the plurality of conductive sub thin wires 232 is arranged in the present embodiment, and the conductive sub thin wires 232 are arranged at positions different from each other along the direction from one of the bus bars 225 to the other bus bar 225 (refer to Y direction in FIG. 15). Each conductive sub thin wire 232 has an irregular wavy shape including a plurality of curved portions having different curvatures (that is, curved degree) from each other. In addition, the conductive sub thin wires 232 have different wave shapes from each other. The conductive sub thin wire 232 and the conductive main thin wire 231 have the same composition and are continuously and integrally formed.

As described above, each of the conductive main thin wires 231 and the conductive sub thin wires 232 included in the heat-generating conductor 230 has curved portions with various curvatures. In particular, the conductive main thin wire 231 according to the present embodiment includes a "portion with a relatively small curvature (first small curvature portion, refer to reference numeral "231a" in FIG. 15)" and a "portion with a relatively large curvature (first large curvature portion, refer to reference numeral "231b" in FIG. 15)" of which cross sectional areas have different inclinations. That is, the inclination of the cross section of the first large curvature portion with a relatively large curvature of the cross section of the conductive main thin wire 231 is larger than that of the first small curvature portion with a relatively small curvature.

Figure 16A:
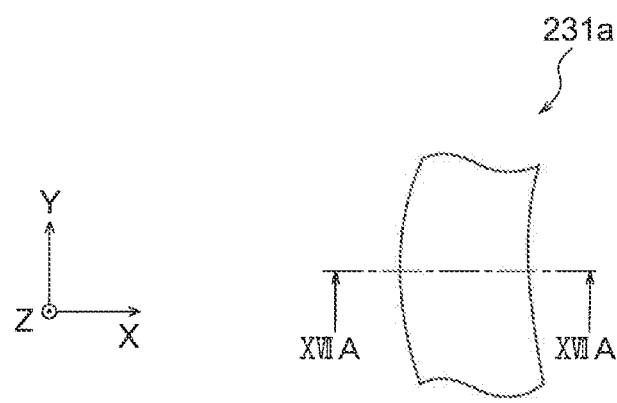
FIG. 16A is an enlarged view of a portion (first small curvature portion) indicated by a reference numeral "31a" in FIG. 15.
Figure 16B:
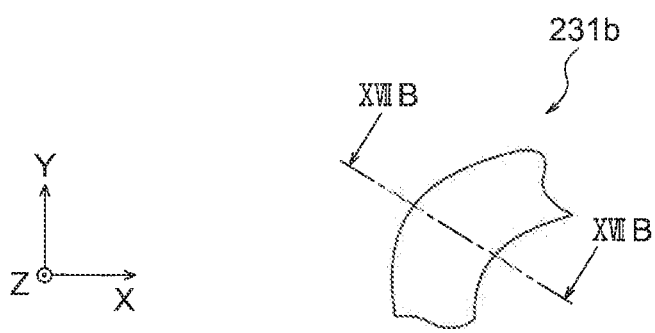
FIG. 16B is an enlarged view of a portion (first large curvature portion) indicated by a reference numeral "31b" in FIG. 15.
Figure 17A:
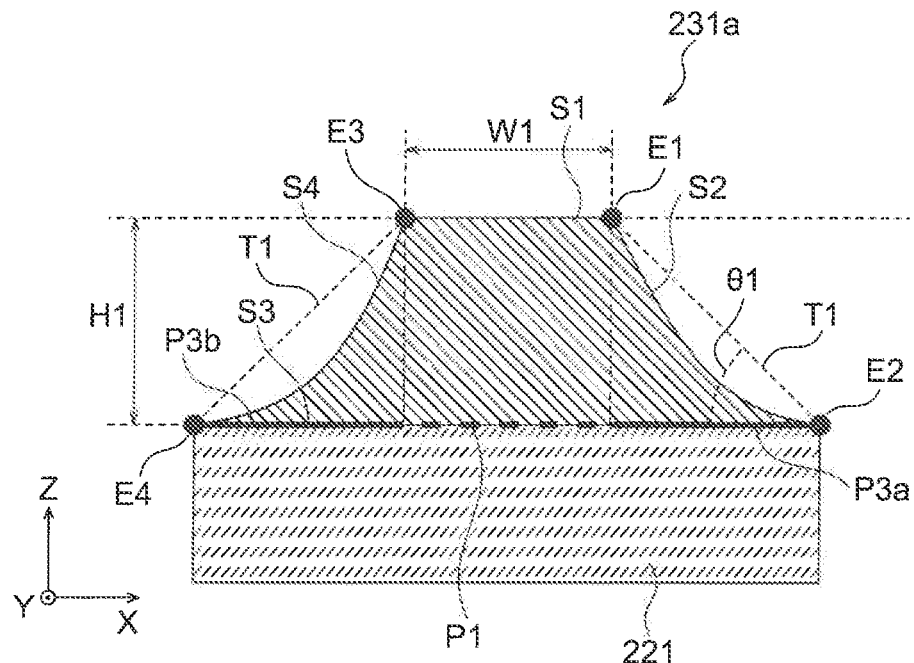
FIG. 17A is a cross-sectional view taken along a line XVIIA-XVIIA in FIG. 16A.

FIG. 16A is an enlarged view of a portion (first small curvature portion) indicated by the reference numeral "231a" in FIG. 15, and FIG. 16B is an enlarged view of a portion (first large curvature portion) indicated by the reference numeral "231b" in FIG. 15. FIG. 17A is a cross-sectional view taken along a line XVIIA-XVIIA in FIG. 16A, and FIG. 17B is a cross-sectional view taken along a line XVIIB-XVIIB in FIG. 16B.

Figure 17B:
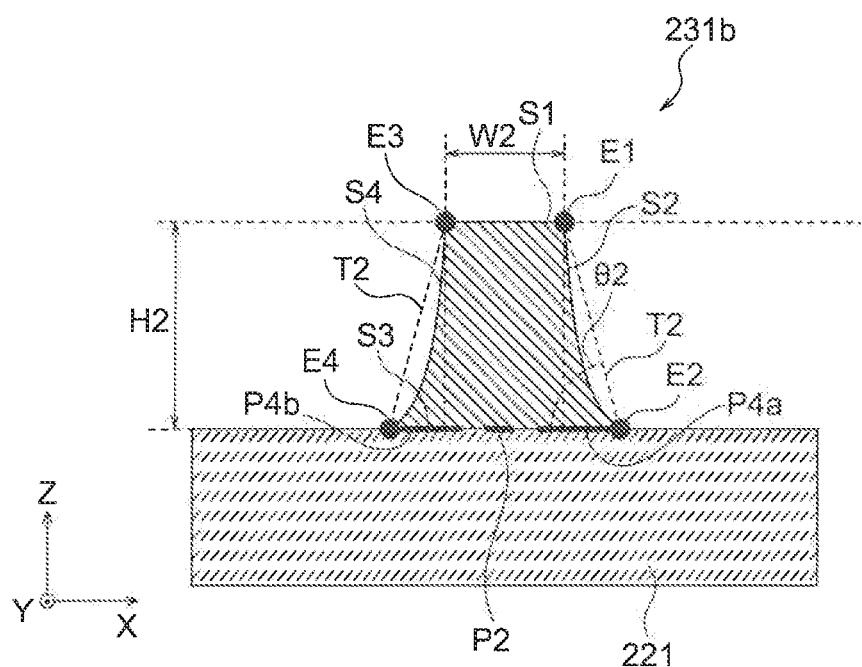
FIG. 17B is a cross-sectional view along a line XVIIB-XVIIB in FIG. 16B.

A cross section of the heat-generating conductor 230 (conductive main thin wire 231 and conductive sub thin wire 232) according to the present embodiment is divided by a lower bottom S3 having contact with the supporting base material 221, an upper bottom S1 arranged at a position facing to the lower bottom S3, a first inclined portion S2 extending between one end E2 of the lower bottom S3 and one end E1 of the upper bottom S1, and a second inclined portion S4 extending between the other end E4 of the lower bottom S3 and the other end E3 of the upper bottom S1 (refer to FIGS. 17A and 17B). In addition, the cross sectional area of the heat-generating conductor 230 (conductive main thin wire 231 and conductive sub thin wire 232) according to the present embodiment is substantially symmetrically formed with an axis passing through the center of the upper bottom S1 and the center of the lower bottom S3.

An inclination of the cross sectional area of the heat-generating conductor 230 (conductive main thin wire 231 and conductive sub thin wire 232) is expressed by each of an inclination of a straight line passing through the one end E2 of the lower bottom S3 and the one end E1 of the upper bottom S1 and an inclination of a straight line passing through the other end E4 of the lower bottom S3 and the other end E3 of the upper bottom S1.

As described above, in the conductive main thin wire 231 according to the present embodiment, the inclination of the cross sectional area of a large curvature portion (first large curvature portion) 31b with a relatively large curvature is larger than the inclination of the cross sectional area of a small curvature portion (first small curvature portion) 31a with a relatively small curvature. Therefore, an "inclination angle θ1" formed by each of a "straight line T1 passing through the one end E2 of the lower bottom S3 and the one end E1 of the upper bottom S1" and a "straight line T1 passing through the other end E4 of the lower bottom S3 and the other end E3 of the upper bottom S1" of the small curvature portion 231a illustrated in FIG. 17A and the lower bottom S3 and an "inclination angle θ2" formed by a "straight line T2 passing through the one end E2 of the lower bottom S3 and the one end E1 of the upper bottom S1" and a "straight line T2 passing through the other end E4 of the lower bottom S3 and the other end E3 of the upper bottom S1" of the large curvature portion 231*b* illustrated in FIG. 17B and the lower bottom S3 satisfy the following relational expression 1.

$$\theta 1 < \theta 2 \qquad \text{<Relational Expression 1>}$$

In addition, the heights of the cross sectional areas of the heat-generating conductors 230 (conductive main thin wire 231 and conductive sub thin wire 232) are almost the same. That is, an interval H1 between the upper bottom S1 and the lower bottom S3 of the cross sectional area of the small curvature portion 231*a* illustrated in FIG. 17A is equal to an interval H2 between the upper bottom S1 and the lower bottom S3 of the cross sectional area of the large curvature portion 231*b* illustrated in FIG. 17B, and the following relational expression 2 is satisfied.

$$H1 = H2 \qquad \text{<Relational Expression 2>}$$

A projection size P1 (refer to FIG. 17A) of the cross sectional area of the small curvature portion 231*a* on the supporting base material 221 is larger than a projection size P2 (refer to FIG. 17B) of the cross sectional area of the large curvature portion 231*b* on the supporting base material 221, and the following relational expression 3 is satisfied. That is, along the direction along a supporting surface of the supporting base material 221 (refer to X direction in FIGS. 17A and 17B), the "length of the entire cross sectional area (particularly, lower bottom S3 in the present embodiment) of the small curvature portion 231*a*" is longer than the "length of the entire cross sectional area (particularly, lower bottom S3 in the present embodiment) of the large curvature portion 231*b*".

$$P1 > P2 \qquad \text{<Relational Expression 3>}$$

Furthermore, the sum of a "projection size P3*a* of the first inclined portion S2" and a "projection size P3*b* of the second inclined portion S4" of the cross sectional area of the small curvature portion 231*a* on the supporting base material 221 is larger than the sum of a "projection size P4*a* of the first inclined portion S2" and a "projection size P4*b* of the second inclined portion S4" of the cross sectional area of the large curvature portion 231*b* on the supporting base material 221, and the following relational expression 4 is satisfied. That is, along the direction along the supporting surface of the supporting base material 221, the "sum of the lengths of the first inclined portion S2 and the second inclined portion S4 of the cross sectional area of the small curvature portion 231*a*" is larger than the "sum of the lengths of the first inclined portion S2 and the second inclined portion S4 of the cross sectional area of the large curvature portion 231*b*".

$$(P3a + P3b) > (P4a + P4b) \qquad \text{<Relational Expression 4>}$$

A projection size W1 of the upper bottom S1 of the cross sectional area of the small curvature portion 231*a* on the supporting base material 221 is larger than a projection size W2 of the upper bottom S1 of the cross sectional area of the large curvature portion 231*b* on the supporting base material 221.

An area of the cross sectional area of the small curvature portion 231*a* is larger than an area of the cross sectional area of the large curvature portion 231*b*.

As described above, according to the present embodiment, the shape and the size of the cross sectional area of each conductive thin wire (conductive main thin wire 231) is determined according to the curvature of the wire of the heat-generating conductor 230 (conductive thin wire), and generation of a beam of light and generation of glare can be prevented at a high level. That is, by forming the conductive main thin wire 231 with "a plurality of conductive thin wires irregularly arranged with various curvatures", generation of a beam of light that can be visually recognized can be effectively prevented.

Furthermore, by inclining the cross sectional area of the conductive main thin wire 231 with various angles (refer to "θ1" in FIG. 17A and "θ2" in FIG. 17B), glare such as dazzle and blur can be effectively prevented. Then, "by setting the inclination of the cross sectional area of the large curvature portion (large curvature portion 231*b*) of the cross sectional area of the conductive main thin wire 231 to be larger than the inclination of the cross sectional area of the small curvature portion (small curvature portion 231*a*)", "the prevention of generation of a beam of light" and "antiglare" can be achieved at a high level while avoiding disconnection of the conductive main thin wire 231.

The configuration of the conductive main thin wire 231 is effective for the conductive sub thin wire 232 (refer to FIG. 15), and it is preferable for the cross sectional area of the conductive sub thin wire 232 to similarly satisfy the relationship regarding the cross sectional area of the conductive main thin wire 231. Therefore, "the conductive sub thin wire 232 includes a plurality of conductive thin wires irregularly arranged as having various curvatures", "the conductive sub thin wire 232 includes a curved portion with a relatively large curvature (second large curvature portion) and a curved portion with a relatively small curvature (second small curvature portion)", "the cross sectional areas of the conductive sub thin wire 232 have inclinations with various angles", and "the inclination of the cross sectional area of the large curvature portion (second large curvature portion) of the cross sectional area of the conductive sub thin wire 232 is set to be larger than the inclination of the cross sectional area of the small curvature portion (second small curvature portion) so that "the prevention of generation of a beam of light" and "antiglare" can be achieved at a high level while avoiding disconnection of the conductive sub thin wire 232.

Figure 18:
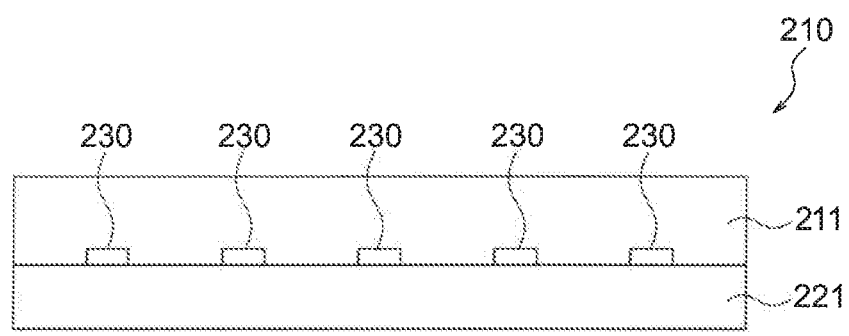
FIG. 18 is a cross-sectional view illustrating a modification of the heat-generating plate.

In addition, the structure of the heat-generating plate 210 is not limited to that illustrated in FIG. 14, and other layers may be added, and elements other than the heat-generating conductor 230 may be omitted. For example, as illustrated in FIG. 18, the first transparent plate 211 is directly laminated on the surface of the supporting base material 221 on which the heat-generating conductor 230 is provided so as to cover the heat-generating conductor 230, and the first transparent plate 211, the heat-generating conductor 230, and the supporting base material 221 may form the heat-generating plate 210. In addition, other function layer may be appropriately added to the heat-generating conductor 230 illustrated in FIG. 18.

<Manufacturing Method for Heat-Generating Plate 210>

Next, a manufacturing method for the heat-generating plate 210 will be described. The manufacturing method for the heat-generating plate 210 is not particularly limited. However, as an example, a method of forming a conductive thin wire (conductive main thin wire 231 and conductive sub thin wire 232) including a conductive layer and a dark color layer on the supporting base material 221 will be described below. In the following description, an example of a manufacturing method for the heat-generating plate 210 illustrated in FIG. 18 will be described. However, the heat-generating plate 210 having other structure (refer to FIG. 14) can be manufactured by appropriately applying the following manufacturing method.

FIGS. 19 to 25 are cross-sectional views for explaining an example of the manufacturing method for the heat-generating plate 210, and processes for manufacturing the heat-generating plate 210 will be sequentially described.

Figure 19:
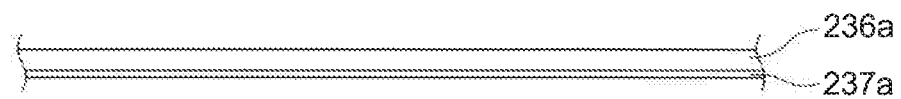
FIG. 19 is a cross-sectional view illustrating one process of a manufacturing method for the heat-generating plate.

First, as illustrated in FIG. 19, a dark color film 237*a* to be a first dark color layer of the heat-generating conductor 230 (conductive main thin wire 231 and conductive sub thin wire 232) is laminated on a copper foil film 236*a* which is a member to be a conductive layer of the heat-generating conductor 230 (conductive main thin wire 231 and conductive sub thin wire 232). A method for forming the copper foil film 236*a* is not particularly limited, and the copper foil film 236*a* can be formed by a known method. For example, the copper foil film 236*a* may be formed by one of or a combination of two or more of a plating method including electroplating and electroless plating, a sputtering method, a CVD method, a PVD method, and an ion plating method. A method for forming the dark color film 237*a* is not particularly limited, and the dark color film 237*a* can be formed by a known method. For example, the dark color film 237*a* can be formed on the copper foil film 236*a* by one of or a combination of two or more of a plating method including electroplating and electroless plating, a sputtering method, a CVD method, a PVD method, and an ion plating method. The dark color film 237*a* can be formed of various known materials and may be formed of, for example, copper nitride, copper oxide, or nickel nitride.

Figure 20:
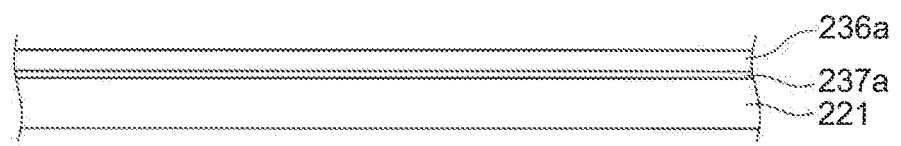
FIG. 20 is a cross-sectional view illustrating one process of the manufacturing method for the heat-generating plate.

Next, as illustrated in FIG. 20, a transparent supporting base material 221 is laminated on a surface opposite to the surface of the dark color film 237*a* on which the copper foil film 236*a* is laminated. The supporting base material 221 and the dark color film 237*a* may be surely bonded to each other by providing a bonding layer including an adhesive agent and an adhesive between the supporting base material 221 and the dark color film 237*a*. The supporting base material 221 may be formed of any member as long as the supporting base material 221 can appropriately support the heat-generating conductor 230, and for example, a biaxially stretched polyester resin such as polyethylene terephthalate and polyethylene naphthalate can be exemplified as a material of the supporting base material 221. However, in consideration of retention of the heat-generating conductor 230 and the like, it is preferable that the thickness of the supporting base material 221 be equal to or more than 30 μm and equal to or less than 150 μm.

Figure 21:
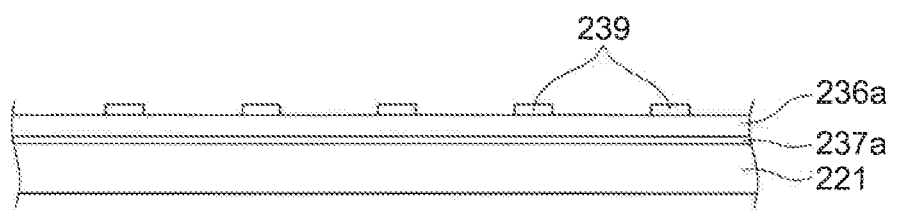
FIG. 21 is a cross-sectional view illustrating one process of the manufacturing method for the heat-generating plate.

Next, as illustrated in FIG. 21, a resist pattern 239 is provided on a surface of the copper foil film 236*a* opposite to the surface on which the dark color film 237*a* is laminated. The resist pattern 239 is arranged on the copper foil film 236*a* so as to finally have a shape corresponding to a wiring pattern (wiring shape) of the heat-generating conductor 230 to be formed on the supporting base material 221. That is, the resist pattern 239 is provided only on a portion of the copper foil film 236*a* that finally forms the heat-generating conductor 230 (conductive main thin wire 231 and conductive sub thin wire 232). The resist pattern 239 can be formed by patterning using a known photolithography technique. For example, in a case of using proximity exposure with a photomask, when a negative type photoresist is used, a desired resist pattern 239 can be formed on the copper foil film 236*a* by forming a shielding pattern on the photomask and performing patterning.

Figure 22:
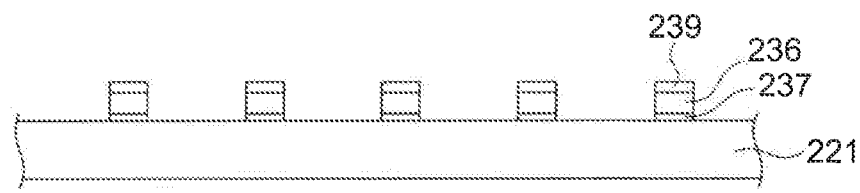
FIG. 22 is a cross-sectional view illustrating one process of the manufacturing method for the heat-generating plate.

Next, the resist pattern 239 is used as a mask, and the copper foil film 236*a* and the dark color film 237*a* are etched. By this etching, the copper foil film 236*a* and the dark color film 237*a* are patterned to have planar shapes substantially the same as the resist pattern 239. As a result of the patterning, as illustrated in FIG. 22, the conductive layer 236 to be a part of the conductive thin wire (conductive main thin wire 231 and conductive sub thin wire 232) is formed from the copper foil film 236*a*, and a first dark color layer 237 to be a part of the conductive thin wire (conductive main thin wire 231 and conductive sub thin wire 232) is formed from the dark color film 237*a*.

An etching method is not particularly limited, and a known method can be employed. For example, the copper foil film 236*a* and the dark color film 237*a* can be etched by wet etching using an etchant such as an aqueous ferric chloride solution or dry etching such as plasma etching.

Figure 23:
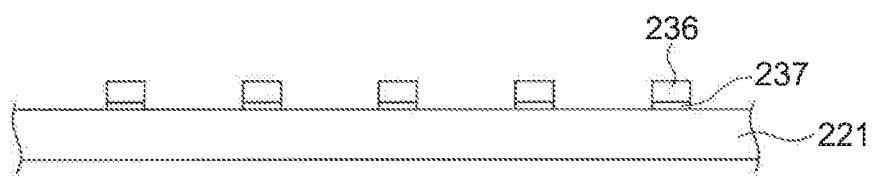
FIG. 23 is a cross-sectional view illustrating one process of the manufacturing method for the heat-generating plate.

Next, as illustrated in FIG. 23, the resist pattern 239 is removed by an arbitrary method. Accordingly, the heat-generating conductor 230 (conductive layer 236 and first dark color layer 237) wired on the supporting base material 221 in a predetermined pattern is obtained.

Figure 24:
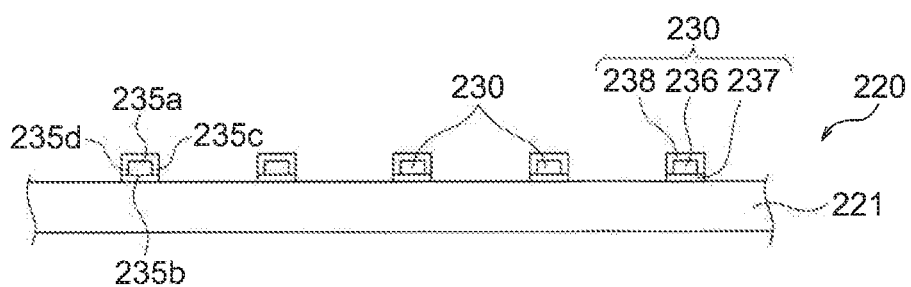
FIG. 24 is a cross-sectional view illustrating one process of the manufacturing method for the heat-generating plate.

Next, as illustrated in FIG. 24, a second dark color layer 238 is formed on a surface 235*a* of the conductive layer 236 opposite to the surface 235*b* on which the first dark color layer 237 is provided and on side surfaces 35*c* and 35*d* of the conductive layer 236. A method of forming the second dark color layer 238 is not particularly limited. For example, the dark color layer 238 can be formed from a part of the material forming the conductive layer 236 by performing darkening processing (blackening processing) on a part of the conductive layer 236. Since the conductive layer 236 according to the present embodiment is formed of copper (copper foil film 236*a*), the second dark color layer 238 formed of, for example, copper oxide or copper sulfide can be formed as a surface layer of the conductive layer 236.

Alternatively, a second dark color layer 238 such as a coating film of a dark color material, a plating layer of nickel or chromium, or a sputtered layer of copper oxide (CuO) or copper nitride may be additionally provided on the surface of the conductive layer 236. In a case where the second dark color layer 238 is additionally provided, the second dark color layer 238 may be provided on the conductive layer 236 after at least a part of the surfaces (surface 235*a* and side surfaces 235*c* and 235*d*) of the conductive layer 236 is roughened.

Through the series of processes (refer to FIGS. 19 to 24), the heat-generating conductor 230 (conductive main thin wire 231 and conductive sub thin wire 232) coated with the conductive layer 236 by the first dark color layer 237 and the second dark color layer 238 is formed on the supporting base material 221, and the conductor sheet 220 is produced. In this way, the heat-generating conductor 230 is formed on the supporting base material 221 separated from the first transparent plate 211 (refer to FIG. 18), and it is preferable that the supporting base material 221 have an appropriate thickness as a supporting member at the time when the heat-generating conductor 230 is formed, and the thickness to apply rigidity to the heat-generating plate 210 is not required for the supporting base material 221. Therefore, according to the series of manufacturing methods illustrated in FIGS. 19 to 24, a large number of heat-generating conductors 230 used for the plurality of heat-generating plates 210 can be sequentially formed on a long supporting base material 221, and the heat-generating conductor 230 can be manufactured at a very low cost than a conventional method for forming a heat-generating conductor for each heat-generating plate 210. In addition, according to the manufacturing method described above, since a part of the pair of bus bars 225 and the wiring portion 215 illustrated in FIG. 13 can be formed with the heat-generating conductor 230 by using the same material as the heat-generating conductor 230, the conductor sheet 220 and the heat-generating plate 210 can be inexpensively manufactured. Furthermore, according to the manufacturing method described above, a part of the pair of bus bars 225 and the wiring portion 215 can be integrally form with the heat-generating conductor 230 by using the same material as the heat-generating conductor 230. In this case, electrical connection from the heat-generating conductor 230 to the wiring portion 215 via the bus bars 225 can be more stably secured.

Next, the first transparent plate 211 is laminated on the surface of the supporting base material 221 on which the heat-generating conductor 230 (conductive layer 236, first dark color layer 237, and second dark color layer 238) is provided. FIG. 25 illustrates an example in which the first transparent plate 211 is formed by injection molding and bonded to the supporting base material 221. In the example illustrated in FIG. 25, the conductor sheet 220 is arranged in a cavity 241a of a mold 241 for injection molding. The conductor sheet 220 is arranged in the cavity 241a so that the surface of the supporting base material 221 on which the heat-generating conductor 230 is arranged faces inward of the cavity 241a and a resin supplied from a resin supply port 42 of the mold 241 to the cavity 241a is laminated on the "surface of the supporting base material 221 on which the heat-generating conductor 230 is arranged". Then, a resin such as acrylic which is heated and has fluidity is injected from the resin supply port 42 of the mold 241 to the cavity 241a and laminated on the supporting base material 221 and the heat-generating conductor 230 (conductive layer 236, first dark color layer 237, and second dark color layer 238). The resin injected into the cavity 241a is cooled in the cavity 241a and solidified on the supporting base material 221 and the heat-generating conductor 230, and finally forms the first transparent plate 211 to be bonded to the supporting base material 221 and the heat-generating conductor 230. According to the injection molding described above, even when the first transparent plate 211 (heat-generating plate 210) has a plate-like shape or curved plate-like shape, the first transparent plate 211 (heat-generating plate 210) can be easily and inexpensively formed on the conductor sheet 220 (supporting base material 221 and heat-generating conductor 230).

A primer layer to secure adhesiveness may be provided in advance on a surface of the conductor sheet 220 (supporting base material 221) on which the heat-generating conductor 230 is formed. In this case, the primer layer can improve adhesion between the conductor sheet 220 (supporting base material 221) and the first transparent plate 211.

According to the manufacturing method for the heat-generating plate 210 illustrated in FIGS. 19 to 25, the heat-generating conductor 230 can be arranged between the first transparent plate 211 and the supporting base material 221 relatively easily and reliably. In particular, by using the first transparent plate 211 as a covering member of the heat-generating conductor 230, it is not necessary to use glass having a large weight density as a supporting base material of the heat-generating conductor 230, and the weight of the heat-generating plate 210 can be largely reduced. In addition, since the heat-generating conductor 230 is formed on the supporting base material 221 that functions as a supporting member, the conductor sheet 220 that can be easily handled can be provided. Therefore, according to the series of manufacturing methods, based on a photolithography technique, the conductor sheet 220 can be easily and quickly formed typically in a role-to-role manner. In this way, according to the manufacturing method for the heat-generating plate 210 illustrated in FIGS. 19 to 25, the plurality of heat-generating conductors 230 can be continuously, efficiently and inexpensively manufactured, and the heat-generating plate 210 of which the weight is finally reduced can be inexpensively and stably manufactured.

Modification

The present invention is not limited to the embodiments, and various changes may be made to the embodiments.

Figure 25:
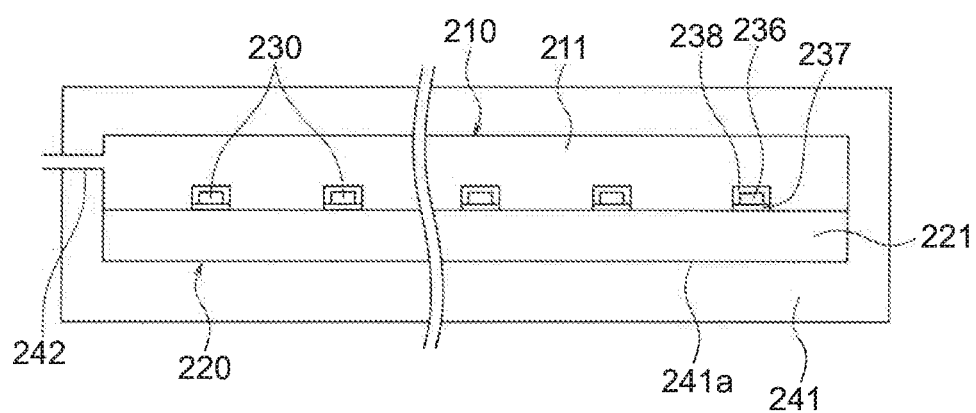
FIG. 25 is a cross-sectional view illustrating one process of the manufacturing method for the heat-generating plate.

For example, in the above manufacturing method, as illustrated in FIG. 25, although the heat-generating plate 210 is formed in which the supporting base material 221, the heat-generating conductor 230, and the first transparent plate 211 are sequentially laminated, other layers may be further laminated. For example, on at least one of "the surface of the first transparent plate 211 opposite to the surface bonded to the supporting base material 221" and "the surface of the supporting base material 221 (conductor sheet 220) opposite to the surface to be bonded to the first transparent plate 211", the other coating layer may be laminated.

Figure 26:
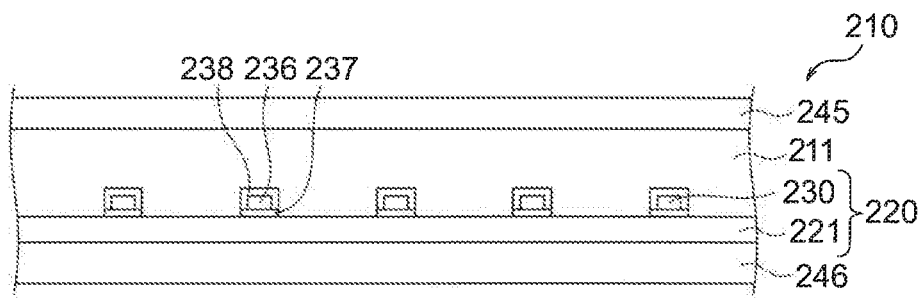
FIG. 26 is a cross-sectional view illustrating another modification of the heat-generating plate.

FIG. 26 is a cross-sectional view illustrating another modification of the heat-generating plate 210. In addition of the supporting base material 221, the heat-generating conductor 230, and the first transparent plate 211 (refer to FIG. 25), the heat-generating plate 210 of this example further includes a transparent coating layer 245 for coating the first transparent plate 211 from a side opposite to the conductor sheet 220 and a transparent coating layer 246 for covering the conductor sheet 220 from a side opposite to the first transparent plate 211. The coating layers 245 and 246 forming a surface layer (outermost surface) of the heat-generating plate 210 function as a hard coating layer having scratch resistance and protect the first transparent plate 211 and the conductor sheet 220 to improve durability of the heat-generating plate 210. These coating layers 245 and 246 can be formed by using, for example, a known acrylic ultraviolet curable resin. That is, on each of the first transparent plate 211 and the conductor sheet 220 (supporting base material 221), a composition including a monomer of an acrylic ultraviolet curable resin, a prepolymer, or both of them, and a photopolymerization initiator is coated in a film-like shape. Then, by irradiating the coated film with ultraviolet rays and curing the coated film by crosslinking reaction or polymerization, a cured resin is obtained. The cured resin layer obtained in this way can be used as the coating layers 245 and 246 that function as hard coating layers.

In the above embodiment (for example, refer to FIG. 25), although the first transparent plate 211 is laminated on the conductor sheet 220 (supporting base material 221 and heat-generating conductor 230) so as to face to the surface of the conductor sheet 220 on which the heat-generating conductor 230 is provided, the arranged position of the first transparent plate 211 is not limited to this.

Figure 27:
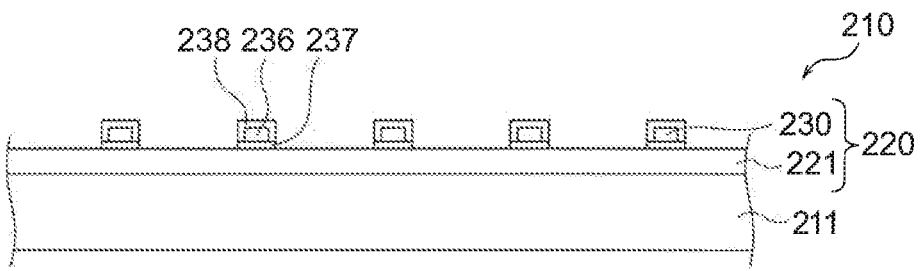
FIG. 27 is a cross-sectional view illustrating still another modification of the heat-generating plate.

FIG. 27 is a cross-sectional view illustrating still another modification of the heat-generating plate 210. In the heat-generating plate 210 in this example, the first transparent plate 211 is laminated on the conductor sheet 220 (supporting base material 221) so as to face to a surface opposite to the surface of the conductor sheet 220 (supporting base material 221) on which the heat-generating conductor 230 is provided. In this example, since the heat-generating conductor 230 is exposed outside without being coated with the first transparent plate 211, there is a possibility that an external force such as an impact acts on and disconnects the heat-generating conductor 230 and the heat-generating conductor 230 rusts due to moisture in the air or the like. Therefore, in a case where the heat-generating conductor 230 is not coated with the first transparent plate 211, it is preferable that the heat-generating conductor 230 is coated with another coating layer to prevent exposure of the heat-generating conductor 230 to the outside.

Figure 28:
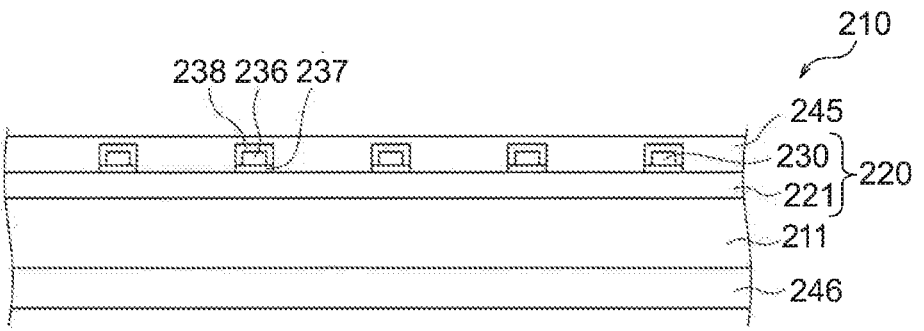
FIG. 28 is a cross-sectional view illustrating yet another modification of the heat-generating plate.

FIG. 28 is a cross-sectional view illustrating yet another modification of the heat-generating plate 210. The heat-generating plate 210 of this example can be obtained by applying the coating layers 245 and 246 illustrated in FIG. 26 to the heat-generating plate 210 illustrated in FIG. 27. That is, the coating layer 245 is provided on the surface of the conductor sheet 220 (supporting base material 221) on which the heat-generating conductor 230 is provided, and the heat-generating conductor 230 is coated with the coating layer 245. With the coating layer 245, the heat-generating conductor 230 is separated from outside and is protected, disconnection and rust of the heat-generating conductor 230 can be prevented. Furthermore, the coating layer 246 is provided on the surface of the first transparent plate 211 opposite to the surface on which the supporting base material 221 is provided, and the first transparent plate 211 is coated with the coating layer 246. As a result, the first transparent plate 211 is separated from outside and is protected, and durability of the heat-generating plate 210 can be improved.

In addition, at least one of layers of the heat-generating plate 210 may include ultraviolet ray absorber dispersed therein. In this case, since the ultraviolet ray absorber absorbs ultraviolet rays and an amount of ultraviolet rays, entering from outside, on the inner side of the layer including the ultraviolet ray absorber is reduced, deterioration such as yellowing caused by ultraviolet rays caused in a member on the inner side of the layer including the ultraviolet ray absorber can be effectively prevented. That is, by including the ultraviolet ray absorber in the heat-generating plate 210, the light resistance property of the heat-generating plate 210 can be improved. As an example of the ultraviolet ray absorber, benzotriazole-based compounds and benzophenone-based compounds can be exemplified. It is preferable that a mass ratio of the ultraviolet ray absorber in the layer including the ultraviolet ray absorber be 0.5 to 5.0 mass %.

In a case where a coating layer is provided on the heat-generating plate 210, a moisture permeability of the coating layer may be lower than that of the supporting base material 221. By a coating layer with a low moisture permeability, it is possible to effectively prevent water vapor from reaching the heat-generating conductor 230 (conductive main thin wire 231 and conductive sub thin wire 232), and deterioration in the heat-generating conductor 230 (conductive main thin wire 231 and conductive sub thin wire 232) due to rust can be prevented. The moisture permeability can be measured by a method specified in JISZ0208.

Furthermore, the heat-generating plate 210 may have a curved shape, a plate-like shape, and other shape according to the application.

Furthermore, in the above embodiment, an example in which an acrylic resin is used as a material of the first transparent plate 211 has been described. However, the present invention is not limited to this example. For example, a polyolefin resin, a polycarbonate resin, a vinyl chloride resin, or the like may be used as the material of the first transparent plate 211.

Furthermore, in the above embodiment, regarding a method for laminating the first transparent plate 211 and the conductor sheet 220, an example is illustrated in which the first transparent plate 211 and the conductor sheet 220 are laminated and integrated (refer to FIG. 25) by injection-molding and filling a melt of the resin forming the first transparent plate 211 into the cavity, after arranging the conductor sheet 220 in the mold cavity for molding the first transparent plate 211 in advance. However, the present invention is not limited to this. For example, the first transparent plate 211 and the conductor sheet 220 may be laminated and integrated by preparing the previously molded first transparent plate 211 and bonding the conductor sheet 220 on one of the surfaces of the first transparent plate 211 via an adhesive layer. As a specific example, the heat-generating plate 210 illustrated in FIG. 24 can be produced by heating and pressurizing the first transparent plate 211 and the second transparent plate 212 to bond these plates to the conductor sheet 220 via the first bonding layer 213 and the second bonding layer 214 formed of polyvinyl butyral (PVB).

The heat-generating plate 210 may be used not only for a window of the automobile 201 but also for windows and doors of vehicles other than the automobile 201 (for example, train, aircraft, ship and spacecraft).

In addition, the heat-generating plate 210 can be applied to anything other than the vehicles and can be appropriately used for a "place for dividing a space (for example, indoor and outdoor)" such as windows for buildings such as shops and houses.

Furthermore, the embodiments and the modifications may be appropriately combined.

Fourth Embodiment

In the present specification, terms of "plate", "sheet", and "film" are not distinguished from each other only based on a difference in the name. For example, "a sheet with a conductor" is a concept including a member which can be called as plate and film. Therefore, the "sheet with a conductor" is not distinguished from members called as "a plate (substrate) with a conductor" and "a film with a conductor" only based on only the difference in the name. The "conductive pattern sheet" is not distinguished from a member called as a "conductive pattern plate (substrate)" and a "conductive pattern film" only based on the difference in the name.

In addition, in the present specification, a "sheet surface (plate surface and film surface)" indicates a surface that coincides with a planar direction of a sheet-like member to be a target (plate-like member and film-like member) in a case where an entire sheet-like member to be a target (plate-like and film-like) is viewed from a large perspective. Furthermore, a normal direction relative to a sheet-like member (plate-like and film-like) indicates a normal direction along a sheet surface (film surface and plate surface) of the sheet-like (plate-like and film-like) member.

In addition, terms used herein for specifying shapes and geometrical conditions and degrees thereof, for example, terms of "parallel", "perpendicular", "same" and values of lengths and angles are not limited to strict meanings and are interpreted as a including a range of terms that can be expected to have a similar function.

Figure 29:
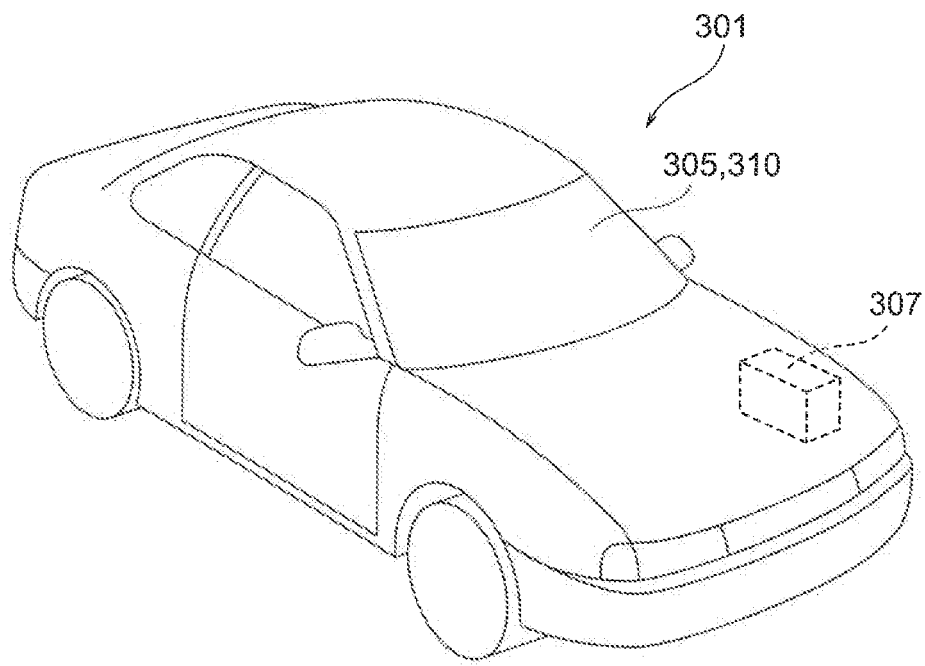
FIG. 29 is a view for explaining an embodiment according to the present invention and is a perspective view schematically illustrating a vehicle including a heat-generating plate. Particularly, in FIG. 29, an automobile including a front window configured by the heat-generating plate is schematically illustrated as an example of the vehicle.

FIGS. 29 to 43 are views for explaining one embodiment of the present invention. FIG. 29 is a view schematically illustrating an automobile including a heat-generating plate, FIG. 30 is a view of the heat-generating plate viewed from the normal direction of the plate surface, and FIG. 31 is a cross-sectional view of the heat-generating plate in FIG. 30.

As illustrated in FIG. 29, an automobile 301 as an example of a vehicle includes a window glass such as a front window, a rear window, and a side window. Here, an example in which a front window 305 is configured by a heat-generating plate 310 will be described. In addition, the automobile 301 includes a power supply 307 such as a battery.

Figure 30:
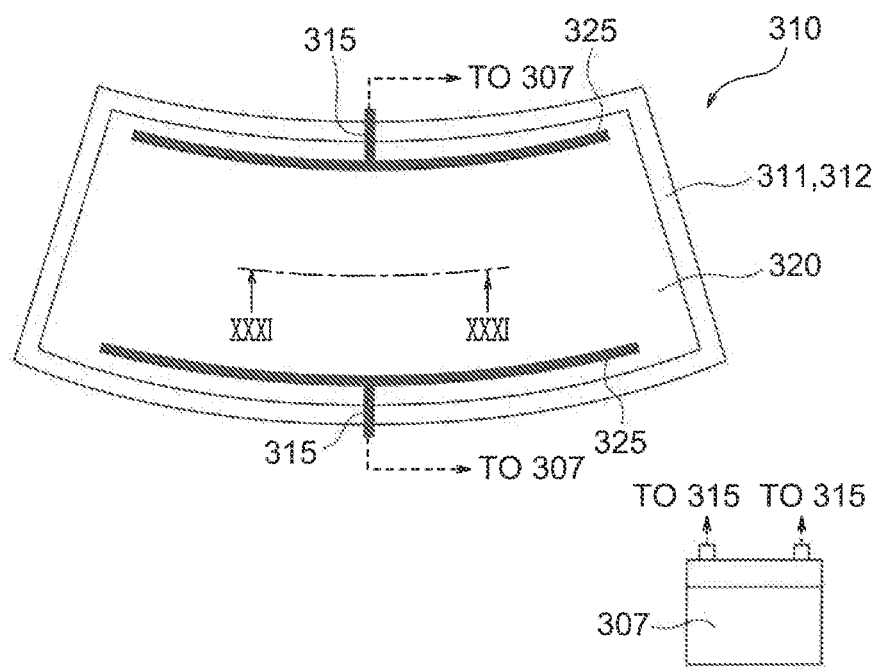
FIG. 30 is a view illustrating the heat-generating plate from a normal direction of a plate surface.
Figure 31:
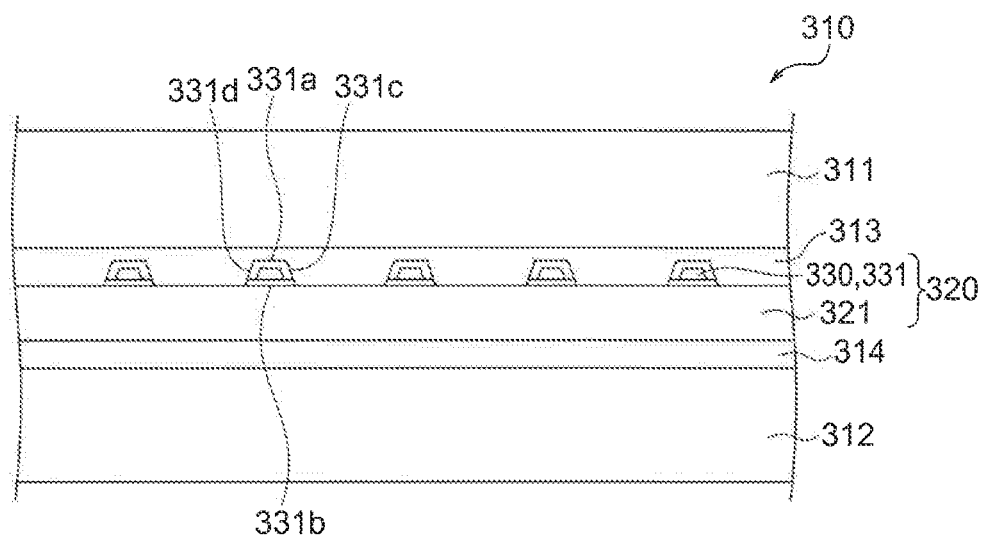
FIG. 31 is a cross-sectional view of the heat-generating plate taken along a line XXXI-XXXI in FIG. 30.

As illustrated in FIGS. 30 and 31, the heat-generating plate 310 according to the present embodiment includes a pair of glasses 311 and 312, a sheet with a conductor 320 arranged between the pair of glasses 311 and 312, and a pair of bonding layers 313 and 314 for bonding the respective glasses 311 and 312 to the sheet with a conductor 320. In the examples illustrated in FIGS. 29 and 30, the heat-generating plate 310 and the glasses 311 and 312 are curved. However, in other drawings, for easy understanding, the heat-generating plate 310 and the glasses 311 and 312 having plate-like shapes are illustrated.

The sheet with a conductor 320 includes a base film 321, a bus bar 325, and a heat-generating conductor 330 provided on a surface of the base film 321 facing to the glass 311 and including a conductive thin wire 331.

As illustrated in FIG. 30, the heat-generating plate 310 includes a wiring portion 315 for energizing the heat-generating conductor 330 of the sheet with a conductor 320 via the bus bar 325. In the illustrated example, the power supply 307 such as a battery supplies power to the heat-generating conductor 330 via the wiring portion 315 and the bus bar 325, and the conductive thin wire 331 of the heat-generating conductor 330 are heated by resistance heating. Heat generated by the heat-generating conductor 330 is transmitted to the glasses 311 and 312 and heat the glasses 311 and 312. As a result, fogging due to dew condensation attached on the glasses 311 and 312 can be removed. In a case where snow or ice is attached on the glasses 311 and 312, snow and ice can be melted. Therefore, a passenger's visibility is preferably secured.

Each component of the heat-generating plate 310 will be described below.

First, the glasses 311 and 312 will be described. When the glasses 311 and 312 are used for a front window of an automobile as in the example illustrated in FIG. 29, it is preferable to use a glass with a high visible light transmittance so as not to interfere the field of view of a passenger. As a material of the glasses 311 and 312, soda-lime glass and blue plate glass can be used. It is preferable that a transmittance of the glasses 311 and 312 in a visible light region be equal to or higher than 90%. Here, the visible light transmittance of the glasses 311 and 312 are specified as an average value of transmittances in respective wavelength when the transmittance is measured by a spectrophotometer ("UV-3100PC" manufactured by SHIMADZU CORPORATION, conforming to JIS K 0115) within a measurement wavelength range of 380 nm to 780 nm. The visible light transmittance may be lowered by coloring a part of or all of the glasses 311 and 312. In this case, direct sunlight can be shielded, and it is possible to make it difficult to visually recognize an interior of the vehicle from the outside of the vehicle.

Furthermore, it is preferable that the glasses 311 and 312 have a thickness of equal to or more than 1 mm and equal to or less than 5 mm. With such a thickness, the glasses 311 and 312 having excellent strength and optical characteristics can be obtained. The pair of glasses 311 and 312 may be formed of the same material and with the same structure, or at least one of the material and the structure may be different.

Next, the bonding layers 313 and 314 will be described. The first bonding layer 313 is arranged between the first glass 311 and the sheet with a conductor 320 and bonds the glass 311 to the sheet with a conductor 320. The second bonding layer 314 is arranged between the second glass 312 and the sheet with a conductor 320 and bonds the glass 312 to the sheet with a conductor 320.

As such bonding layers 313 and 314, a layer formed of a material having various adhesiveness and viscosity can be used. Furthermore, it is preferable to use a material having a high visible light transmittance for the bonding layers 313 and 314. As a typical bonding layer, a layer formed of polyvinyl butyral (PVB) can be exemplified. It is preferable that the thickness of each of the bonding layers 313 and 314 be equal to or more than 0.15 mm and equal to or less than 1 mm. The pair of bonding layers 313 and 314 may be formed of the same material and with the same structure, or at least one of the material and the structure may be different.

The heat-generating plate 310 is not limited to the illustrated example, and other function layer that is expected to perform a specific function may be provided. Furthermore, one function layer may perform two or more functions, and for example, some function may be added to at least one of the glasses 311 and 312 of the heat-generating plate 310, the bonding layers 313 and 314, and the base film 321 of the sheet with a conductor 320 to be described later. As an example of the function that can be applied to the heat-generating plate 310, an anti-reflection (AR) function, a hard coating (HG) function having scratch resistance, an infrared ray shielding (reflection) function, an ultraviolet ray shielding (reflection) function, and an antifouling function can be exemplified.

Next, the sheet with a conductor 320 will be described. The sheet with a conductor 320 includes a base film 321, a bus bar 325, and a heat-generating conductor 330 provided on a surface of the base film 321 facing to the glass 311 and including a conductive thin wire 331. The sheet with a conductor 320 may have substantially the same planer dimensions as the glasses 311 and 312 and be arranged across the entire heat-generating plate 310 and may be arranged on a part of the heat-generating plate 310 such as a front portion of a driver's seat in the example in FIG. 29.

The base film 321 functions as a base material for supporting the heat-generating conductor 330. The base film 321 is a so-called transparent electrically insulating substrate for transmitting light with a wavelength in a visible light wavelength band (380 nm to 780 nm). As the base film 321, any material can be used as long as the material can transmit visible light and appropriately support the heat-generating conductor 330. For example, polyethylene terephthalate, polyethylene naphthalate, polycarbonate, polystyrene, and cyclic polyolefine can be exemplified. In consideration of light transmittance and appropriate supporting property of the heat-generating conductor 330, it is preferable that the thickness of the base film 321 be equal to or more than 0.03 mm and equal to or less than 0.20 mm.

Figure 32:
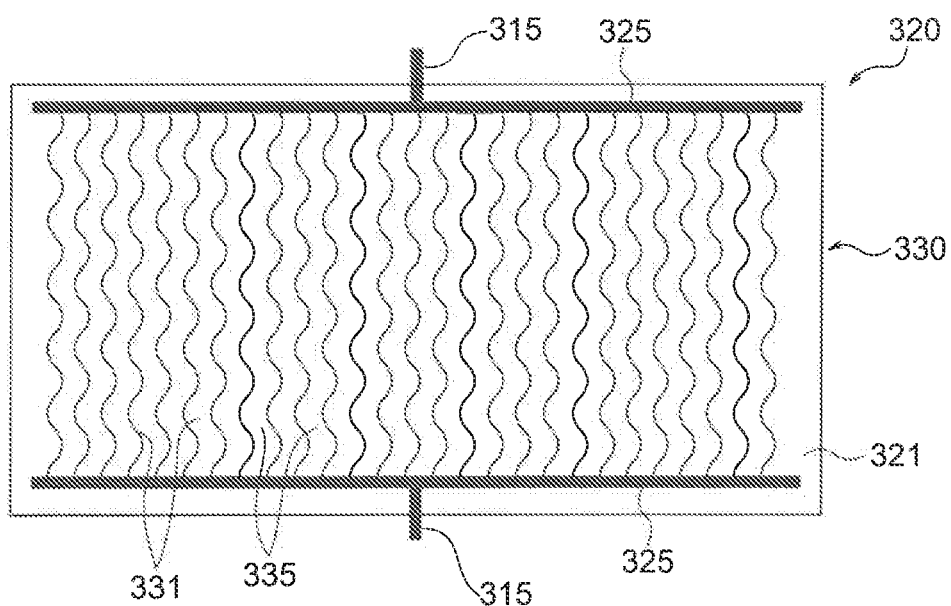
FIG. 32 is a plan view illustrating a sheet with a conductor from a normal direction of a sheet surface and is a plan view of an example of the sheet with a conductor.

Next, the heat-generating conductor 330 will be described with reference to FIG. 32. FIG. 32 is a plan view illustrating the heat-generating conductor 330 from the normal direction of the sheet surface. FIG. 32 is a view illustrating an exemplary arrangement of the heat-generating conductor 330.

As illustrated in FIG. 32, the heat-generating conductor 330 includes a plurality of linear conductive thin wires 331 for coupling the pair of bus bars 325. The conductive thin wire 331 is energized from the power supply 307 such as a battery via the wiring portion 315 and the bus bars 325 and generates heat by resistance heating. Then, the heat is transmitted to the glasses 311 and 312 via the bonding layers 313 and 314 so as to heat the glasses 311 and 312.

In the example illustrated in FIG. 32, the plurality of conductive thin wires 331 extends from one of the bus bars 325 to the other bus bar 325. The plurality of conductive thin wires 331 is arranged separated from each other. In particular, the plurality of conductive thin wires 331 is arranged along a direction perpendicular to the extending direction of the conductive thin wires 331. A gap 335 is formed between two adjacent conductive thin wires 331.

As a material forming the heat-generating conductor 330, for example, one or more alloys of two or more kinds of metals selected from among metals including gold, silver, copper, platinum, aluminum, chromium, molybdenum, nickel, titanium, palladium, indium, and tungsten and nickel-chromium alloy, and bronze can be exemplified.

The heat-generating conductor 330 may be formed by using an opaque metal material as described above. On the other hand, the conductive thin wire 331 of the heat-generating conductor 330 is formed with a high uncoating ratio of about equal to or higher than 70% and equal to or lower than 99.8%. Therefore, an entire region, in which the conductive thin wire 331 and the coupling conductive thin wire 332 of the heat-generating conductor 330 are formed, is transparent and does not impair visibility.

In the example illustrated in FIG. 31, the conductive thin wire 331 has a substantially trapezoidal cross section as a whole. More precisely, the side surface of the conductive thin wire 331 has a concave curved shape to be etched in a manufacturing process to be described later. It is preferable that a width W of a bottom portion of the conductive thin wire 331, that is, a length along the plate surface of the heat-generating plate 310 be equal to or longer than 11 μm and equal to or shorter than 20 μm and a height (thickness) H, that is, a height (thickness) along a normal direction to the plate surface of the heat-generating plate 310 be equal to or more than 1 μm and equal to or less than 60 μm. According to the conductive thin wire 331 having such a size, since the conductive thin wire 331 is sufficiently thinned, the heat-generating conductor 330 can be effectively made invisible.

As illustrated in FIG. 31, the conductive thin wire 331 includes a conductive metal layer 336, a first dark color layer 337 that covers the surface of the conductive metal layer 336 facing to the base film 321, and a second dark color layer 338 that covers the surface of the conductive metal layer 336 facing to the glass 311 and side surfaces.

The conductive metal layer 336 formed of a metal material having excellent conductivity has a relatively high reflectance. When the conductive metal layer 336 forming the conductive thin wire 331 of the heat-generating conductor 330 reflects light, the reflected light is visually recognized, and the light may interfere a field of view of a passenger. Furthermore, when the conductive metal layer 336 is visually recognized from outside, design may be deteriorated. Thus, the first and second dark color layers 337 and 338 are arranged on at least a part of the surface of the conductive metal layer 336. It is preferable that the first and second dark color layers 337 and 338 be having lower reflectance of visible light than the conductive metal layer 336, for example, the first and second dark color layers 337 and 338 are layers of dark colors such as black. With the dark color layers 337 and 338, the conductive metal layer 336 is hardly and visually recognized, and a passenger's visibility is preferably secured. In addition, the deterioration in the design when the viewed from outside can be prevented.

As described above, the conductive thin wire 331 of the heat-generating conductor 330 is formed on the base film 321 with a high uncoating ratio from viewpoint of securing visually transmitting performance and visibility. Therefore, as illustrated in FIG. 31, the bonding layer 313 has contact with the base film 321 of the sheet with a conductor 320 via a non-covered portion of the conductive thin wire 331, that is, a region between the adjacent conductive thin wires 331. Therefore, the heat-generating conductor 330 is embedded in the bonding layer 313.

Figure 33:
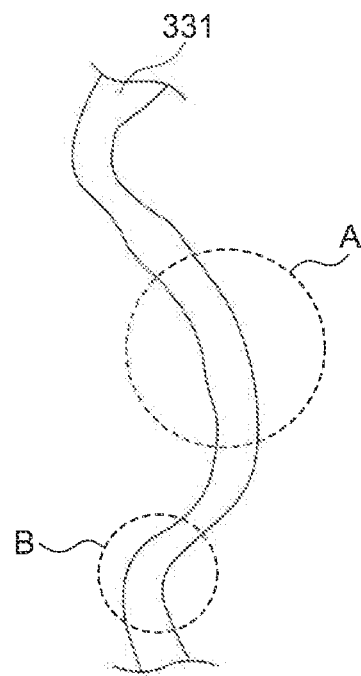
FIG. 33 is a plan view in which a part of a conductive thin wire is enlarged and illustrated.

Incidentally, in FIG. 33, an enlarged view of a part of the conductive thin wire 331 viewed from the normal direction of the sheet surface is illustrated. As a result of intensive investigation by the inventors of the present invention, as illustrated in FIG. 33, conductive thin wires 331 of a heat-generating conductor 330 that have been actually produced are distributed in a line width W along the longitudinal direction. Such a tendency has remarkably occurred in the heat-generating conductor 330 of the sheet with a conductor 320 produced by a manufacturing method to be described later with reference to FIGS. 35 to 43. When the inventors of the present invention have examined a relationship between a fluctuation of the line width W and disconnection of the conductive thin wire 331, it has been confirmed that the fluctuation of the line width W strongly affects on how easily the conductive thin wire 331 is disconnected. As a result of confirmation by the inventors of the present invention, when it is assumed that an average of the width W of the conductive thin wire 331 be $W_{ave}$ and a standard deviation be a, in a case where the width W is distributed so as to satisfy the following formula(a), the width of the conductive thin wire 331 can be set within a range in which the conductive thin wire 331 of the heat-generating conductor 330 is hardly disconnected and the conductive thin wire 331 is not visually recognized.

$$0 \leq 4\delta/W_{ave} \leq 0.3 \qquad \text{Formula(a)}$$

Figure 34:
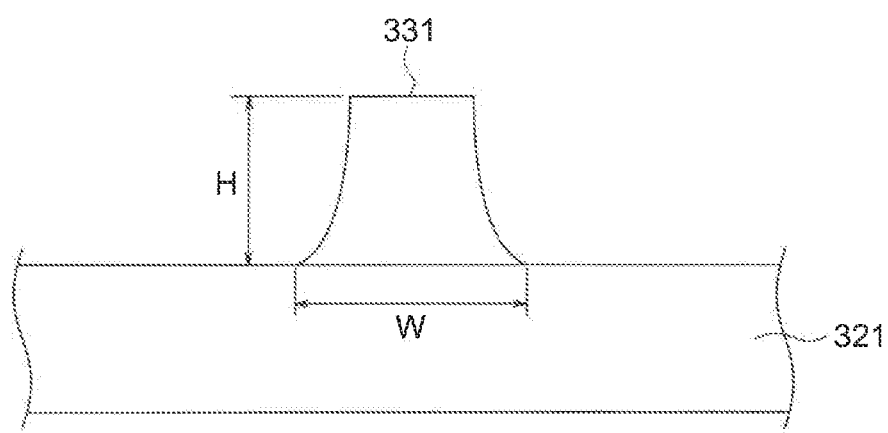
FIG. 34 is an enlarged cross-sectional view of the sheet with a conductor.

FIG. 34 is an enlarged view of the conductive thin wire 331 on the sheet with a conductor 320 viewed from the cross sectional area. In FIG. 34, the conductive metal layer and the dark color layers are omitted. The conductive thin wire 331 illustrated in FIG. 34 indicates the cross section of the conductive thin wire 331 produced by a manufacturing method to be described later. In the example illustrated in FIG. 34, the width W of the conductive thin wire 331 different at each position along the normal direction of the sheet with a conductor 320. In the example illustrated in FIG. 34, the width W of the conductive thin wire 331 is different at each position along the normal direction of the sheet with a conductor 320. In the conductive thin wire 331 of which the width W fluctuates along the normal direction of the sheet with a conductor 320, the width W of the conductive thin wire 331 indicates the maximum width of each cross section that easily affects the disconnection and visualization. That is, in the example illustrated in FIG. 34, the width W of the conductive thin wire 331 indicates a width of a bottom portion closest to the base film 321.

Furthermore, as illustrated in FIG. 33, the conductive thin wire 331 has a curved line portion, and not only the width of the curved portion but also a curvature is not constant. In particular, in the illustrated example, the conductive thin wire 331 is formed by only curved line portions. Since the conductive thin wire 331 has the curved line portions, generation of a strong streaky light in a specific direction caused by diffraction in the conductive thin wire 331, that is, a beam of light can be effectively made inconspicuous.

As illustrated in FIG. 33, the curvature of the curved line portion of the conductive thin wire 331 is not constant. Especially, the conductive thin wire 331 includes a "portion with a relatively small curvature (small curvature portion, refer to reference numeral "A" in FIG. 33)" and a "portion with a relatively large curvature (first large curvature portion, refer to reference numeral "B" in FIG. 33)" of which respective widths W of the conductive thin wire 331 are different from each other. The width W of the conductive thin wire 331 is large in a small curvature portion A with a relatively small curvature and is small in a large curvature portion B with a relatively large curvature. As a result of intensive research by the inventors of the present invention, by making the width W of the conductive thin wire 331 be large in the small curvature portion A and be small in the large curvature portion B, it can be effectively prevented that the small curvature portion A is visually recognized as dots, and as a result, the heat-generating conductor 330 can be effectively made invisible.

Figure 39:
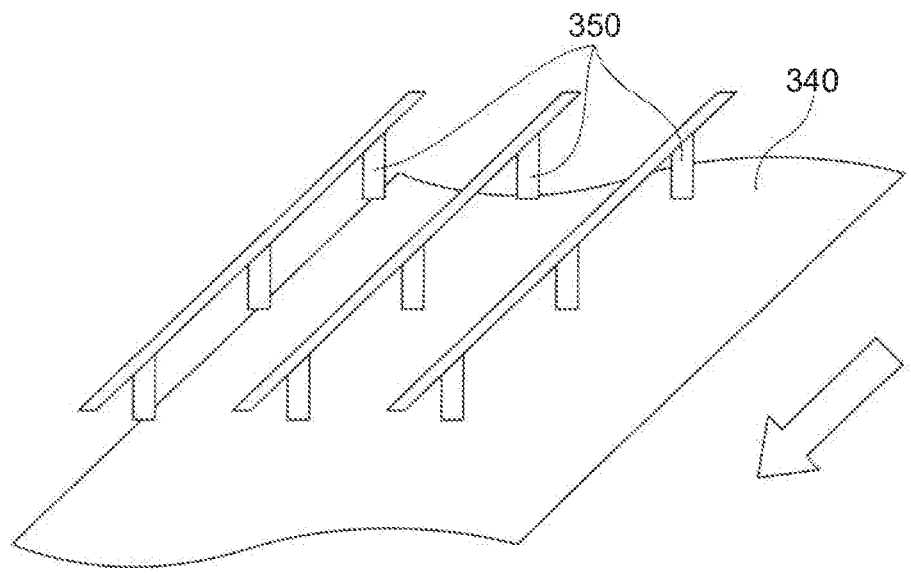
FIG. 39 is a view for explaining an example of the manufacturing method for the heat-generating plate.
Figure 40:
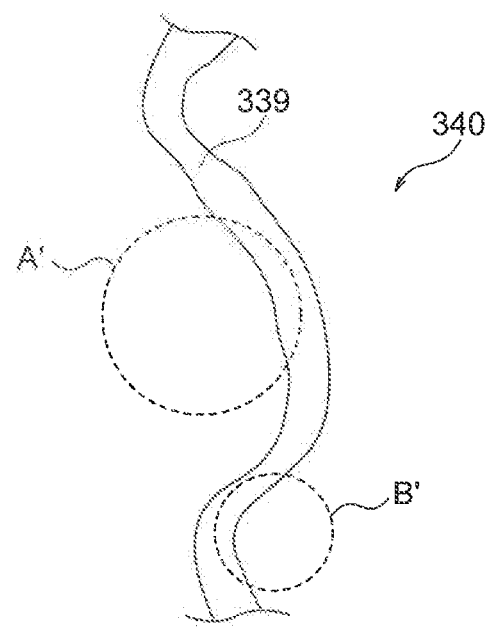
FIG. 40 is a view for explaining an example of the manufacturing method for the heat-generating plate.

Next, an example of a manufacturing method for the heat-generating plate 310 will be described with reference to FIGS. 35 to 43. FIGS. 35 to 38 and FIGS. 41 to 43 are cross-sectional views sequentially illustrating the example of the manufacturing method for the heat-generating plate 310. FIGS. 39 and 40 are views for explaining spread of an etchant for etching to be described later.

Figure 35:
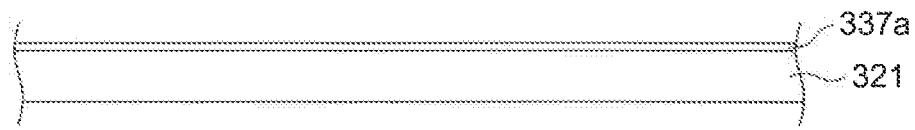
FIG. 35 is a view for explaining an example of a manufacturing method for a heat-generating plate.

First, as illustrated in FIG. 35, a dark color film 337a that forms the first dark color layer 337 is formed on the base film 321. As the base film 321, any material can be used as long as the material can appropriately hold the heat-generating conductor 330. For example, polyethylene terephthalate, polyethylene naphthalate, polycarbonate, polystyrene, and cyclic polyolefine can be exemplified. In consideration of retention of the heat-generating conductor 330 and the like, it is preferable to use the base film 321 having the thickness of equal to or more than 30 μm and equal to or less than 150 μm. Furthermore, the dark color film 337a can be provided, for example, by a plating method including electroplating and electroless plating, a sputtering method, a CVD method, a PVD method, and an ion plating method or a method of combination of two or more methods described above. As a material of the dark color film 337a, various known materials can be used. For example, copper nitride, copper oxide, nickel nitride can be used.

Figure 36:
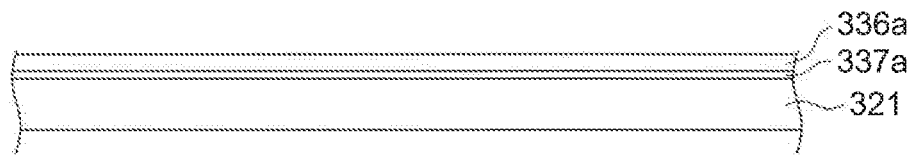
FIG. 36 is a view for explaining an example of the manufacturing method for the heat-generating plate.

Next, as illustrated in FIG. 36, a metal film 336a that forms the conductive metal layer 336 is provided on the dark color film 337a. As already described as a material forming the conductive metal layer 336, the metal film 336a may be formed by using one or more of gold, silver, copper, platinum, aluminum, chromium, molybdenum, nickel, titanium, palladium, indium, and tungsten, and an alloy of these metals. The metal film 336a may be formed by a known method. For example, a method of bonding a metal foil such as a copper foil, a plating method including electroplating and electroless plating, a sputtering method, a CVD method, a PVD method, an ion plating method, or a method of combination of two or more methods described above can be employed.

Figure 37:
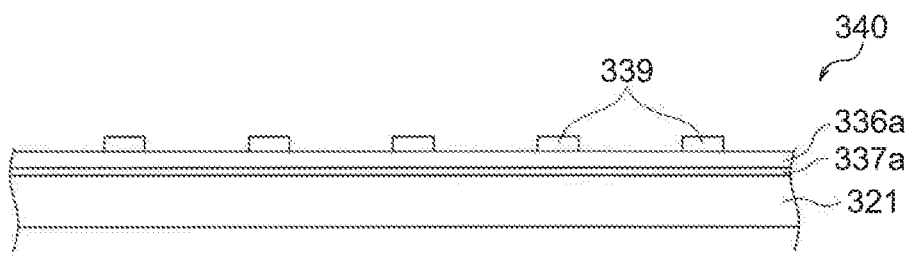
FIG. 37 is a view for explaining an example of the manufacturing method for the heat-generating plate.

Next, as illustrated in FIG. 37, a resist pattern 339 is provided on the metal film 336a, and an etched material (in illustrated example, sheet-like member to be etched) 340 is created. The resist pattern 339 has a shape corresponding to the heat-generating conductor 330 to be formed. In the method described here, the resist pattern 339 is provided only on a portion finally forming the heat-generating conductor 330. The resist pattern 339 can be formed by patterning using a known photolithography technique.

Figure 38:
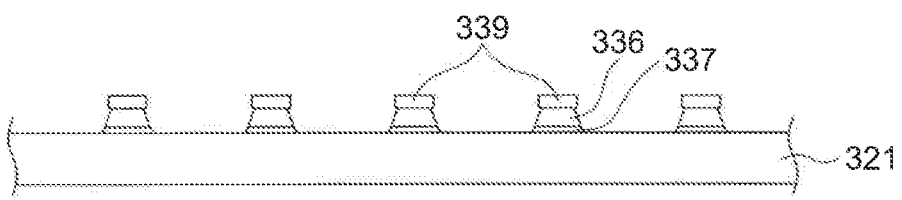
FIG. 38 is a view for explaining an example of the manufacturing method for the heat-generating plate.

Next, as illustrated in FIG. 38, the metal film 336a and the dark color film 337a of the etched material 340 are etched using the resist pattern 339 as a mask. By this etching, the metal film 336a and the dark color film 337a are patterned to substantially the same pattern as the resist pattern 339. As a result, the conductive metal layer 336 that will form a part of the conductive thin wire 331 is formed from the patterned metal film 336a. The first dark color layer 337 that will form a part of the conductive thin wire 331 and coupling conductive thin wire 332 is formed from the patterned dark color film 337a.

Here, an etching method will be described with reference to FIGS. 39 and 40. First, as illustrated in FIG. 39, the etched material (in illustrated example, sheet-like member to be etched) 340 is moved in a direction of an arrow. At this time, an extending direction of the resist pattern 339, that is, an extending direction of the conductive metal layer 336 generated after etching is corresponded to a traveling direction of the etched material 340. Then, to the moving etched material 340, the etchant is spread from a spray 350 provided above the etched material 340. At this time, while the spray 350 is vertically shaken relative to the traveling direction of the etched material 340, the etchant is spread. According to this aspect, the etchant can be uniformly spread in a direction perpendicular to the extending direction of the resist pattern 339. Furthermore, by adjusting an amount of spread etchant from the spray 350 and a traveling speed of the etched material 340, a degree of progress of etching relative to the entire etched material 340 can be adjusted.

When the etchant is spread as described above, since the etchant remains diffused in a portion of the resist pattern 339 with a small curvature as a region A' in FIG. 40, the progress of etching is relatively slow. Therefore, finally, the width of the conductive metal layer 336 forming the conductive thin wire 331 is widened. That is, in the small curvature portion A illustrated in FIG. 33, the line width W of the conductive thin wire 331 is relatively wider. On the other hand, since the etchant concentrates in a portion of the resist pattern 339 with a large curvature as a region B', the progress of etching is relatively fast. Therefore, finally, the width of the conductive metal layer 336 forming the conductive thin wire 331 is narrowed. That is, in the large curvature portion B illustrated in FIG. 33, the line width W of the conductive thin wire 331 is relatively thinner. That is, with the etching method illustrated in FIG. 39, by adjusting the amount of spread etchant from the spray 350 and the traveling direction of the etched material 340, the width W of the conductive thin wire 331 can be controlled according to the curvature of the resist pattern 339, that is, the curvature of the conductive thin wire 331 to be formed.

Figure 41:
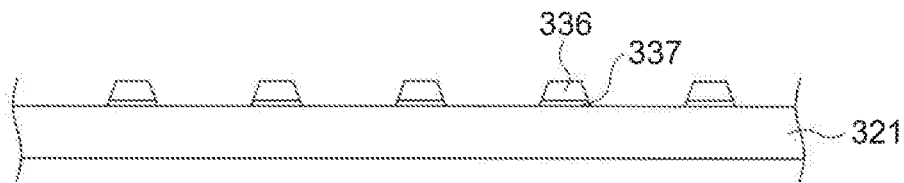
FIG. 41 is a view for explaining an example of the manufacturing method for the heat-generating plate.

In this way, according to the amount of spread etchant of the resist pattern 339 and the traveling speed of the etched material 340, the width of the conductive metal layer 336 finally forming the conductive thin wire 331 can be easily adjusted. The etching is adjusted so as not to excessively proceeded in a portion of the resist pattern 339 with a large curvature. As described above, the etched material 340 is etched, and the conductive metal layer 336 and the first dark color layer 337 are formed. After that, as illustrated in FIG. 41, the resist pattern 339 is removed.

Figure 42:
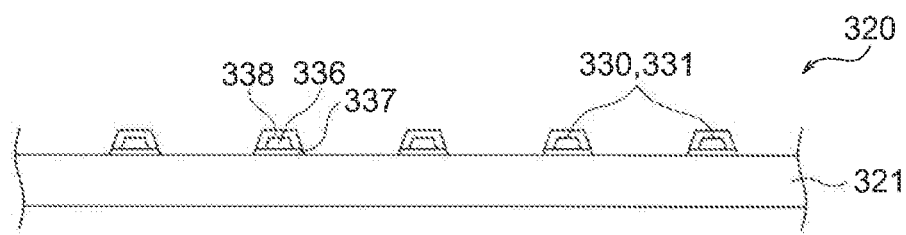
FIG. 42 is a view for explaining an example of the manufacturing method for the heat-generating plate.

Next, as illustrated in FIG. 42, a second dark color layer 338 is formed on a surface 331a opposite to a surface 331b of the conductive metal layer 336 on which the first dark color layer 337 is provided and side surfaces 331c and 331d. By performing darkening processing (blackening processing) on a part of the material forming the conductive metal layer 336, the second dark color layer 338 formed of metal oxide or metal sulfide can be formed from a part of the conductive metal layer 336. Furthermore, the second dark color layer 338 may be provided on the surface of the conductive metal layer 336 as a coating film of a dark color material and a plating layer of nickel or chromium. In addition, the second dark color layer 338 may be provided by roughening the surface of the conductive metal layer 336. According to the above process, the sheet with a conductor 320 is produced.

Figure 43:
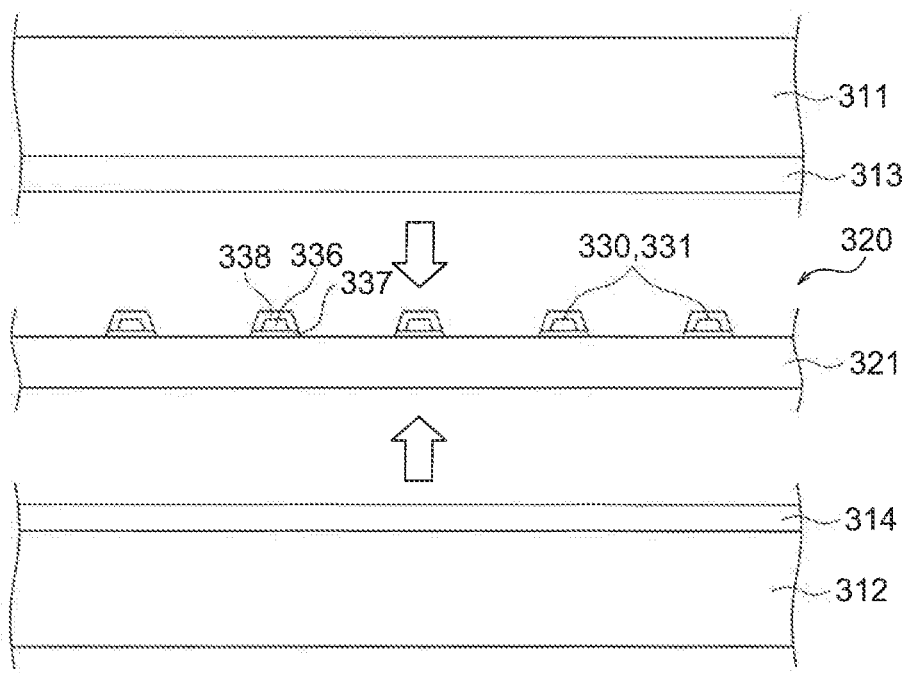
FIG. 43 is a view for explaining an example of the manufacturing method for the heat-generating plate.

Finally, as illustrated in FIG. 43, the bonding layer 313 and the glass 311 are laminated from the side of the heat-generating conductor 330 of the sheet with a conductor 320, and the sheet with a conductor 320 is bonded to the glass 311 by heating and pressurizing. Similarly, by laminating the bonding layer 314 and the glass 312 from the side of the base film 321, the sheet with a conductor 320 is bonded to the glass 312. Accordingly, the heat-generating plate 310 illustrated in FIG. 31 is produced.

As described above, the heat-generating plate 310 according to the present embodiment is a heat-generating plate that generates heat when a voltage is applied and includes the pair of glasses 311 and 312, the pair of bus bars 325 to which the voltage is applied, and the heat-generating conductors 330 for coupling between the pair of bus bars 325, and the heat-generating conductor 330 includes the plurality of conductive thin wires 331 that linearly extends between the pair of bus bars 325 and couples the bus bars 325, and the average $W_{ave}$ of the width W of the bottom portion of the conductive thin wire 331 is within a range of the following formula(a) relative to the standard deviation σ of the distribution of the width W.

$$0 \leq 4\delta/W_{ave} \leq 0.3 \qquad \text{Formula(a)}$$

According to the heat-generating plate 310, a difference of the width W of the bottom portion of the conductive thin wire 331 is small as a whole, disconnection of the conductive thin wire 331 of the heat-generating conductor 330 hardly occurs, and the width of the conductive thin wire 331 can be set within a range in which the conductive thin wire 331 is not visually recognized. Therefore, uneven heat hardly occurs in the heat-generating plate 310, and an excellent visual field through the heat-generating plate 310 can be obtained.

In the heat-generating plate 310 according to the present embodiment, the conductive thin wire 331 includes a large curvature portion B in which a curvature of a pattern in a plan view is relatively large and a small curvature portion A in which a curvature of a pattern in a plan view is relatively small. The width W of the conductive thin wire 331 is small in the large curvature portion B and large in the small curvature portion A. According to the present embodiment, the heat-generating conductor 330 can be effectively made invisible.

The heat-generating plate 310 may be used for the front window, the side window, or the sunroof of the automobile 301. In addition, the heat-generating plate 310 may be used for a window or a transparent door of a vehicle such as a railway vehicle, an aircraft, a ship, and a spacecraft other than the automobile.

Furthermore, other than the vehicle, the heat-generating plate 310 can be particularly used as a window for a building such as a window or a transparent door of a place for dividing a space into indoor and outdoor, for example, a building and a house.

Noted that various modifications can be made to the embodiment.

Fifth Embodiment

Figure 44:
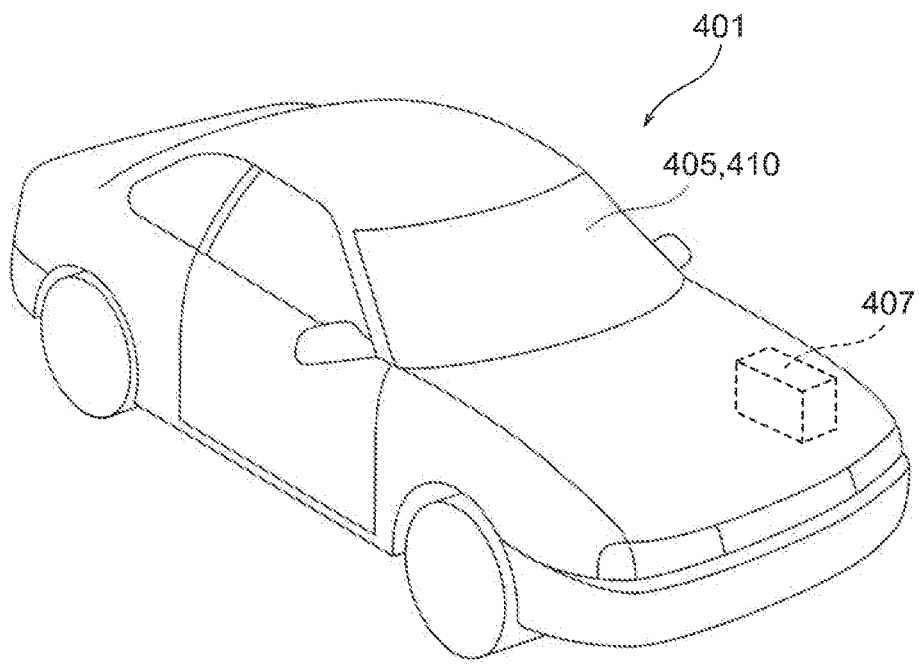
FIG. 44 is a view for explaining an embodiment according to the present invention and is a perspective view schematically illustrating a vehicle including a heat-generating plate. Particularly, in FIG. 44, an automobile including a front window configured by the heat-generating plate is schematically illustrated as an example of the vehicle.
Figure 45:
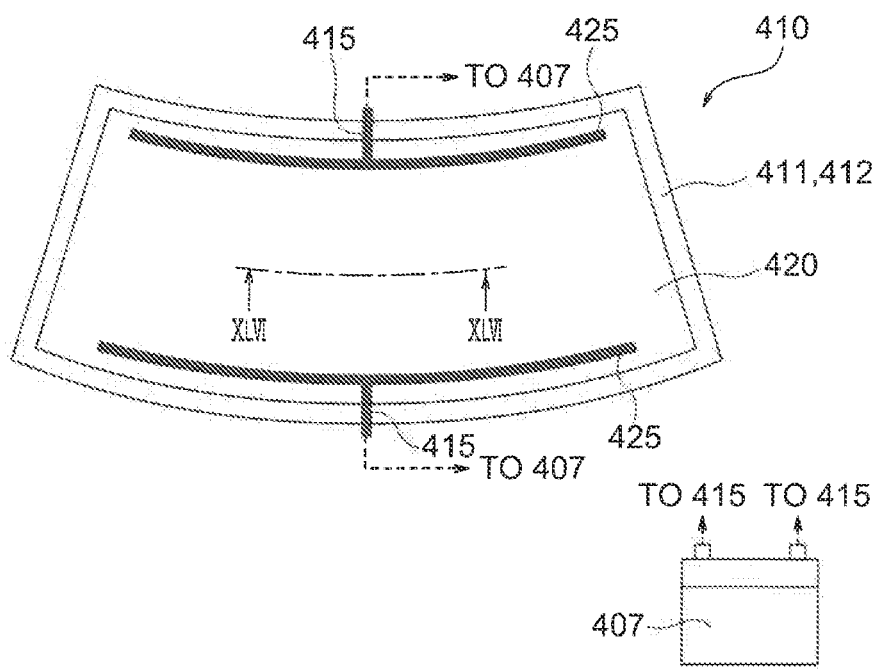
FIG. 45 is a view illustrating the heat-generating plate from a normal direction of a plate surface.
Figure 46:
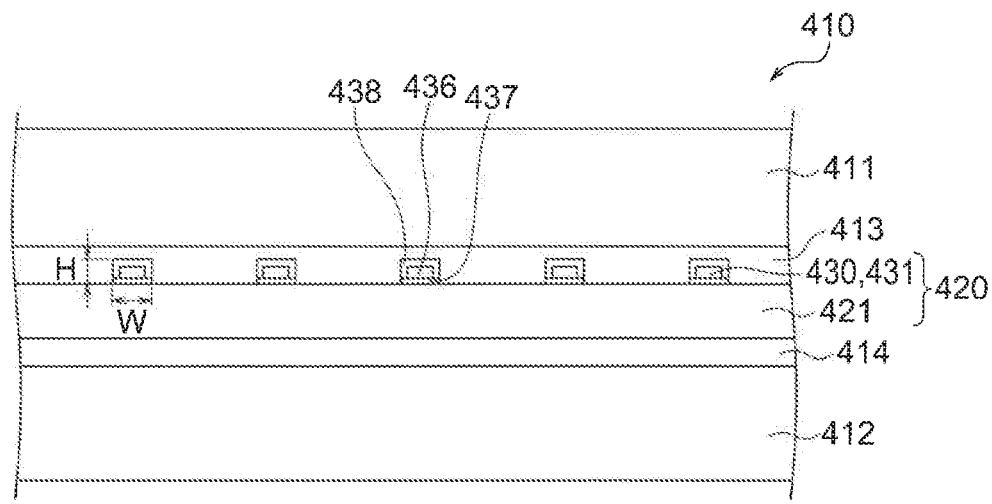
FIG. 46 is a cross-sectional view of the heat-generating plate taken along a line XLVI-XLVI in FIG. 44.

FIGS. 44 to 54 are views for explaining one embodiment of the present invention. FIG. 44 is a view schematically illustrating an automobile including a heat-generating plate, FIG. 45 is a view of the heat-generating plate viewed from the normal direction of the plate surface, and FIG. 46 is a cross-sectional view of the heat-generating plate in FIG. 45.

As illustrated in FIG. 44, an automobile 401 as an example of a vehicle includes a window glass such as a front window, a rear window, and a side window. Here, an example in which a front window 405 is configured by a heat-generating plate 410 will be described. In addition, the automobile 401 includes a power supply 407 such as a battery.

As illustrated in FIGS. 45 and 46, the heat-generating plate 410 according to the present embodiment includes a pair of glasses 411 and 412, a sheet with a conductor 420 arranged between the pair of glasses 411 and 412, and a pair of bonding layers 413 and 414 for bonding the respective glasses 411 and 412 to the sheet with a conductor 420. In the examples illustrated in FIGS. 44 and 45, the heat-generating plate 410 and the glasses 411 and 412 are curved. However, in other drawings, for easy understanding, the heat-generating plate 410 and the glasses 411 and 412 having plate-like shapes are illustrated.

The sheet with a conductor 420 includes a base film 421, bus bars 425, and a heat-generating conductor 430 provided on a surface facing to the glass 411 of the base film 421. The heat-generating conductor 430 includes main conductive thin wires 431 and coupling conductive thin wires 432 for connecting the main conductive thin wires 431.

As illustrated in FIG. 45, the heat-generating plate 410 includes a wiring portion 415 for energizing the heat-generating conductor 430 of the sheet with a conductor 420 via the bus bars 425. In the illustrated example, the power supply 407 such as a battery supplies power to the heat-generating conductor 430 via the wiring portion 415 and the bus bars 425, and the main conductive thin wire 431 and the coupling conductive thin wire 432 of the heat-generating conductor 430 are heated by resistance heating. Heat generated by the heat-generating conductor 430 is transmitted to the glasses 411 and 412 and heat the glasses 411 and 412. As a result, fogging due to dew condensation attached on the glasses 411 and 412 can be removed. In a case where snow or ice is attached on the glasses 411 and 412, snow and ice can be melted. Therefore, a passenger's visibility is preferably secured.

Each component of the heat-generating plate 410 will be described below.

First, the glasses 411 and 412 will be described. When the glasses 411 and 412 are used for a front window of an automobile as in the example illustrated in FIG. 44, it is preferable to use a glass with a high visible light transmittance so as not to interfere the field of view of a passenger. As a material of the glasses 411 and 412, soda-lime glass and blue plate glass can be used. It is preferable that a transmittance of the glasses 411 and 412 in a visible light region be equal to or higher than 90%. Here, the visible light transmittance of the glasses 411 and 412 is specified as an average value of transmittances in respective wavelengths when the transmittance is measured by a spectrophotometer ("UV-3100PC" manufactured by SHIMADZU CORPORATION, conforming to JIS K 0115) within a measurement wavelength range of 380 nm to 780 nm. The visible light transmittance may be lowered by coloring a part of or all of the glasses 411 and 412. In this case, direct sunlight can be shielded, and it is possible to make it difficult to visually recognize an interior of the vehicle from the outside of the vehicle.

Furthermore, it is preferable that the glasses 411 and 412 have a thickness of equal to or more than 1 mm and equal to or less than 5 mm. With such a thickness, the glasses 411 and 412 having excellent strength and optical characteristics can be obtained. The pair of glasses 411 and 412 may be formed of the same material and with the same structure, or at least one of the material and the structure may be different.

Next, the bonding layers 413 and 414 will be described. The bonding layer 413 is arranged between the glass 411 and the sheet with a conductor 420 and bonds the glass 411 to the sheet with a conductor 420. The bonding layer 414 is arranged between the glass 412 and the sheet with a conductor 420 and bonds the glass 412 to the sheet with a conductor 420.

As such bonding layers 413 and 414, a layer formed of a material having various adhesiveness and viscosity can be used. Furthermore, it is preferable to use a material having a high visible light transmittance for the bonding layers 413 and 414. As a typical bonding layer, a layer formed of polyvinyl butyral (PVB) can be exemplified. It is preferable that the thickness of each of the bonding layers 413 and 414 be equal to or more than 0.15 mm and equal to or less than 1 mm. The pair of bonding layers 413 and 414 may be formed of the same material and with the same structure, or at least one of the material and the structure may be different.

The heat-generating plate 410 is not limited to the illustrated example, and other function layer that is expected to perform a specific function may be provided. Furthermore, one function layer may perform two or more functions, and for example, some function may be added to at least one of the glasses 411 and 412 of the heat-generating plate 410, the bonding layers 413 and 414, and the base film 421 of the sheet with a conductor 420 to be described later. As an example of the function that can be applied to the heat-generating plate 410, an anti-reflection (AR) function, a hard coating (HG) function having scratch resistance, an infrared ray shielding (reflection) function, an ultraviolet ray shielding (reflection) function, and an antifouling function can be exemplified.

Next, the sheet with a conductor 420 will be described. The sheet with a conductor 420 includes a base film 421, bus bars 425, and a heat-generating conductor 430 provided on a surface facing to the glass 411 of the base film 421. The heat-generating conductor 430 includes the main conductive thin wires 431 and the coupling conductive thin wires 432. The sheet with a conductor 420 may have substantially the same planer dimensions as the glasses 411 and 412 and be arranged across the entire heat-generating plate 410 and may be arranged on a part of the heat-generating plate 410 such as a front portion of a driver's seat in the example in FIG. 44.

The base film 421 functions as a base material for supporting the heat-generating conductor 430. The base film 421 is a so-called transparent electrically insulating substrate for transmitting light with a wavelength in a visible light wavelength band (380 nm to 780 nm). As the base film 421, any material can be used as long as the material can transmit visible light and appropriately support the heat-generating conductor 430. For example, polyethylene terephthalate, polyethylene naphthalate, polycarbonate, polystyrene, and cyclic polyolefine can be exemplified. In consideration of light transmittance and appropriate supporting property of the heat-generating conductor 430, it is preferable that the thickness of the base film 421 be equal to or more than 0.03 mm and equal to or less than 0.20 mm.

Figure 47:
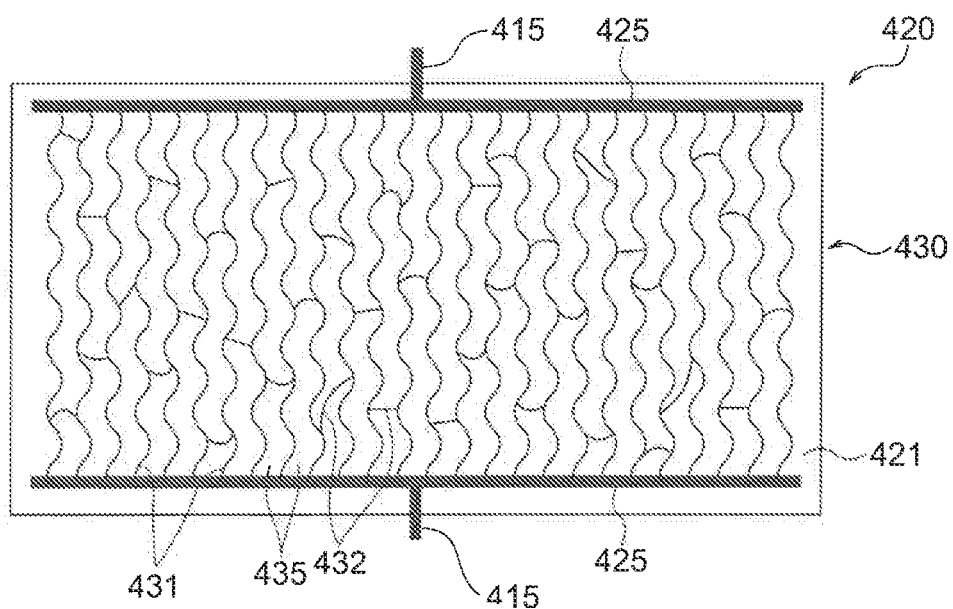
FIG. 47 is a plan view illustrating a sheet with a conductor from a normal direction of a sheet surface and is a plan view of an example of the sheet with a conductor.

Next, the heat-generating conductor 430 will be described with reference to FIG. 47. FIG. 47 is a plan view illustrating the heat-generating conductor 430 from the normal direction of the sheet surface. FIG. 47 is a view illustrating an exemplary arrangement of the heat-generating conductor 430.

As illustrated in FIG. 47, the heat-generating conductor 430 includes a plurality of linear main conductive thin wires 431 for coupling a pair of bus bars 425 and coupling conductive thin wires 432 for coupling two adjacent main conductive thin wires 431. The main conductive thin wire 431 and the coupling conductive thin wire 432 are energized from the power supply 407 such as a battery via the wiring portion 415 and the bus bars 425 and generate heat by resistance heating. Then, the heat is transmitted to the glasses 411 and 412 via the bonding layers 413 and 414 so as to heat the glasses 411 and 412.

In the example illustrated in FIG. 47, each of the plurality of main conductive thin wires 431 has a regular structure and extends from one of the bus bars 425 to the other bus bar 425. The main conductive thin wires 431 are arranged separated from each other. Accordingly, a gap 435 is formed between the two adjacent main conductive thin wires 431.

The arrangement pattern of each main conductive thin wire 431 is not limited to the pattern in FIG. 47 and may be a straight line, a polygonal line, an irregular curve, or a combination of these patterns. Furthermore, the main conductive thin wires 431 may extend from one of the bus bars 425 to the other bus bar 425 in different patterns.

As illustrated in FIG. 47, the coupling conductive thin wire 432 is arranged in the gap 435 between the two adjacent main conductive thin wires 431 so as to couple the two adjacent main conductive thin wires 431. Therefore, when the coupling conductive thin wire 432 is arranged, the two adjacent main conductive thin wires 431 are electrically connected to each other. Therefore, even if the main conductive thin wire 431 is disconnected, electrical connection is maintained. The coupling conductive thin wire 432 has a shape of a straight line, a circular arc, or a combination of a straight line and a circular arc.

Furthermore, each coupling conductive thin wire 432 has a pattern different from three or more coupling conductive thin wires 432, or preferably, all the other coupling conductive thin wires 432. Here, the difference in the patterns of the coupling conductive thin wires 432 means that at least one of the shape of the conductive thin wire and a direction in which both ends of the coupling conductive thin wires are coupled is different between the compared coupling conductive thin wires 432. That is, if the directions in which both ends are coupled of the compared coupling conductive thin wires 432 are different from each other, even when the shapes of the coupling conductive thin wires 432 are the same, or if the shapes are different even when the directions in which both ends are connected are the same, it is assumed that the patterns of the coupling conductive thin wires 432 be different from each other.

As a material forming the heat-generating conductor 430, for example, one or more alloys of two or more kinds of metals selected from among metals including gold, silver, copper, platinum, aluminum, chromium, molybdenum, nickel, titanium, palladium, indium, and tungsten and nickel-chromium alloy, and bronze can be exemplified.

The heat-generating conductor 430 may be formed by using an opaque metal material as described above. On the other hand, the main conductive thin wire 431 and the coupling conductive thin wire 432 of the heat-generating conductor 430 are formed with a high uncoating ratio of about equal to or higher than 70% and equal to or lower than 99.8%. Therefore, an entire region in which the main conductive thin wires 431 and the coupling conductive thin wires 432 of the heat-generating conductor 430 are formed is transparent and does not impair visibility.

In the example illustrated in FIG. 46, each of the main conductive thin wire 431 and the coupling conductive thin wire 432 has a rectangular cross section as a whole. It is preferable that the widths W of the main conductive thin wire 431 and the coupling conductive thin wire 432, that is, the width W along the plate surface of the heat-generating plate 410 be equal to or more than 2 µm and equal to or less than 20 µm and that the height (thickness) H, that is, the height (thickness) H along the normal direction to the plate surface of the heat-generating plate 410 be equal to or more than 1 µm and equal to or less than 60 µm. According to the main conductive thin wire 431 and the coupling conductive thin wire 432 having such a size, since the main conductive thin wire 431 and the coupling conductive thin wire 432 are sufficiently thinned, the heat-generating conductor 430 can be effectively made invisible.

As illustrated in FIG. 46, each of the main conductive thin wire 431 and the coupling conductive thin wire 432 includes a conductive metal layer 436, a first dark color layer 437 that covers the surface of the conductive metal layer 436 facing to the base film 421, and a second dark color layer 438 that covers the surface of the conductive metal layer 436 facing to the glass 411 and both side surfaces.

The conductive metal layer 436 formed of a metal material having excellent conductivity has a relatively high reflectance. When the conductive metal layer 436 forming the main conductive thin wire 431 and the coupling conductive thin wire 432 of the heat-generating conductor 430 reflects light, the reflected light is visually recognized, and the light may interfere a field of view of a passenger. Furthermore, when the conductive metal layer 436 is visually recognized from outside, design may be deteriorated. Thus, the first and second dark color layers 437 and 438 are arranged on at least a part of the surface of the conductive metal layer 436. It is preferable that the first and second dark color layers 437 and 438 have a lower reflectance of visible light than the conductive metal layer 436, for example, the first and second dark color layers 437 and 438 are layers of dark colors such as black. With the dark color layers 437 and 438, the conductive metal layer 436 is hardly and visually recognized, and a passenger's visibility is preferably secured. In addition, the deterioration in the design when the viewed from outside can be prevented.

As described above, the main conductive thin wire 431 and the coupling conductive thin wire 432 of the heat-generating conductor 430 are formed on the base film 421 with a high uncoating ratio from viewpoint of securing visually transmitting performance and visibility. Therefore, as illustrated in FIG. 46, the bonding layer 413 has contact with the base film 421 of the sheet with a conductor 420 via a non-covered portion that is not covered with the main conductive thin wire 431 and the coupling conductive thin wire 432, that is, regions where the main conductive thin wire 431 and the coupling conductive thin wire 432 are not provided. Therefore, the heat-generating conductor 430 is embedded in the bonding layer 413.

Next, an example of a manufacturing method for the heat-generating plate 410 will be described with reference to FIGS. 48 to 54. FIGS. 48 to 54 are cross-sectional views sequentially illustrating the example of the manufacturing method for the heat-generating plate 410.

Figure 48:
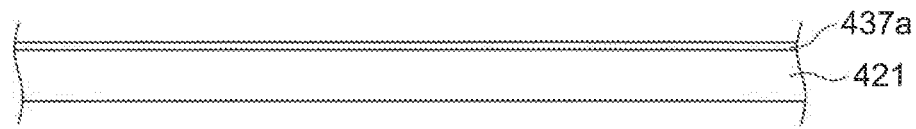
FIG. 48 is a view for explaining an example of a manufacturing method for the heat-generating plate.

First, as illustrated in FIG. 48, a dark color film 437a that forms the first dark color layer 437 is formed on the base film 421. As the base film 421, any material can be used as long as the material can appropriately hold the heat-generating conductor 430. For example, polyethylene terephthalate, polyethylene naphthalate, polycarbonate, polystyrene, and cyclic polyolefine can be exemplified. In consideration of retention of the heat-generating conductor 430 and the like, it is preferable to use the base film 421 having the thickness of equal to or more than 30 µm and equal to or less than 150 µm. Furthermore, the dark color film 437a can be provided by a method, for example, a plating method including electroplating and electroless plating, a sputtering method, a CVD method, a PVD method, and an ion plating method or a method of combination of two or more methods described above. As a material of the dark color film 437a, various known materials can be used. For example, copper nitride, copper oxide, nickel nitride can be used.

Figure 49:
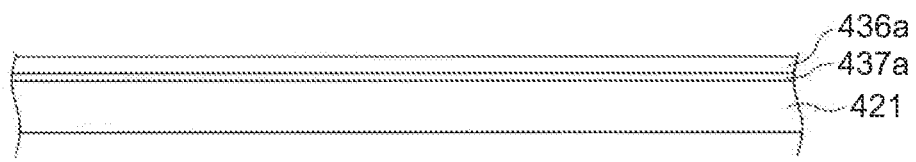
FIG. 49 is a view for explaining an example of the manufacturing method for the heat-generating plate.

Next, as illustrated in FIG. 49, a metal film 436a that forms the conductive metal layer 436 is provided on the dark color film 437a. As already described as a material forming the conductive metal layer 436, the metal film 436a may be formed by using one or more of gold, silver, copper, platinum, aluminum, chromium, molybdenum, nickel, titanium, palladium, indium, and tungsten, and an alloy of these metals. The metal film 436a may be formed by a known method. For example, a method of bonding a metal foil such as a copper foil, a plating method including electroplating and electroless plating, a sputtering method, a CVD method, a PVD method, an ion plating method, or a method of combination of two or more methods described above can be employed.

Figure 50:
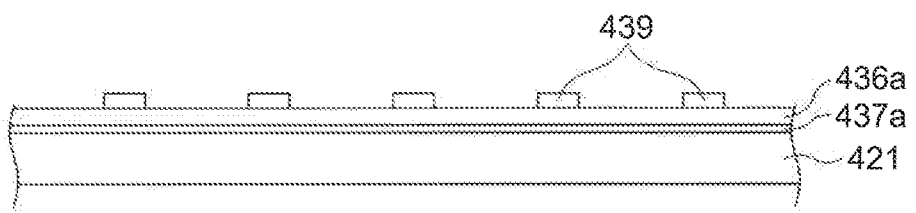
FIG. 50 is a view for explaining an example of the manufacturing method for the heat-generating plate.

Next, as illustrated in FIG. 50, a resist pattern 439 is provided on the metal film 436a. The resist pattern 439 has a shape corresponding to the heat-generating conductor 430 to be formed. In the method described here, the resist pattern 439 is provided only on a portion finally forming the heat-generating conductor 430. The resist pattern 439 can be formed by patterning using a known photolithography technique.

Figure 51:
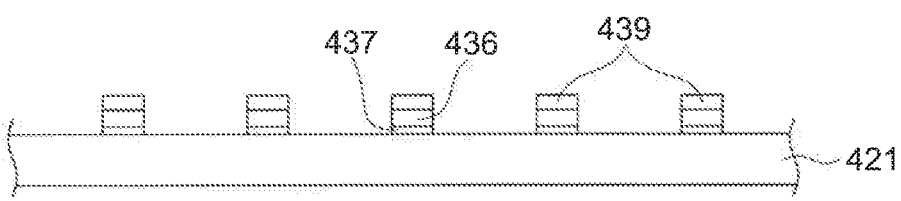
FIG. 51 is a view for explaining an example of the manufacturing method for the heat-generating plate.

Next, as illustrated in FIG. 51, the metal film 436a and the dark color film 437a are etched using the resist pattern 439 as a mask. By this etching, the metal film 436a and the dark color film 437a are patterned to substantially the same pattern as the resist pattern 439. As a result, the conductive metal layer 436 that will form a part of the main conductive thin wire 431 and the coupling conductive thin wire 432 is formed from the patterned metal film 436a. The first dark color layer 437 that will form a part of the main conductive thin wire 431 and the coupling conductive thin wire 432 is formed from the patterned dark color film 437a.

Figure 52:
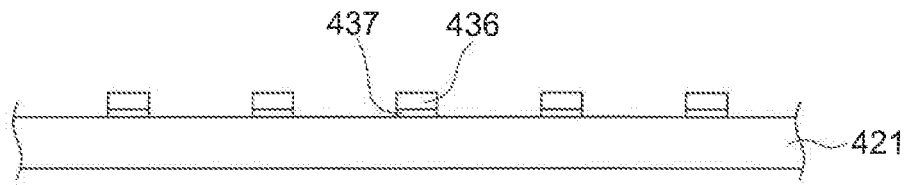
FIG. 52 is a view for explaining an example of the manufacturing method for the heat-generating plate.

An etching method is not particularly limited, and a known method can be employed. As a known method, for example, wet etching using an etchant and plasma etching can be exemplified. Particularly, in wet etching in a "role-to-role" manner, existence of the coupling conductive thin wire 432 can effectively prevent collapse and peeling of the conductive metal layer 436 and the first dark color layer 437 caused by being conveyed. After that, as illustrated in FIG. 52, the resist pattern 439 is removed.

Figure 53:
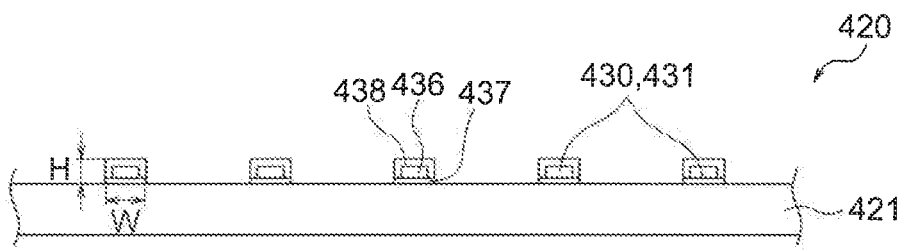
FIG. 53 is a view for explaining an example of the manufacturing method for the heat-generating plate.

Next, as illustrated in FIG. 53, a second dark color layer 438 is formed on a surface 431a opposite to a surface 431b of the conductive metal layer 436 on which the first dark color layer 437 is provided and side surfaces 431c and 431d. By performing darkening processing (blackening processing), for example, on a part of the material forming the conductive metal layer 436, the second dark color layer 438 formed of metal oxide or metal sulfide can be formed from a part of the conductive metal layer 436. Furthermore, the second dark color layer 438 may be provided on the surface of the conductive metal layer 436 as a coating film of a dark color material and a plating layer of nickel or chromium. In addition, the second dark color layer 438 may be provided by roughening the surface of the conductive metal layer 436. According to the above process, the sheet with a conductor 420 is produced.

Figure 54:
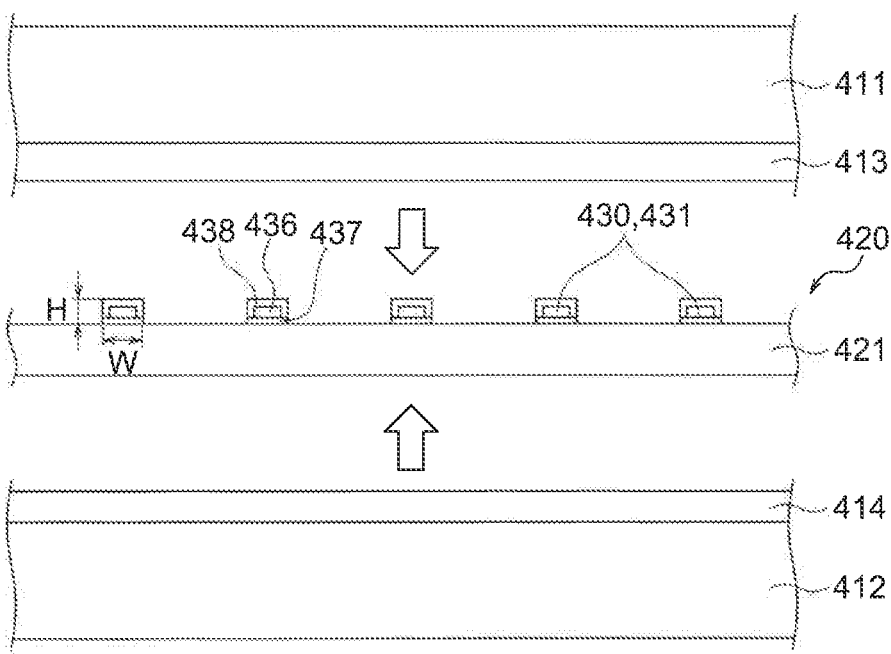
FIG. 54 is a view for explaining an example of the manufacturing method for the heat-generating plate.

Finally, as illustrated in FIG. 54, the bonding layer 413 and the glass 411 are laminated from the side of the heat-generating conductor 430 of the sheet with a conductor 420, and the sheet with a conductor 420 is bonded to the glass 411, for example, by heating and pressurizing. Similarly, by laminating the bonding layer 414 and the glass 412 from the side of the base film 421, the sheet with a conductor 420 is bonded to the glass 412. Accordingly, the heat-generating plate 410 illustrated in FIG. 46 is produced.

As described above, the heat-generating plate 410 according to the present embodiment is a heat-generating plate that generates heat when a voltage is applied and includes the pair of glasses 411 and 412, the pair of bus bars 425 to which the voltage is applied, and the heat-generating conductor 430 for coupling between the pair of bus bars 425, and the heat-generating conductor 430 includes the plurality of main conductive thin wires 431 that linearly extends between the pair of bus bars 425 and couples the bus bars 425 and the coupling conductive thin wires 432 that couples between the two adjacent main conductive thin wires 431, and each coupling conductive thin wire 432 has three or more different patterns. According to such a heat-generating plate 410, even when a certain position of the main conductive thin wire 431 is disconnected, electrical connection of the main conductive thin wire 431 can be maintained by the coupling conductive thin wire 432. Therefore, occurrence of uneven heat caused by disconnection can be prevented. In addition, since the coupling conductive thin wire 432 has three or more different patterns, the coupling conductive thin wire 432 is unlikely to have directivity in a specific direction. Therefore, when the entire heat-generating plate 410 is observed, an orientation direction of the coupling conductive thin wire 432 becomes inconspicuous. In addition, since the coupling conductive thin wire 432 has three more different patterns, a direction of a diffraction image generated by the coupling conductive thin wire 432 is different from a direction of a diffraction image generated by the other coupling conductive thin wire 432. That is, a direction in which the diffraction image grows stronger is hardly generated in the whole coupling conductive thin wire 432. Therefore, strong streaky light, that is, a beam of light does not occur in a specific direction. Therefore, deterioration in visibility through the heat-generating plate 410 can be avoided.

In addition, in the heat-generating plate 410 according to the present embodiment, each coupling conductive thin wire 432 has a pattern different from those of all the other coupling conductive thin wires 432. According to such a heat-generating plate 410, an effect such that a beam of light hardly occurs in the specific direction and an effect such that the coupling conductive thin wire 432 is inconspicuous in a specific arrangement direction can be more enhanced. Therefore, an effect for avoiding the deterioration of the visibility through the heat-generating plate 410 can be more enhanced.

The heat-generating plate 410 may be used for the front window, the side window, or the sunroof of the automobile 401. In addition, the heat-generating plate 410 may be used for a window or a transparent door of a vehicle such as a railway vehicle, an aircraft, a ship, and a spacecraft other than the automobile.

Furthermore, the heat-generating plate 410 can be particularly used as a window for a building such as a window or a transparent door of a place for dividing a space into indoor and outdoor, for example, a building and a house other than a vehicle.

Noted that various modifications can be made to the embodiment.

Sixth Embodiment

Figure 55:
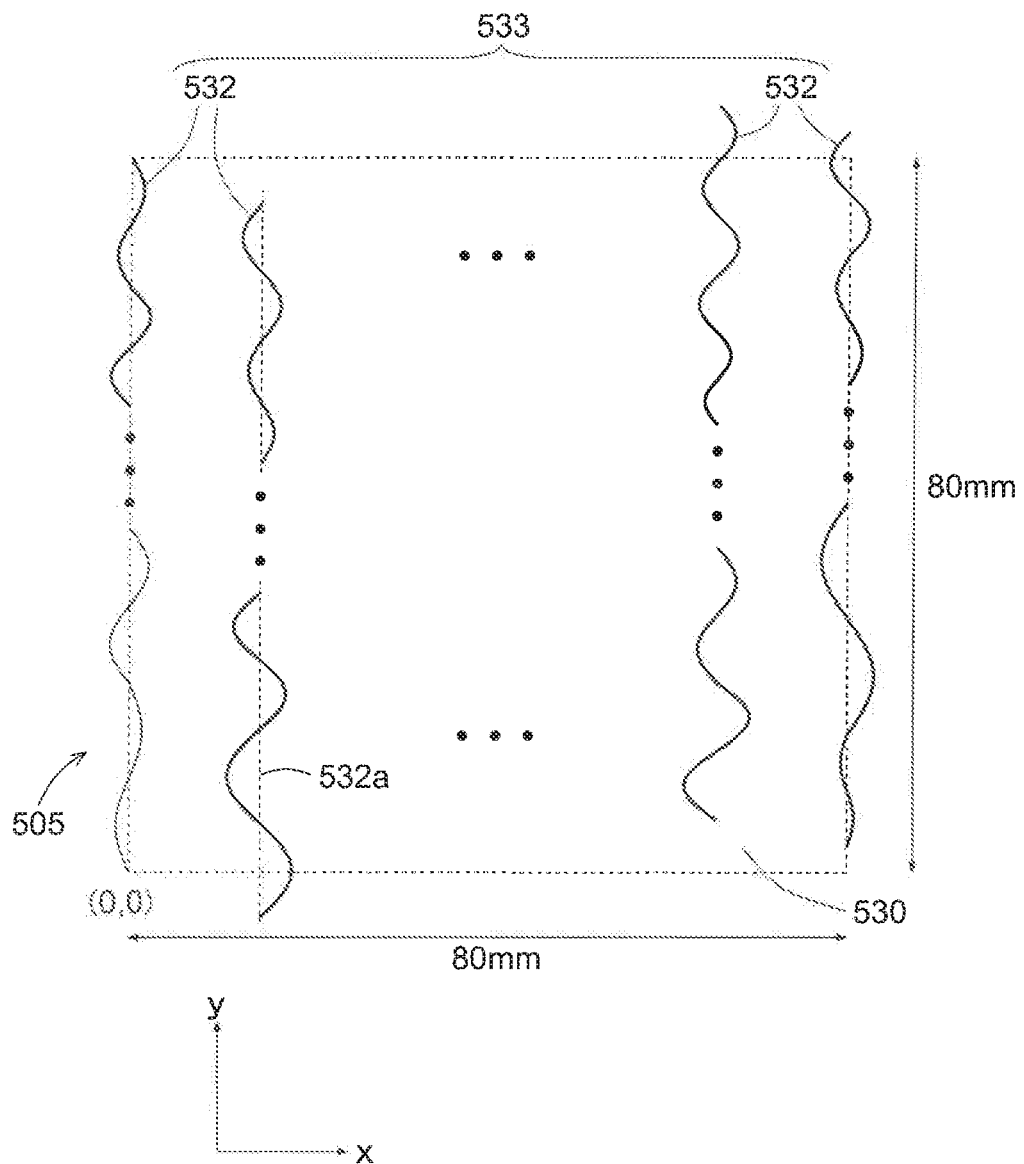
FIG. 55 is a plan view of a conductive heat-generating body according to an embodiment of the present invention.
Figure 56:
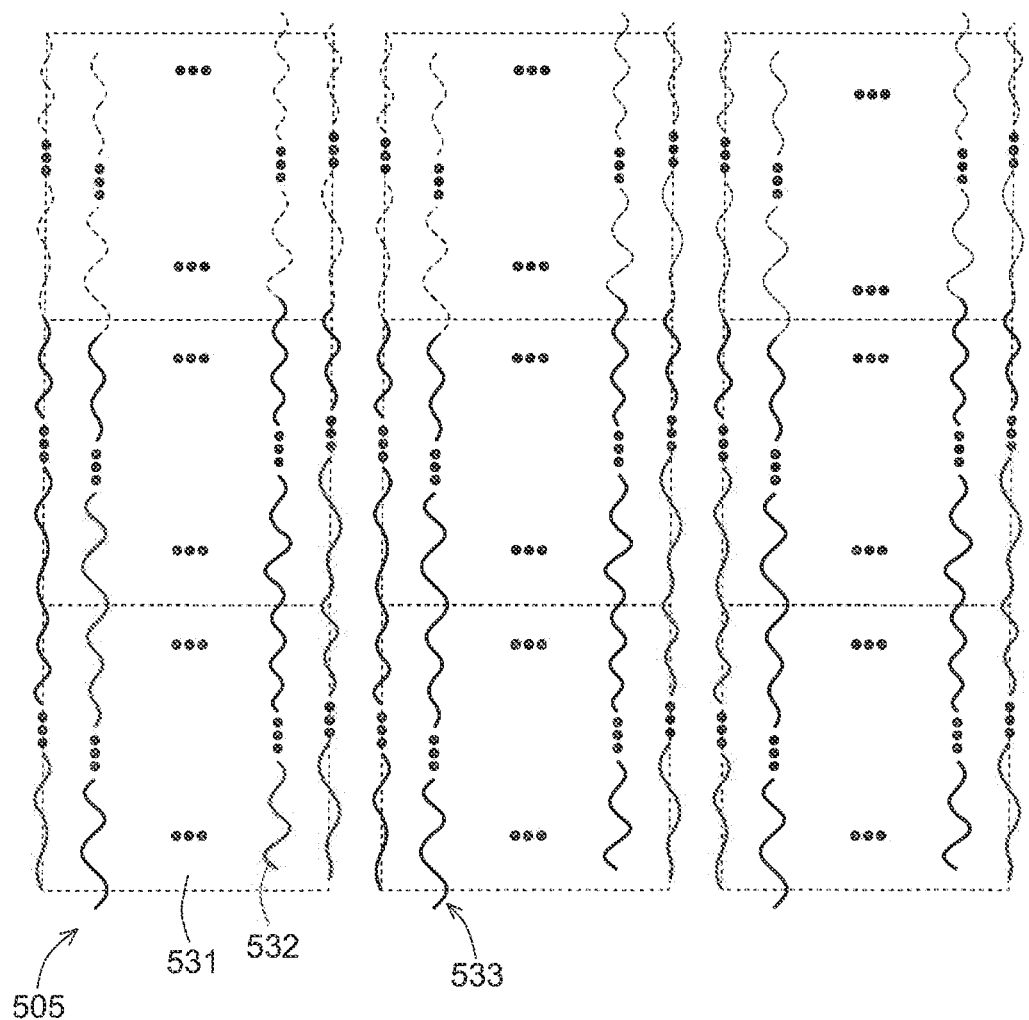
FIG. 56 is a diagram of a plurality of heat-generating body rows arranged along a vertical direction and a horizontal direction.

FIG. 55 is a plan view of a conductive heat-generating body 505 according to an embodiment of the present invention. The conductive heat-generating body 505 in FIG. 55 includes, for example, a heat-generating body row 533 including a plurality of curved heat-generating bodies 532 arranged in a range 531 of 80 mm square. As illustrated in FIG. 56, a plurality of heat-generating body rows 533 is arranged in each of vertical and horizontal directions. The length of 80 mm is an example, and the value can be arbitrarily changed. As will be described later, in the present embodiment, shapes of the curved heat-generating bodies 532 included in the single heat-generating body row 533 are irregularly formed. However, when the heat-generating body rows 533 are arranged in the vertical and horizontal directions, each curved heat-generating body 532 has a periodic structure in a unit of the heat-generating body row 533.

Even when each curved heat-generating body 532 has a periodic structure, to make a beam of light and flicker be inconspicuous, it has been known that the size of the heat-generating body row 533 is increased to a certain degree. Specifically, when a length of a side of the heat-generating body row 533 exceeds 50 mm, even when the plurality of heat-generating body rows 533 is arranged in the vertical and horizontal directions, a beam of light and flicker are inconspicuous. Hereinafter, as an example, the vertical and horizontal sizes of the heat-generating body row 533 are set to 80 mm.

Each curved heat-generating body 532 included in the heat-generating body row 533 is a linear heating wire formed of a conductive material such as tungsten and copper. A line width of each curved heat-generating body 532 is, for example, 5 to 20 μm, and preferably, 7 to 10 μm. To make it difficult to visually recognize the plurality of curved heat-generating bodies 532 arranged on a transparent base material, it is desirable that the line width of the curved heat-generating body 532 be equal to or less than 15 μm. However, as the line width decreases, disconnection tends to occur. Therefore, to prevent the disconnection, it is preferable to secure the line width of equal to or more than 10 μm.

The curved heat-generating bodies 532 in FIG. 55 are arranged separated from each other in a first direction x and extend in a second direction y intersecting with the first direction x. In FIG. 55, although an example is illustrated in which the first direction x and the second direction y are perpendicular to each other, an angle between the two directions is not necessarily a right angle.

Each curved heat-generating body 532 in FIG. 55 is obtained by sequentially connecting a plurality of periodic curved lines of which periods and amplitudes are irregular for each period (for example, sine waves) to each other in the second direction y. In FIG. 55, an example is illustrated in which the periodic curved line is a sine wave. However, a plurality of arbitrary periodic curved lines other than sine waves may be connected to each other. Although a kind of the periodic curved line is arbitrary, the kinds of connected periodic curved lines are the same, and the period and the amplitude are irregular for each period. The sine wave is referred to as a sinusoidal wave. A general formula expressed in a coordinate system XY as illustrated in FIG. 55 is X=A sin{(2n/λ)X+α}. Here, a reference numeral A indicates an amplitude, a reference numeral λ indicates a wavelength (or period, and a reference numeral α indicates a phase. Furthermore, as a periodic curved line other than a sine wave, an elliptic function curve, a Bessel function curve, and the like can be exemplified.

Here, the term "irregular" means that the period and the amplitude of the periodic curved line are random for each period, and the periods and the amplitudes of the periodic curved lines do not have periodicity in the range 531 of 80 mm square. The periods and the amplitudes of the curved heat-generating bodies 532 arranged apart from each other in the first direction x are irregular.

In this way, the plurality of curved heat-generating bodies 532 arranged in 80 mm square has irregular periods and amplitudes in the first direction x and the second direction y.

When it is assumed that a lower left corner in FIG. 55 be an origin (0, 0) and a start point of each of the curved heat-generating bodies 532 (head position) be the minimum coordinate position in the second direction y, the start positions of the curved heat-generating bodies 532, arranged separated from each other along the first direction x, in the second direction y are irregular. This indicates that the phases of the curved heat-generating bodies 532 are irregularly shifted from each other.

The reason for irregularly shifting the phases of the curved heat-generating bodies 532 is as follows. For example, when it is assumed that all the start points of the curved heat-generating bodies 532 be a coordinate position y=0 in the second direction y, the amplitude of each curved heat-generating body 532 is zero at the coordinate position y=0. Therefore, when it is assumed that the plurality of heat-generating body rows 533 of 80 mm square be arranged in the first direction x and the second direction y, in each heat-generating body row 533, a position where the amplitudes of the curved heat-generating bodies 532 are zero periodically appears, and this position may cause a beam of light and flicker.

Therefore, in the present embodiment, by irregularly shifting the minimum coordinate positions of the curved heat-generating bodies 532 included in the heat-generating body row 533 of 80 mm square in the second direction y, the phases of the curved heat-generating bodies 532 are randomized.

As described above, in the present embodiment, for example, since the periods and the amplitudes of the curved heat-generating bodies 532 are formed to be irregular in the first direction x and the second direction y in the range 531 of 80 mm square, there is less possibility that reflected light beams reflected by the curved heat-generating bodies 532 are interfered with each other, and occurrence of a beam of light can be prevented. In addition, since each curved heat-generating body 532 meanders and a meandering sizes are irregular, a traveling direction of the reflected light reflected by each curved heat-generating body 532 is irregular, and strong flicker in a specific direction is hardly felt.

In the present embodiment, uneven heat is prevented, for example, in each heat-generating body row 533 of 80 mm square.

Generally, as a curve of the curved heat-generating body 532 is gentler, that is, as the curve is closer to a straight line, a heat generation efficiency increases. Therefore, from the viewpoint of improving the heat generation efficiency, it is desirable to lengthen the period of the curved heat-generating body 532 and narrow the amplitude. On the other hand, from the viewpoint of preventing a beam of light and flicker, it is preferable to shorten the period of the curved heat-generating body 532 and widen the amplitude. Since both conditions conflict with each other, it is desirable to set the period and the amplitude of the curved heat-generating body 532 in consideration of both the heat generation efficiency and the prevention of a beam of light and flicker.

If the periods and the amplitudes of the curved heat-generating bodies 532 of 80 mm square are set in consideration of only the prevention of a beam of light and flicker, some places have a large heating value and some places have a small heating value in the range 531 of 80 mm square, and uneven heat may occur.

Therefore, in the present embodiment, a ratio of the length of each curved heat-generating body 532 in the second direction y and a linear distance (=80 mm) of the range 531 of 80 mm square in the second direction y is within a range between a predetermined upper limit and a predetermined lower limit. According to the examination by the inventors, the upper limit of the ratio with which uneven heat does not occur and a beam of light and flicker can be prevented to a practically acceptable level is 1.5, and the lower limit is 1.0.

From this fact, in the present embodiment, a ratio of the length of each curved heat-generating body 532 relative to a shortest distance of each curved heat-generating body 532 in 80 mm square is set to be larger than 1.0 and set to 1.5. While maintaining the ratio, by making the periods and the amplitudes of the curved heat-generating bodies 532 in 80 mm square be irregular and irregularly setting the start point coordinate positions of the curved heat-generating bodies 532 in the second direction y, a beam of light and flicker can be effectively prevented.

Regarding the length L of the curved heat-generating body 532, when it is assumed that a start point coordinate of the curved heat-generating body 532 in the second direction y be y0, a terminate point coordinate be y1, and the shortest distance between both end points of the curved heat-generating body 532 in the second direction y be D, it is necessary to set the ratio within a range indicated by the following expression (1).

[Expression 1]

$$1.0 < \frac{1}{D} \int_{y=y0}^{y=y1} \sqrt{1 + \left(\frac{dx}{dy}\right)^2} \, dy \leq 1.5 \quad (1)$$

According to further examination by the inventors, it has been found that the ratio with which uneven heat does not occur and a beam of light and flicker can be prevented has a lower limit of 1.01 and an upper limit of 1.15. That is, it has been found that an optimal range of the ratio is expressed by the following expression (2).

[Expression 2]

$$1.01 < \frac{1}{D} \int_{y=y0}^{y=y1} \sqrt{1 + \left(\frac{dx}{dy}\right)^2} \, dy \leq 1.15 \quad (2)$$

Furthermore, as the line width of the curved heat-generating body 532 is narrowed, the curved heat-generating body 532 is more hardly and visually recognized. Therefore, the narrower line width is preferable when the curved heat-generating body 532 is incorporated in a window glass and the like. However, the curved heat-generating body 532 is easily disconnected. Therefore, in the present embodiment, the two curved heat-generating bodies 532 adjacent to each other in the second direction y may be connected with a bypass heat-generating body 534. When the bypass heat-generating bodies 534 are periodically arranged, this may cause a beam of light and flicker. Therefore, the bypass heat-generating bodies 534 are irregularly arranged. In addition, the bypass heat-generating bodies 534 are equally arranged in the heat-generating body row 533 within the range 531 of 80 mm square so that the bypass heat-generating body 534 does not cause uneven heat.

Figure 57:
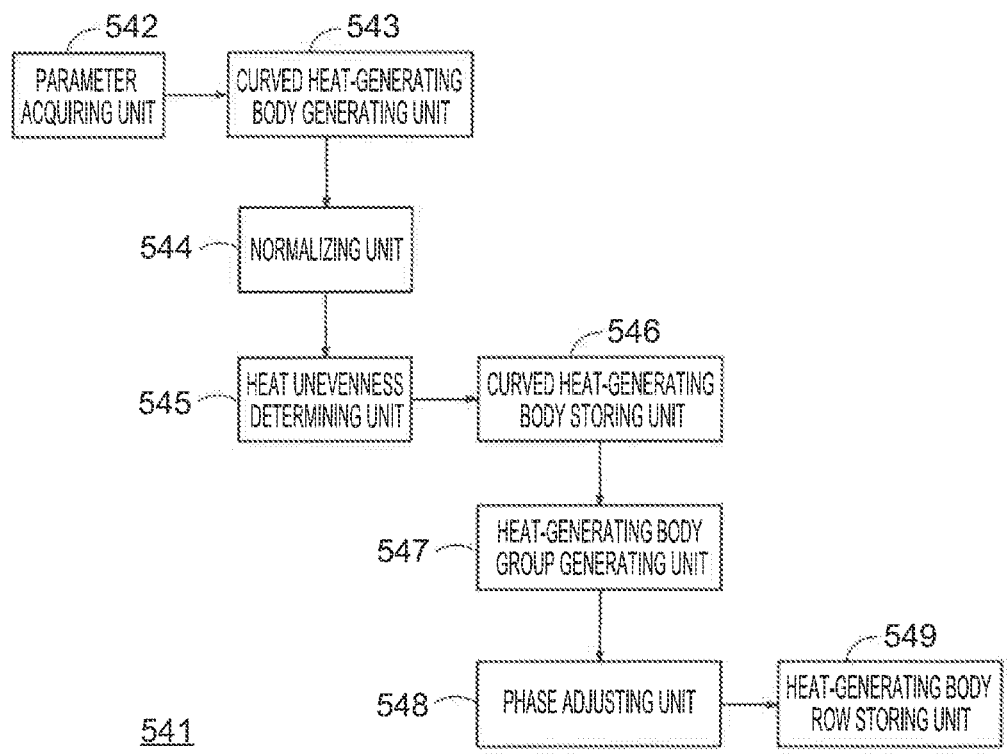
FIG. 57 is a block diagram illustrating a schematic configuration of a heat-generating body generating device that automatically generates a plurality of curved heat-generating bodies included in the heat-generating body row.

The periods and the amplitudes of the curved heat-generating bodies 532 included in the heat-generating body row 533 can be automatically generated by using a computer. FIG. 57 is a block diagram illustrating a schematic configuration of a heat-generating body generating device 541 that automatically generates the plurality of curved heat-generating bodies 532 included in the heat-generating body row 533. The heat-generating body generating device 541 in FIG. 57 includes a parameter acquiring unit 542, a curved heat-generating body generating unit 543, a normalizing unit 544, a heat unevenness determining unit 545, a curved heat-generating body storing unit 546, a heat-generating body group generating unit 547, a phase adjusting unit 548, and a heat-generating body row storing unit 549.

The heat-generating body generating device 541 in FIG. 57 can be realized as software that can be executed by a computer. Alternatively, at least a part of components in the heat-generating body generating device 541 in FIG. 57 may be realized by hardware. That is, the heat-generating body generating device 541 in FIG. 57 is not necessarily realized by a single computer.

The parameter acquiring unit 542 acquires a parameter group including various parameters representing features of shape of the curved heat-generating bodies 532. The parameter acquiring unit 542 may store the parameter group in a database and the like in advance and acquire a necessary parameter from the stored parameter group or may acquire each parameter that is input or selected by an operator with a keyboard, a mouse, and the like.

For example, the following items 1) to 7) are considered as examples of the parameters included in the parameter group.

1) Minimum distance and maximum distance between two curved heat-generating bodies 532 adjacent to each other in first direction x.

2) Minimum value and maximum value of amplitude of each curved heat-generating body 532.

3) Minimum value and maximum value of period of each curved heat-generating body 532.

4) Minimum value and maximum value of phase of each curved heat-generating body 532.

5) Minimum value and maximum value of ratio of length of each curved heat-generating body 532 relative to minimum distance of heat-generating body row 533 in the second direction y.

6) Length of heat-generating body row 533 in first direction x and length in second direction y.

7) Number of curved heat-generating bodies 532 included in heat-generating body row 533.

The curved heat-generating body generating unit 543 generates a single curved heat-generating body 532 extending in the second direction y. More specifically, the curved heat-generating body generating unit 543 connects the plurality of periodic curved lines, having the periods and the amplitudes that are irregular for each period, in the second direction y and generates the single curved heat-generating body 532.

To match the shortest distance between both ends of the curved heat-generating body 532 generated by the curved heat-generating body generating unit 543 in the second direction y to 80 mm, the normalizing unit 544 adjusts the periods of the plurality of periodic curved lines included in the curved heat-generating body 532.

The heat unevenness determining unit 545 determines whether a ratio obtained by dividing a total length of the curved heat-generating body 532 normalized by the normalizing unit 544 in the second direction y by the shortest distance between the both ends of the curved heat-generating body 532 is within a predetermined range. The predetermined range is, for example, a range in which the ratio is larger than 1.0 and equal to or less than 1.5.

When the heat unevenness determining unit 545 determines that the ratio is not within the predetermined range, the curved heat-generating body generating unit 543 generates the curved heat-generating body 532 again. The curved heat-generating body storing unit 546 stores the curved heat-generating body 532 of which the ratio is determined to be within the predetermined range.

The heat-generating body group generating unit 547 generates the plurality of curved heat-generating bodies 532 included in the range 531 of 80 mm square. More specifically, the heat-generating body group generating unit 547 generates the plurality of curved heat-generating bodies 532 arranged apart from each other in the first direction x within the range 531 of 80 mm square in cooperation with the curved heat-generating body generating unit 543, the heat unevenness determining unit 545, and a unit pressure heat-generating body storing unit.

The phase adjusting unit 548 makes the phases of the curved heat-generating bodies 532 generated by the heat-generating body group generating unit 547 be irregular. More specifically, the phase adjusting unit 548 makes the start positions (head position) of the curved heat-generating bodies 532 in the second direction y be irregular within the range 531 of 80 mm square. The heat-generating body row storing unit 549 stores the plurality of curved heat-generating bodies 532 of which the phase is made to be irregular by the phase adjusting unit 548.

Figure 58:
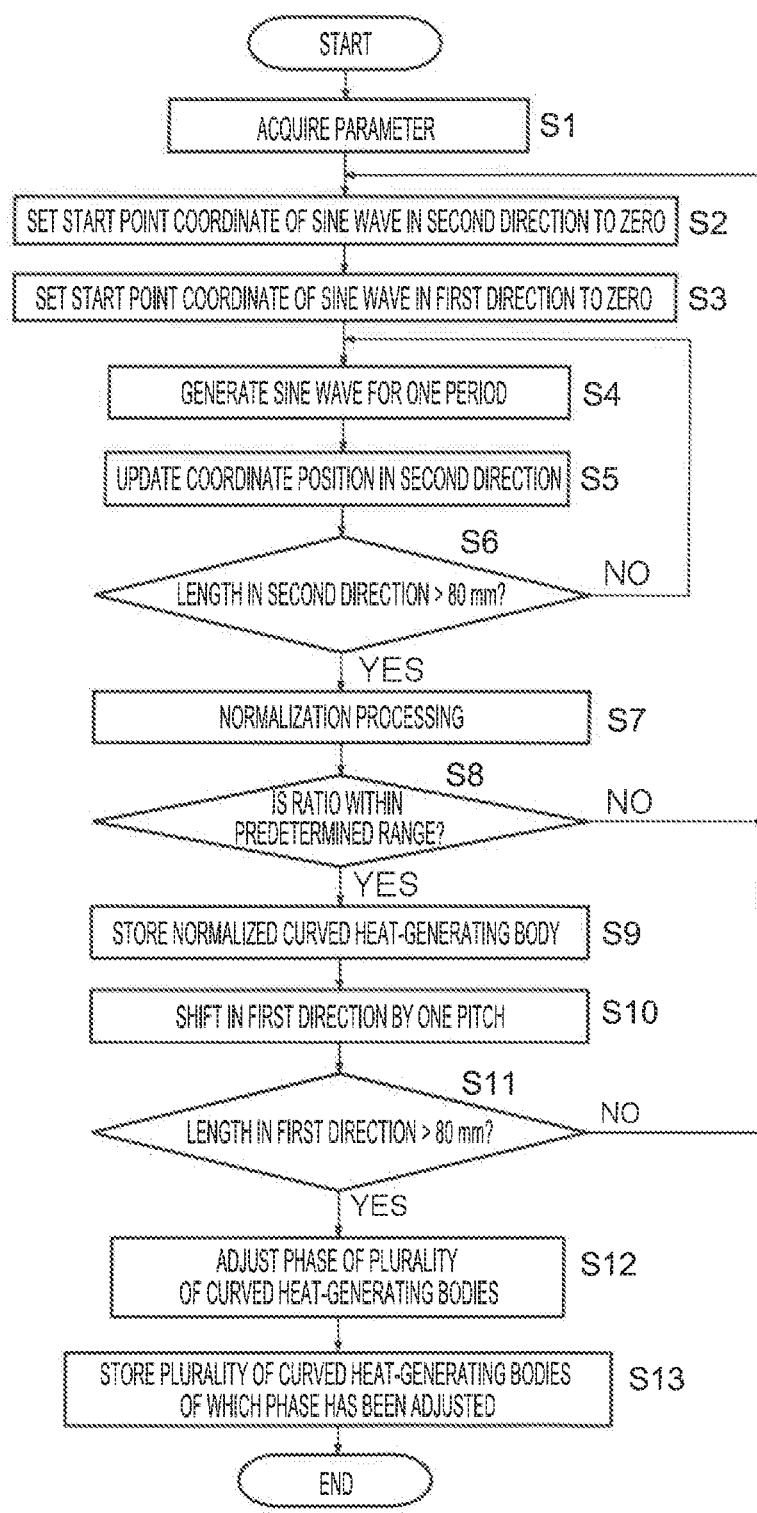
FIG. 58 is a flowchart illustrating an example of a processing procedure of the heat-generating body generating device in FIG. 57.

FIG. 58 is a flowchart illustrating an example of a processing procedure of the heat-generating body generating device 541 in FIG. 57. In this flowchart, processing for generating the plurality of curved heat-generating bodies 532 included in the heat-generating body row 533 within the range 531 of 80 mm square is performed. Hereinafter, an example will be described in which the plurality of periodic curved lines included in the curved heat-generating body 532 is a sine wave.

First, the parameter acquiring unit 542 acquires parameters in 1) to 7) (step S1). Next, the curved heat-generating body generating unit 543 sets a start point coordinate of the sine wave in the second direction y to zero (step S2). Next, the curved heat-generating body generating unit 543 sets the start point coordinate of the sine wave in the first direction x to zero (step S3). Then, the curved heat-generating body generating unit 543 randomly sets a period and an amplitude of the sine wave based on the acquired parameter and generates a sine wave for one period along the second direction y (step S4).

Next, the curved heat-generating body generating unit 543 updates a coordinate position in the second direction y by adding the sine wave for one period set in step S4 (step S5). Next, the curved heat-generating body generating unit 543 determines whether the added length in the second direction y exceeds 80 mm (step S6). If the length does not exceed 80 mm, processing in steps S4 to S6 is repeated.

When it is determined that the length exceeds 80 mm in step S6, the normalizing unit 544 adjusts the period of each sine wave included in the curved heat-generating body 532 so that the shortest distance between both ends of the curved heat-generating body 532 in the second direction y is 80 mm (step S7). This operation is called normalization processing. In the normalization processing, the period of each sine wave included in the curved heat-generating body 532 is decreased at the same ratio.

Next, the heat unevenness determining unit 545 determines whether a ratio obtained by dividing a total length of the normalized curved heat-generating body 532 in the second direction y by the shortest distance between both ends in the second direction y (for example, 80 mm) is within a predetermined range (step S8). Here, for example, it is determined whether the ratio is larger than 1.0 and equal to or less than 1.5 based on the above expression (1).

If the ratio is not within the predetermined range, the procedure returns to step 2, and the curved heat-generating body 532 is generated again. The reason why the curved heat-generating body 532 is generated again in a case where the ratio of the curved heat-generating body 532 is not within the predetermined range is because uneven heat may occur in unit of the heat-generating body row 533 of 80 mm square in a case where the value of the ratio is largely different.

When it is determined in step S8 that the ratio is within the predetermined range, the normalized curved heat-generating body 532 is stored in the curved heat-generating body storing unit 546 (step S9).

Next, the heat-generating body group generating unit 547 sets a coordinate position that is shifted in the first direction x by one pitch based on the parameter acquired by the parameter acquiring unit 542 (step S10). The size of one pitch is set by the parameter acquired in step S1.

Next, the heat-generating body group generating unit 547 determines whether the length in the first direction x exceeds 80 mm (step S11). If the length does not exceed 80 mm, the processing in and after step S2 is repeated, and a new curved heat-generating body 532 is generated.

When it is determined in step S11 that the length exceeds 80 mm, the phase adjusting unit 548 adjusts to make the phases of the curved heat-generating bodies 532 included in the heat-generating body row 533 be irregular (step S12). Next, the plurality of curved heat-generating bodies 532 of which the phase has been adjusted is stored in the heat-generating body row storing unit 549 (step S13).

An arbitrary number of heat-generating body rows 533 of 80 mm square generated by the processing procedure in FIG. 58 are aligned in the vertical and horizontal directions as illustrated in FIG. 56 to produce the conductive heat-generating body 505 with an arbitrary size and an arbitrary shape. Although the conductive heat-generating body 505 according to the present embodiment can be used for various objects and applications, an example will be described below in which the conductive heat-generating body 505 according to the present embodiment is incorporated into a front window, a rear window, a side window, or the like of a vehicle.

Figure 59:
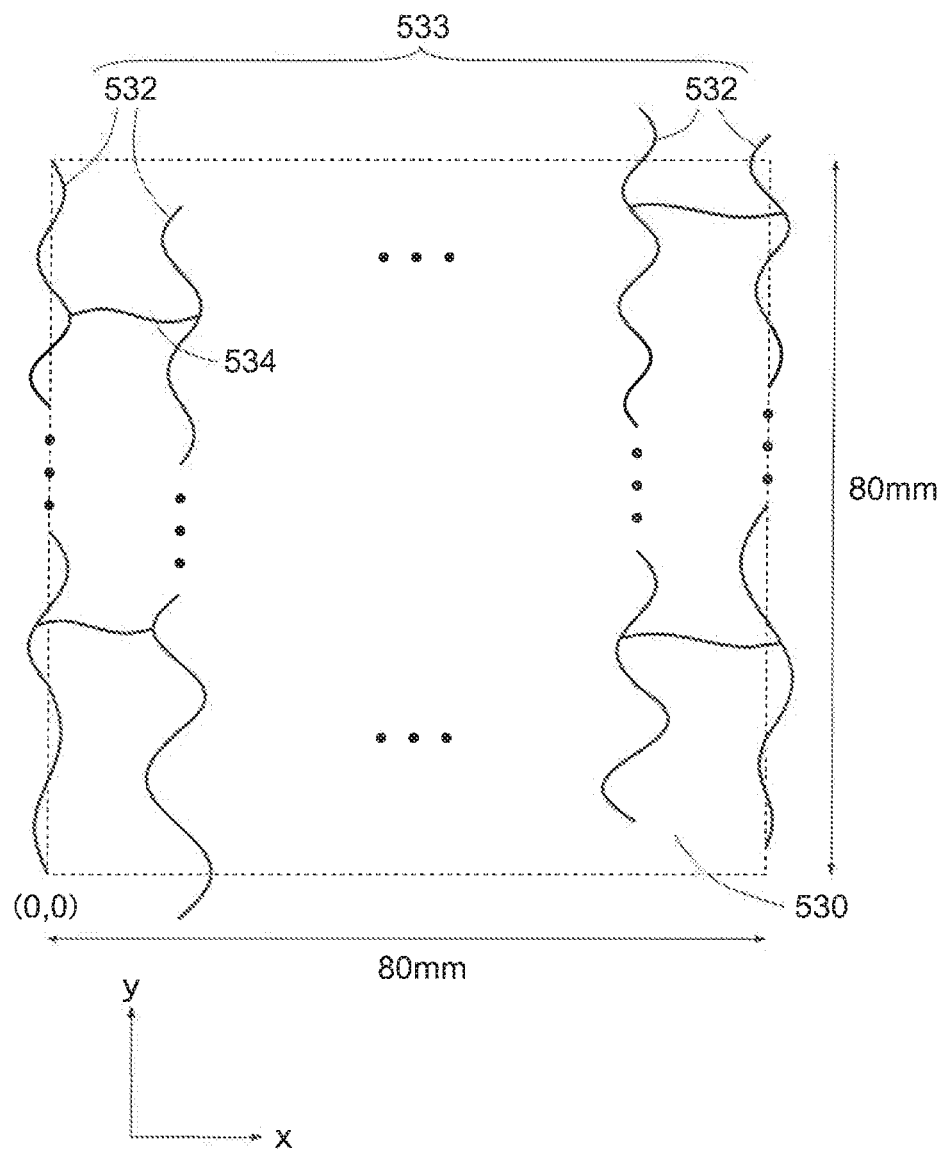
FIG. 59 is a plan view of a conductive heat-generating body having bypass heat-generating bodies.

Although not illustrated in the flowchart in FIG. 58, as illustrated in FIG. 59, it is desirable to provide the bypass heat-generating body 534 for connecting two adjacent curved heat-generating bodies 532 in the first direction x in the conductive heat-generating body 505. Even if an arbitrary curved heat-generating body 532 is disconnected, the bypass heat-generating body 534 can supply current via the curved heat-generating body 532 adjacent to the disconnected one. The bypass heat-generating body 534 may be generated after generating the plurality of curved heat-generating bodies 532 in the range 531 of 80 mm square, or at the time when the two curved heat-generating bodies 532 adjacent to each other in the first direction x are generated, the bypass heat-generating body 534 for connecting these two curved heat-generating bodies 532 may be generated.

The bypass heat-generating body 534 has the same line width (for example, 5 to 20 μm, preferably 7 to 10 μm) as the curved heat-generating body 532, and the bypass heat-generating bodies 534 are arranged in the heat-generating body row 533 of 80 mm square at a uniform density. By arranging the bypass heat-generating bodies 534 with a uniform density, uneven heat in the heat-generating body row 533 can be prevented. The bypass heat-generating bodies 534 connected to the respective curved heat-generating bodies 532 are irregularly arranged.

Figure 60:
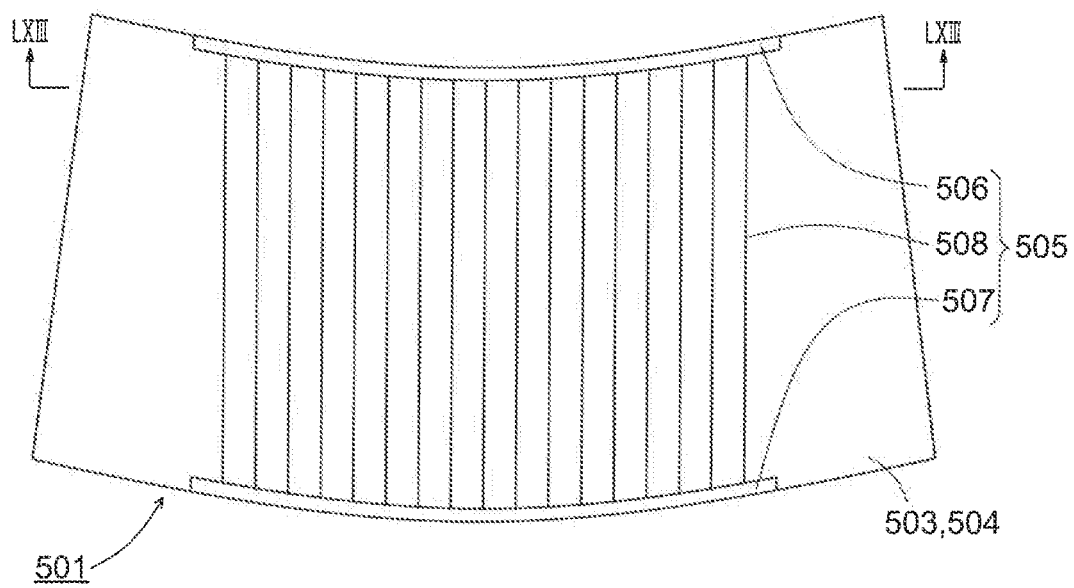
FIG. 60 is a view illustrating an example in which a conductive heat-generating body is incorporated in a front window of a car.

FIG. 60 illustrates an example in which the conductive heat-generating body 505 according to the present embodiment is incorporated into a front window 502 of a car. The front window 502 is a laminated glass to which the conductive heat-generating body 505 is incorporated.

The front window 502 in FIG. 60 includes a pair of glass plates 503 and 504 and the conductive heat-generating body 505 arranged between the pair of glass plates 503 and 504. The conductive heat-generating body 505 includes two bus bar electrodes (first and second electrodes) 506 and 507 and a plurality of wavy line conductors 508 connected to the bus bar electrodes. In FIG. 60, each wavy line conductor 508 is illustrated as a straight line, the wavy line conductor 508 is actually formed by connecting periodic curved lines of which a period and an amplitude are irregular, as illustrated in FIG. 55.

More specifically, the plurality of wavy line conductors 508 is formed by combining the plurality of heat-generating body rows 533 described above. That is, both ends of each wavy line conductor 508 are respectively connected to the two bus bar electrodes 506 and 507, and each wavy line conductor 508 is formed by connecting single curved heat-generating bodies 532 in each of the plurality of heat-generating body rows 533 arranged in the second direction y as illustrated in FIG. 55.

In the example in FIG. 60, the two bus bar electrodes 506 and 507 are arranged along both side of the front window 502 in the longitudinal direction. However, as illustrated in FIG. 61, it is possible that the two bus bar electrodes 506 and 507 are arranged along both sides of the front window 502 in the short-side direction and the plurality of wavy line conductors 508 is arranged along the longitudinal direction of the front window 502.

Figure 61:
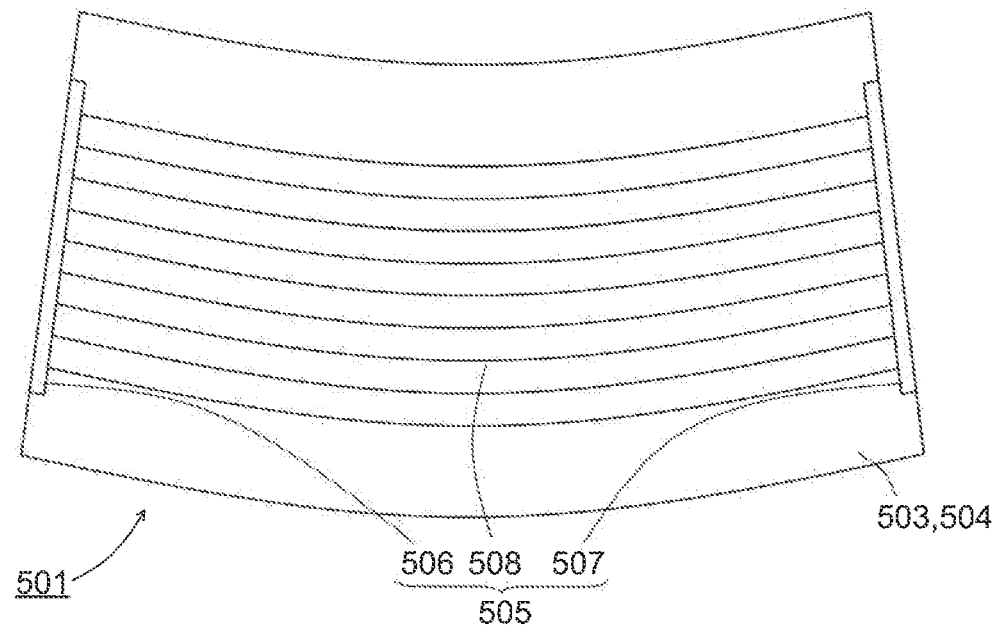
FIG. 61 is a diagram in which two bus bar electrodes are arranged along sides on both ends of the front window in a short-side direction and a plurality of wavy line conductors is arranged along a longitudinal direction of the front window.

The shapes of the wavy line conductors 508 in FIGS. 60 and 61 are irregular. However, intervals (pitch) between reference lines (broken line 532a in FIG. 55) of the wavy line conductors 508 are substantially constant, and the reference lines are substantially parallel. For example, eight or less wavy line conductors 508 are arranged per cm of the front window 502 in the longitudinal direction. That is, it is desirable that the pitch of the wavy line conductors 508 be equal to or more than 0.125 cm.

The plurality of wavy line conductors 508 and the two bus bar electrodes 506 and 507 are formed of a common conductive material and are integrally molded. As the conductive material, for example, copper which has excellent conductivity and is easily etched is used. As will be described later, in the present embodiment, the plurality of wavy line conductors 508 and the two bus bar electrodes 506 and 507 are integrally formed by photolithography. A conductive material other than copper may be used as long as the material has excellent conductivity and can be easily processed by photolithographic etching.

By applying a predetermined voltage between the two bus bar electrodes 506 and 507, a current flows into the plurality of wavy line conductors 508 between the bus bar electrodes 506 and 507, and a resistance component of each wavy line conductor 508 heats each wavy line conductor 508. As a result, the pair of glass plates 503 and 504 is heated, and fogging caused by dew condensation attached on the glass plates can be removed. In addition, snow or ice attached on the outer glass plate can be melted. Therefore, a passenger's visibility in the vehicle is preferably secured. In this way, the conductive heat-generating body 505 functions as a defroster electrode.

Since it is necessary for the bus bar electrodes 506 and 507 to apply voltage to each wavy line conductor 508 without power loss, the width of each of the bus bar electrodes 506 and 507 in the short-side direction is larger than the width of each wavy line conductor 508 in the short-side direction. In the present embodiment, since the patterns of the bus bar electrodes 506 and 507 and the wavy line conductors 508 are formed by etching a copper thin film, a width of the pattern for the bus bar electrodes 506 and 507 is formed to be larger than a width of the pattern for the wavy line conductor 508.

Figure 62:
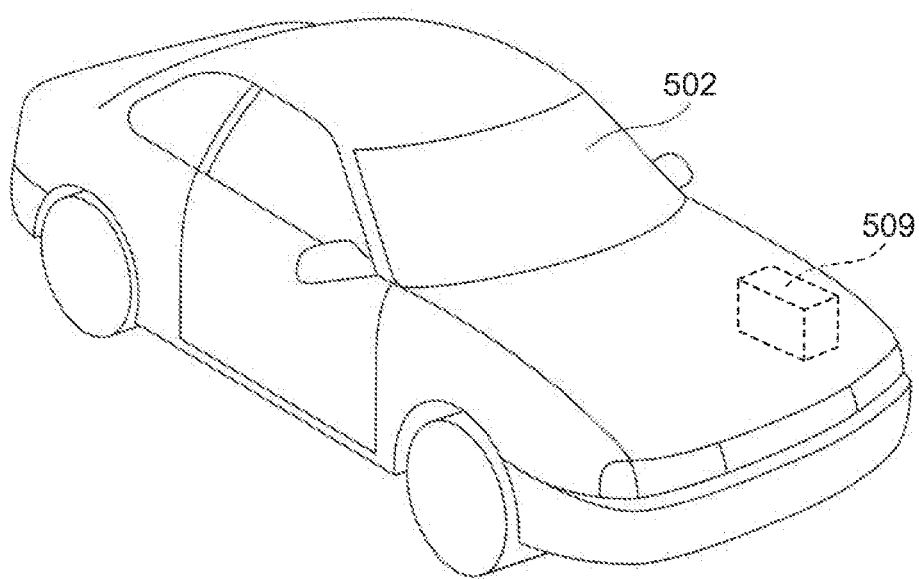
FIG. 62 is a perspective view of a vehicle.

The voltage to be applied to the two bus bar electrodes 506 and 507 is supplied from the battery 509 mounted on the vehicle, a battery cell, or the like, for example, as illustrated in FIG. 62.

Figure 63:
FIG. 63 is a cross-sectional view taken along a line LXIII-LXIII in FIG. 60 of the front window.
Figure 64A:
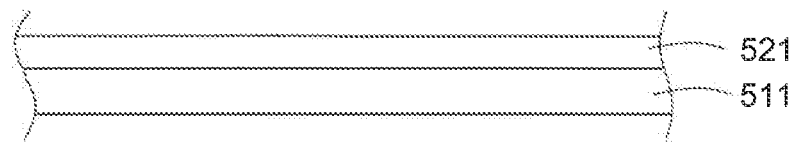
FIGS. 64(a) to 64(e) are cross-sectional views illustrating a process for manufacturing a conductive heat-generating body.
Figure 64B:
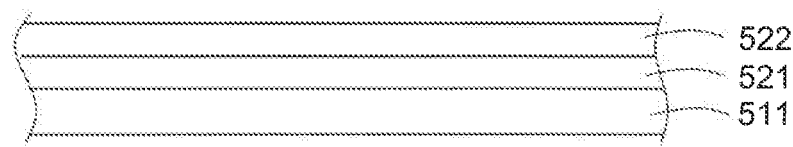
Figure 64C:
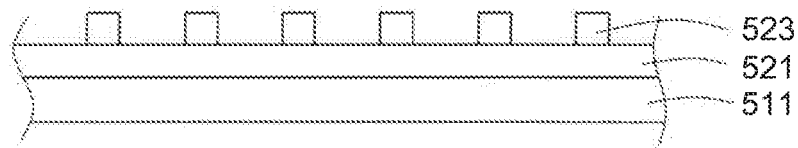
Figure 64D:
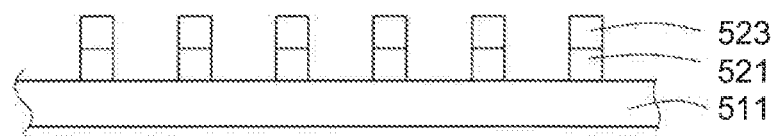
Figure 64E:
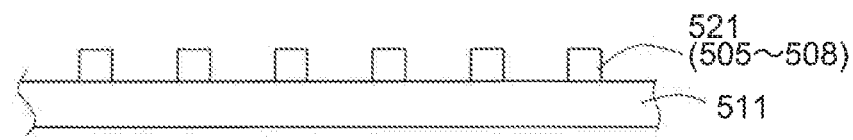

As illustrated in FIG. 63, the conductive heat-generating body 505 in which the plurality of wavy line conductors 508 and the two bus bar electrodes 506 and 507 are integrally molded is formed on a transparent base material 511. The transparent base material 511 may be sandwiched between the pair of glass plates 503 and 504 without peeled off, only the conductive heat-generating body 505 from which the transparent base material 511 is peeled off may be sandwiched between the pair of glass plates 503 and 504. The transparent base material 511 on which the conductive heat-generating body 505 is formed is referred to as a heating element sheet 512 herein.

The wavy line conductor 508 is formed by connecting a plurality of sine waves with irregular periods and amplitudes in the second direction y, and the wavy line conductor 508 is formed by etching a copper foil or coating conductive ink. For example, when the wavy line conductor 508 is formed by etching processing, the side surfaces of the wavy line conductor 508 are arranged in a direction with an angle close to the right angle with respect to a top surface and a bottom surface. Therefore, when the side surface has a planar shape, reflected light from the side surface travels in a specific direction, and a person in the specific direction feels strong flicker. However, in the present embodiment, since the wavy line conductor 508 has an irregularly curved shape, each side surface has an irregular shape, and strong flicker is not felt in the specific direction.

FIG. 63 is a cross-sectional view taken along a line LXIII-LXIII in FIG. 60 of the front window 502 having the heating element sheet 512, in which the conductive heat-generating body 505 is formed on the transparent base material 511, sandwiched between the pair of glass plates 503 and 504. In a case of FIG. 63, the transparent base material 511 of the heating element sheet 512 is bonded on the one curved glass plate 503 via a bonding layer (first bonding layer) 513. On the conductive heat-generating body 505 of the heating element sheet 512, the other glass plate 504 is bonded via a bonding layer (second bonding layer) 514.

Since the transparent base material 511 of the heating element sheet 512 and the conductive heat-generating body 505 are sufficiently thin, the heating element sheet 512 has flexibility, and the glass plates 503 and 504 can be stably bonded to each other in a state where the heating element sheet 512 is curved along the curved shapes of the curved glass plates 503 and 504.

Particularly, when the glass plates 503 and 504 are used for the front window 502 of a vehicle, it is preferable to use a glass with a high visible light transmittance so as not to interfere the field of view of a passenger. As a material of the glass plates 503 and 504, soda-lime glass and blue plate glass can be used. It is preferable that a transmittance of the glass plates 503 and 504 in a visible light region be equal to or higher than 90%. Here, the visible light transmittance of the glass plates 503 and 504 is specified as an average value of transmittances in respective wavelengths when the transmittance is measured by a spectrophotometer (for example, "UV-3100PC" manufactured by SHIMADZU CORPORATION, conforming to JISK0115) within a measurement wavelength range of 380 nm to 780 nm. The visible light transmittance may be lowered by coloring a part of or all of the glass plates 503 and 504. In this case, direct sunlight can be shielded, and it is possible to make it difficult to visually recognize an interior of the vehicle from the outside of the vehicle.

Furthermore, it is preferable that the glass plates 503 and 504 have a thickness of equal to or more than 1 mm and equal to or less than 5 mm. With such a thickness, a glass plate having excellent strength and optical characteristics can be obtained.

The glass plates 503 and 504 are bonded to the conductive heat-generating body 505 formed on the transparent base material 511 via the respective bonding layers 513 and 514. As such bonding layers 513 and 514, a layer formed of a material having various adhesiveness and viscosity can be used. Furthermore, it is preferable to use a material having a high visible light transmittance for the bonding layers 513 and 514. As typical bonding layers 513 and 514, a layer formed of polyvinyl butyral (PVB) can be exemplified. It is preferable that the thickness of each of the bonding layers 513 and 514 be equal to or more than 0.15 mm and equal to or less than 0.7 mm.

A laminated glass such as a front window 502 is not limited to the illustrated example, and other function layer that is expected to perform a specific function may be provided. Furthermore, one function layer may perform two or more functions, and for example, various functions may be applied to at least one of the glass plates 503 and 504 of a laminated glass 1, the bonding layers 513 and 514, and the transparent base material 511. For example, an anti-reflection (AR) function, a hard coating (HG) function having scratch resistance, an infrared ray shielding (reflection) function, an ultraviolet ray shielding (reflection) function, a polarization function, and an antifouling function can be exemplified.

The transparent base material 511 functions as a base material for supporting the conductive heat-generating body 505. The transparent base material 511 is a so-called transparent electrically insulating substrate for transmitting light with a wavelength in a visible light wavelength band (380 nm to 780 nm) and includes a thermoplastic resin.

As a thermoplastic resin included in the transparent base material 511 as a main component, any resin may be used as long as a thermoplastic resin transmits visible light. For example, an acrylic resin such as polymethyl methacrylate, a polyolefin resin such as polypropylene, a polyester resin such as polyethylene terephthalate and polyethylene naphthalate, a cellulose resin such as triacetylcellulose (cellulose triacetate), polyvinyl chloride, polystyrene, a polycarbonate resin, and an AS resin can be exemplified. Especially, an acrylic resin and polyethylene terephthalate are preferable because an acrylic resin and polyethylene terephthalate have excellent optical characteristics and can be easily molded.

In consideration of retention and a light transmittance of the conductive heat-generating body 505 in production, it is preferable that the thickness of the transparent base material 511 be equal to or more than 0.02 mm and equal to or less than 0.20 mm.

FIG. 64 is a cross-sectional view illustrating a process for manufacturing the conductive heat-generating body 505 and illustrates a cross-sectional structure in a direction of a line LXIII-LXIII in FIG. 60. First, as illustrated in FIG. 64(*a*), a copper thin film 521 is formed on the transparent base material 511. The thin film 521 can be formed by an electric field copper foil, a rolled copper foil, sputtering, vacuum vapor deposition or the like.

Next, as illustrated in FIG. 64(*b*), a top surface of the copper thin film 521 is covered with a photoresist 522. The photoresist 522 is, for example, a resin layer having photosensitivity relative to light in a specific wavelength range, for example, ultraviolet light. The resin layer may be formed by adhering a resin film or may be formed by coating a fluid resin. In addition, a specific photosensitive characteristics of the photoresist 522 is not particularly limited. For example, as the photoresist 522, a photocurable photosensitive material may be used, or a light dissolving type photosensitive material may be used.

Subsequently, as illustrated in FIG. 64(*c*), the photoresist 522 is patterned to form a resist pattern 523. As a method for patterning the photoresist 522, various known methods can be employed. However, in this example, a resin layer having photosensitivity relative to light in a specific wavelength range, for example, ultraviolet light is used as the photoresist 522, and the photoresist 522 is patterned by using known photolithography technique. First, on the photoresist 522, a mask on which a portion to be patterned is opened or a mask in which a portion to be patterned is shielded is arranged. As described above, on the mask, a pattern in which both end faces extending in the longitudinal direction of the wavy line conductor 508 meander is illustrated. Furthermore, in some cases, a pattern in which the entire wavy line conductor 508 in the longitudinal direction meanders may be drawn on the mask.

Next, the photoresist 522 is irradiated with ultraviolet rays through the mask. Thereafter, a portion where ultraviolet rays are shielded by the mask or a portion irradiated with ultraviolet rays is removed by a method such as development. Thus, the patterned resist pattern 523 can be formed. A laser patterning method performed without a mask can be used.

Next, as illustrated in FIG. 64(*d*), etchant for wet etching is jet from an upper side of the resist pattern 523, and the copper thin film 521 which is not covered with the resist pattern 523 is etched and removed, and only a region of the copper thin film 521 covered with the resist pattern 523 is left. Next, as illustrated in FIG. 64(*e*), by peeling off the resist pattern 523, the plurality of wavy line conductors 508 and the two bus bar electrodes 506 and 507 are produced. Thereafter, the plurality of wavy line conductors 508 and the two bus bar electrodes 506 and 507 formed on the transparent base material 511 are sandwiched and sealed between the pair of glass plates 503 and 504.

A dark color layer to reduce the reflectance of the conductive heat-generating body 505 may be formed on the patterned surface of the copper thin film 521 or on a lower surface of the copper thin film 521. By forming the dark color layer, the reflected light in a case where external light is irradiated on the surface of the wavy line conductor 508 can be reduced, and occurrence of flicker can be prevented.

In a case where only the plurality of wavy line conductors 508 is formed by photolithography without integrally molding the bus bar electrodes 506 and 507, when the etchant is jetted in an etching process in photolithography, etching is further processed on both ends of the wavy line conductor 508 in the longitudinal direction than the center part in the longitudinal direction, and a width between the both ends of the wavy line conductor 508 in the longitudinal direction is reduced too much, and the wavy line conductor 508 is not conducted to the bus bar electrodes 506 and 507 or resistances of both ends of the wavy line conductor 508 in the longitudinal direction are abnormally increased. On the other hand, in a case where the plurality of wavy line conductors 508 and the two bus bar electrodes 506 and 507 are integrally molded as in the present embodiment, since the etchant flowing from the center of the wavy line conductors 508 in the longitudinal direction to both ends is stopped by the bus bar electrodes 506 and 507, the entire wavy line conductor 508 is evenly immersed in the etchant, and a failure such that the both ends of the wavy line conductor 508 in the longitudinal direction are more etched and removed does not occur.

Furthermore, in the present embodiment, since the plurality of wavy line conductors 508 and the two bus bar electrodes 506 and 507 are integrally molded by photolithography, contact property between the wavy line conductor 508 and the bus bar electrodes 506 and 507 is enhanced, power loss at bonding portions between the wavy line conductor 508 and the bus bar electrodes 506 and 507 is reduced, and a heat generation efficiency is improved than a case where the plurality of wavy line conductors 508 is formed by photolithography in advance and the bus bar electrodes 506 and 507 separated from the wavy line conductor 508 are bonded to the wavy line conductor 508.

The heating element sheet 512 produced by the manufacturing process in FIG. 64 is arranged between the pair of curved glass plates 503 and 504. More specifically, a laminated glass is produced by laminating the one glass plate 503, the bonding layer 513, the heating element sheet 512, the bonding layer 514, the glass plate 504 in this order and pressurizing and heating them.

In the manufacturing process in FIG. 64 described above, an example has been described in which the laminated glass is formed by sealing with the pair of glass plates 503 and 504 after the wavy line conductor 508 and the like is formed on the transparent base material 511 by etching and the like. However, in this example. The transparent base material 511 is included between the pair of glass plates 503 and 504, and the number of layers between the pair of glass plates 503 and 504 is increased, and the increase in the thickness increases the weight, and visibility may be deteriorated due to a difference between the optical characteristics of the layers. In addition, by including the transparent base material 511, heat transfer characteristics are deteriorated. In addition, since the pair of glass plates 503 and 504 is curved as illustrated in FIG. 63, wrinkles may occur in the transparent base material 511.

Figure 65:
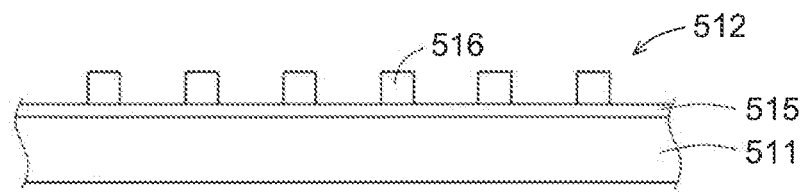
FIG. 65 is a cross-sectional view of a heating element sheet.

Therefore, as illustrated in FIG. 65, after the heating element sheet 512 in which the conductive heat-generating body 516 including the bus bar electrodes 506 and 507 and the wavy line conductor 508 is formed on the transparent base material 511 via the peeling layer 515 is produced and the heating element sheet 512 is bonded to one glass plate, it is possible that the transparent base material is peeled off and the other glass plate is bonded after that. FIGS. 66 to 69 are cross-sectional views illustrating an example of a process for manufacturing a laminated glass using the heating element sheet 512 in FIG. 65.

First, the bonding layer 514 and the glass plate 504 are laminated on the heating element sheet 512 from a surface on which a heating element is formed (upper side in FIG. 66), and subsequently, the heating element sheet 512, the bonding layer 514, and the glass plate 504 are bonded to form a first intermediate member 517. For example, it is possible that a laminate in which the bonding layer 514 and the glass plate 504 are laminated on the heating element sheet 512 is conveyed into an autoclave apparatus, the heating element sheet 512, the bonding layer 514, and the glass plate 504 are heated and pressurized, and the laminate is taken out from the autoclave apparatus. In this case, if a pressure in the autoclave apparatus is reduced before the heating element sheet 512, the bonding layer 514, and the glass plate 504 are heated and pressurized, it is possible to prevent bubbles from remaining in the bonding layer 514, in an interface between the bonding layer 514 and the heating element sheet 512, and an interface between the bonding layer 514 and the glass plate 503.

Figure 66:
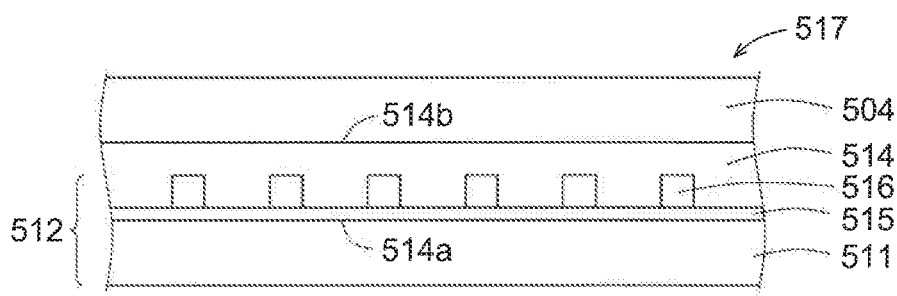
FIG. 66 is a cross-sectional view illustrating an example of a process for manufacturing a laminated glass using the heating element sheet in FIG. 65.

As a result, as illustrated in FIG. 66, the first intermediate member 517 in which the transparent base material 511, the peeling layer 515, the conductive heat-generating body 516, the bonding layer 514, and the glass plate 504 are laminated is obtained. The bonding layer 514 of the first intermediate member 517 has a first surface 514a and a second surface 514b, and at least a part of the conductive heat-generating body 516 is embedded in the first surface 514a of the bonding layer 514. In the illustrated example, the conductive heat-generating body 516 is completely embedded in the bonding layer 514 from the side of the first surface 514a of the bonding layer 514. As a result, the bonding layer 514 is in surface contact with the peeling layer 515 via a gap between the conductive heat-generating bodies 516. Furthermore, the bonding layer 514 is in surface contact with the entire peeling layer 515 exposed in the heat-generating body row 533.

In the examples illustrated in FIGS. 66 to 70, for simple illustration, the flat glass plates 503 and 504 are illustrated. However, actually, the glass plates are curved as in FIG. 63. Since the first intermediate member 517 is bonded to the glass plate 504, the first intermediate member 517 is curved in correspondence with the shape of the glass plate 504.

Figure 67:
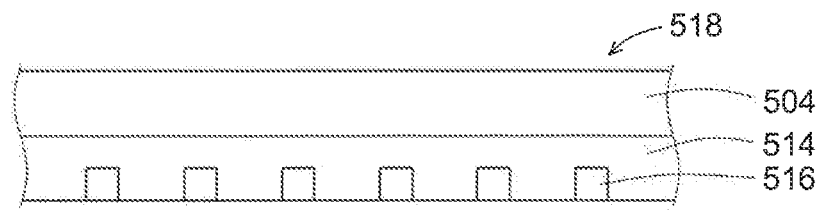
FIG. 67 is a cross-sectional view of the manufacturing process subsequent to FIG. 66.

Next, as illustrated in FIG. 67, the transparent base material 511 of the heating element sheet 512 of the first intermediate member 517 is removed to produce a second intermediate member 518 (intermediate member for laminated glass). In the example illustrated in FIG. 67, the transparent base material 511 of the heating element sheet 512 is peeled off from the first intermediate member 517 using the peeling layer 515 and is removed from the first intermediate member 517. In a case where an interface peeling type peeling layer 515 having a layer with relatively low adhesion with the bonding layer 514 and the conductive heat-generating body 516 than the adhesion with the transparent base material 511 is used as a peeling layer 515, the peeling layer 515 is peeled off from the bonding layer 514 and the conductive heat-generating body 516. In this case, it is possible that the peeling layer 515 does not remain on the side of the bonding layer 514 and the conductive heat-generating body 516. That is, the transparent base material 511 together with the peeling layer 515 are removed from the first intermediate member 517. In the first intermediate member 517 from which the transparent base material 511 and the peeling layer 515 are removed in this way, the bonding layer 514 is exposed in the gap between the conductive heat-generating bodies 516.

On the other hand, in a case where an interface peeling type peeling layer 515 having relatively low adhesion with the transparent base material 511 than the adhesion with the bonding layer 514 and the conductive heat-generating body 516 is used as a peeling layer 515, the peeling layer 515 and the transparent base material 511 are peeled off from each other. In a case where an interlayer peeling type peeling layer 515 that includes a plurality of layers of films and has relatively lower adhesion between the plurality of layers than the adhesion with the bonding layer 514, the conductive heat-generating body 516, and the transparent base material 511 is used as a peeling layer 515, the plurality of layers is peeled off from each other. On the other hand, an aggregation peeling type peeling layer 515 in which a filler as a dispersed phase is dispersed in a base resin as a continuous phase is used as a peeling layer 515, peeling phenomenon due to cohesive failure in the peeling layer 515 occurs.

The bonding layer 514 of the second intermediate member 518 has a first surface 514a and a second surface 514b, and at least a part of the conductive heat-generating body 516 is embedded in the first surface 514a of the bonding layer 514.

A laminated glass 510 manufactured as described above is illustrated in FIG. 68. The laminated glass 510 includes the pair of glass plates 503 and 504, the bonding layer 514 arranged between the pair of glass plates 503 and 504 and bonding the pair of glass plates 503 and 504 to each other, and the conductive heat-generating bodies 516 arranged between the bonding layer 514 and one of the pair of glass plates 503 and 504. The laminated glass 510 can be manufactured using the heating element sheet 512 as described above. The conductive heat-generating body 516 of the heating element sheet 512 can be produced on the transparent base material 511 by using various materials and various methods, and in addition, a desired pattern can be applied with high accuracy. Therefore, it is possible to reduce adverse effects on visibility caused by light diffusion and light diffraction in the wavy line conductor 508 included in the conductive heat-generating body 516. In addition, since the conductive heat-generating body 516 has contact with one of the pair of glass plates 503 and 504, a heating efficiency of the glass plates 503 and 504 by the conductive heat-generating body 516 can be increased. In addition, the number of interfaces in the laminated glass 510 can be reduced, and the thickness of the entire laminated glass 510 can be reduced. Therefore, deterioration in optical characteristics, that is, deterioration in visibility can be prevented. In addition, the weight of the entire laminated glass 510 can be reduced, and this contributes to improve fuel consumption of a vehicle.

Furthermore, the illustrated heating element sheet 512 is in surface contact with the glass plates 503 and 504. In such a laminated glass 510, a heating efficiency of the glass plate by the heating element sheet 512 can be more increased.

Figure 68:
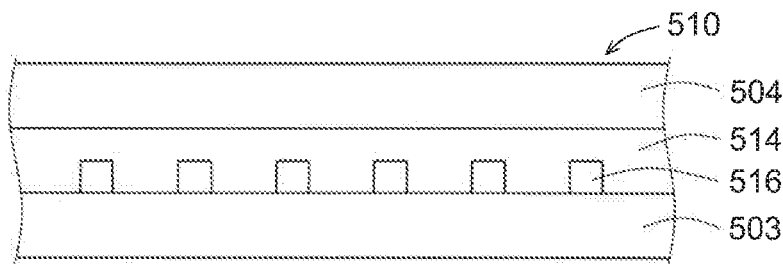
FIG. 68 is a cross-sectional view of the manufacturing process subsequent to FIG. 67.

Furthermore, in the laminated glass 510 in FIG. 68, since the transparent base material 511 does not exist between the curved glass plates 503 and 504 and the heating element sheet 512, even when the pair of glass plates 503 and 504 are curved, the bonding layer 514 and the conductive heat-generating body 516 are easily curved in corresponding with the curve of the glass plates 503 and 504. That is, a disadvantage such that the transparent base material 511 causes wrinkles between the pair of glass plates 503 and 504 can be eliminated.

Furthermore, a manufacturing method illustrated in FIGS. 66 to 68 includes a process for bonding the glass plate 504 to the heating element sheet 512 including the transparent base material 511, the peeling layer 515 provided on the transparent base material 511, and the conductive heat-generating body 516 provided on the peeling layer 515 from the side of the conductive heat-generating body 516 via the bonding layer 514, a process for removing the transparent base material 511, and a process for bonding the other glass plate 503 to the bonding layer 514 from a side opposite to the side facing to the glass plate 504. In this example, since the bonding layer 514 and the conductive heat-generating body 516 are held by the glass plate 504 when the transparent base material 511 is peeled off from the first intermediate member 517, the transparent base material 511 is easily peeled off. Furthermore, since the bonding layer 514 and the glass plate 504 are bonded to the heating element sheet 512 at a time, there is an advantage such that the number of processes can be reduced.

Figure 69:
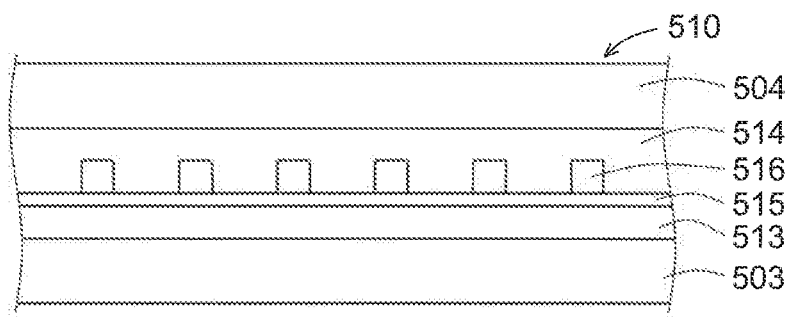
FIG. 69 is a cross-sectional view of a laminated glass in a case where a peeling layer remains.

As described above, in a case where an interface peeling type peeling layer 515 having relatively low adhesion with the transparent base material 511 than the adhesion with the bonding layer 514 and the heating element sheet 512 is used as a peeling layer 515, the peeling layer 515 and the transparent base material 511 are peeled off from each other. In a case where an interlayer peeling type peeling layer that includes a plurality of layers of films and has relatively low adhesion between the plurality of layers than the adhesion with the bonding layer 514, the heating element sheet 512, and the transparent base material 511 is used as a peeling layer 515, the plurality of layers is peeled off from each other. In a case where an aggregation peeling type peeling layer in which a filler as a dispersed phase is dispersed in a base resin as a continuous phase is used as the peeling layer 515, peeling due to cohesive failure in the peeling layer 515 occurs. In a case where these peeling layers 515 are used, in the second intermediate member 518 from which the transparent base material 511 is removed by using the peeling layer 515, at least a part of the peeling layer 515 remains on the side of the bonding layer 514 and the heating element sheet 512. Therefore, a state where the bonding layer 514 is not exposed in the gap between the wavy line conductors 508 occurs. In this case, when the glass plate 503 is laminated on the second intermediate member 518, it is preferable to further provide the bonding layer 513 between the second intermediate member 518 and the glass plate 503 to reliably bond the glass plate 503. In this case, the peeling layer 515 remained on the side of the bonding layer 514 and the heating element sheet 512 is a supporting layer 519 for supporting the heating element sheet 512. As illustrated in FIG. 69, the laminated glass 510 obtained as a result of the above includes the pair of glass plates 503 and 504, the pair of bonding layers 514 and 513 arranged between the pair of glass plates 503 and 504, the supporting layer 519 arranged between the pair of bonding layers 514 and 513, and the heating element sheet 512 arranged between one of the pair of bonding layers 514 and 513 and the supporting layer 519 and supported by the supporting layer 519.

In this way, in the present embodiment, a ratio obtained by dividing the total length of each curved heat-generating body 532 of the conductive heat-generating body 516 in the second direction y by the shortest distance between both ends of each curved heat-generating body 532 is set to be larger than 1.0 and equal to or less than 1.5. With this setting, uneven heat can be surely prevented within the range of the heat-generating body row 533 including the plurality of curved heat-generating bodies 532.

Furthermore, in the present embodiment, since the period and the amplitude of the plurality of periodic curved lines included in each curved heat-generating body 532 are irregular for each period, a beam of light and flicker are not conspicuous. Furthermore, since the start position coordinates of the curved heat-generating bodies 532 in the second direction y are irregularly shifted from each other, even when the plurality of heat-generating body rows 533 including the plurality of curved heat-generating bodies 532 is aligned, a beam of light and flicker are inconspicuous.

Aspects of the present invention are not limited to the above embodiments and include various modifications that can be conceived by those skilled in the art, and the effects of the present invention is not limited to the contents described above. In other words, various additions, modifications, and partial deletion can be made without departing from the conceptual idea and the gist of the present invention derived from the contents defined in the claims and equivalents thereof.

Seventh Embodiment

Here, "bonding" includes not only "complete bonding" in which bonding is completed but also so-called "temporarily bonding" for temporarily bonding before "complete bonding".

Figure 70:
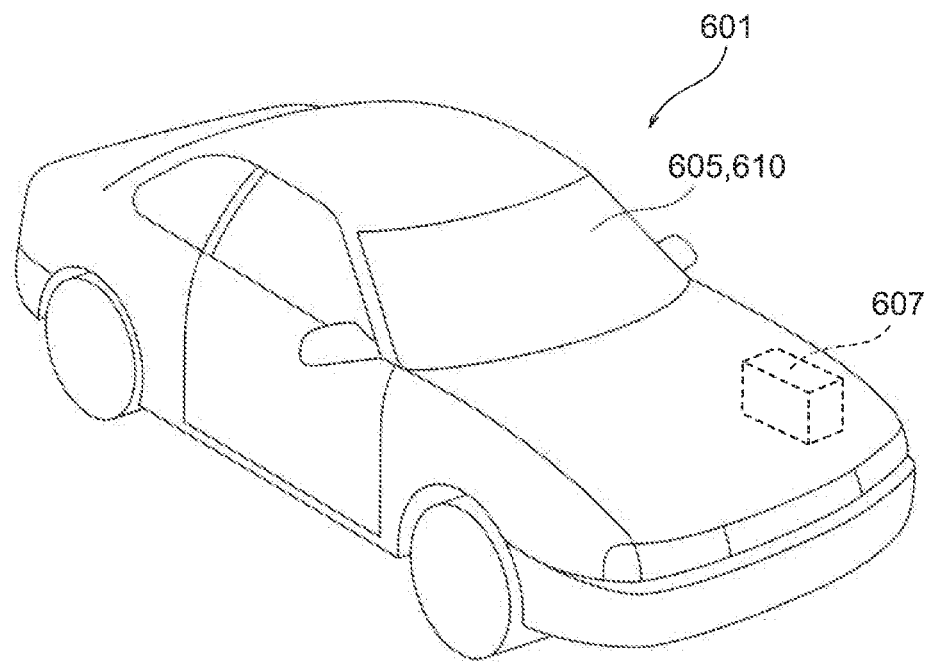
FIG. 70 is a view for explaining an embodiment according to the present invention and is a perspective view schematically illustrating a vehicle including a heat-generating plate. Particularly, in FIG. 70, an automobile including a heat-generating plate is schematically illustrated as an example of the vehicle.
Figure 71:
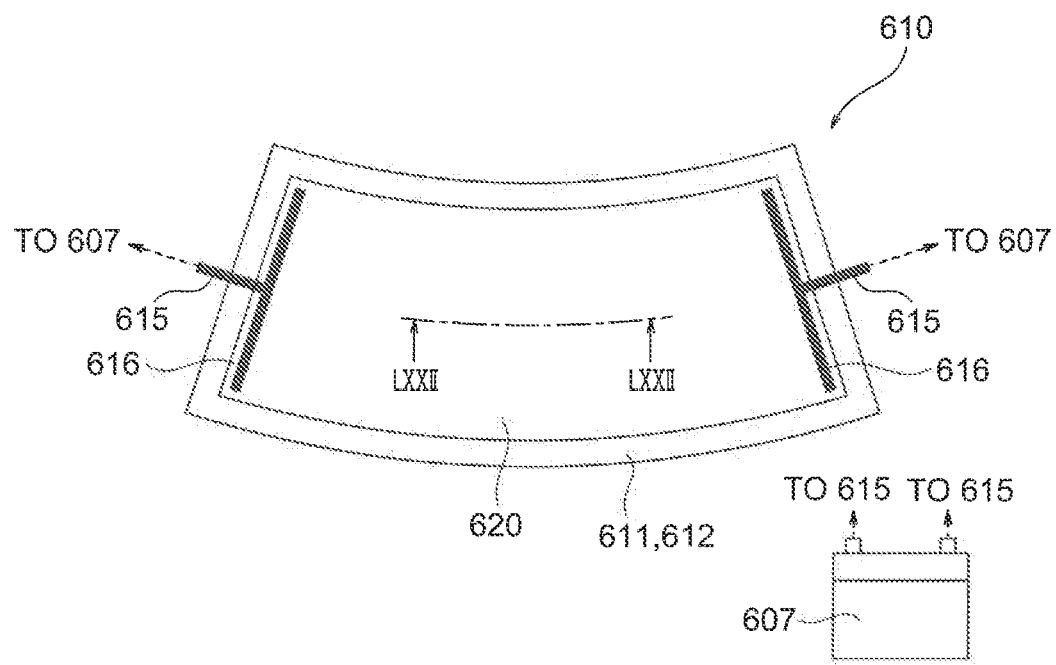
FIG. 71 is a view illustrating the heat-generating plate as viewed from a normal direction of a plate surface.
Figure 72:
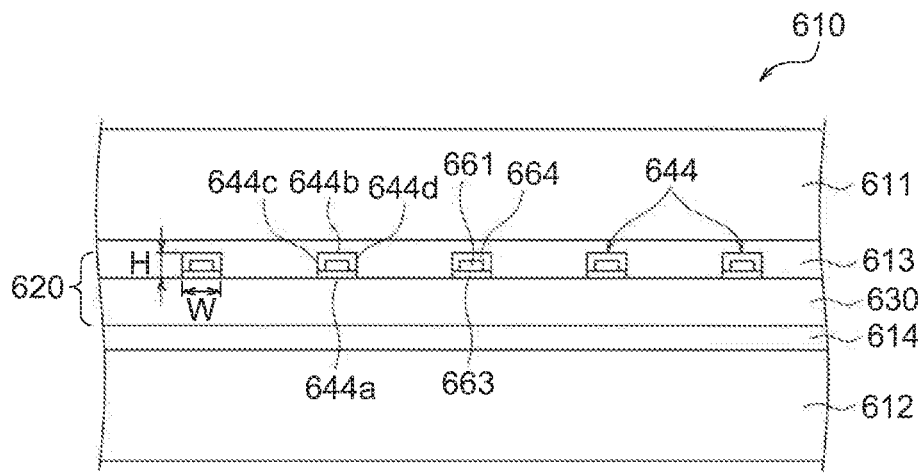
FIG. 72 is a cross-sectional view of the heat-generating plate in FIG. 71.

FIGS. 70 and 71 are views for explaining one embodiment of the present invention. FIG. 70 is a view schematically illustrating an automobile including a heat-generating plate, FIG. 71 is a view of the heat-generating plate viewed from the normal direction of the plate surface, and FIG. 72 is a cross-sectional view of the heat-generating plate in FIG. 71. Note that the heat-generating plate according to the present embodiment may be referred to as a laminated glass.

As illustrated in FIG. 70, an automobile 601 as an example of a vehicle includes a window glass such as a front window, a rear window, and a side window. Here, a front window 605 configured by a heat-generating plate 610 is exemplified. In addition, the automobile 601 includes a power supply 607 such as a battery.

The heat-generating plate 610 viewed from a normal direction of a plate surface is illustrated in FIG. 71. A cross-sectional view of the heat-generating plate 610 corresponding to a line LXXII-LXXII in FIG. 71 is illustrated in FIG. 72. In the example illustrated in FIG. 72, the heat-generating plate 610 includes a pair of glass plates 611 and 612, a conductive pattern sheet (pattern sheet) 620 arranged between the pair of glass plates 611 and 612, and bonding layers 613 and 614 for respectively bonding the glass plates 611 and 612 to the conductive pattern sheet 620. In the examples illustrated in FIGS. 70 and 71, the heat-generating plate 610 is curved. However, in FIGS. 72 and 82 to 89, for simple illustration and easy understanding, the heat-generating plate 610 and the glass plates 611 and 612 having plate-like shapes are illustrated.

The conductive pattern sheet 620 includes a sheet-like base material 630, a conductive pattern 640 formed on the base material 630, a wiring portion 615 for energizing the conductive pattern 640, and a connecting portion 616 for connecting the conductive pattern 640 to the wiring portion 615.

In the examples illustrated in FIGS. 71 and 72, the power supply 607 such as a battery including a lead storage battery and a lithium ion storage battery, a solar battery, and a commercial AC power supply supplies power to the conductive pattern 640 via the wiring portion 615 and the connecting portion 616 and heats the conductive pattern 640 by resistance heating. Heat generated by the conductive pattern 640 is transmitted to the glass plates 611 and 612 via the bonding layers 613 and 614 and heats the glass plates 611 and 612. As a result, fogging due to dew condensation attached on the glass plates 611 and 612 can be removed. In a case where snow or ice is attached on the glass plates 611 and 612, snow and ice can be melted. Therefore, a passenger's visibility is preferably secured.

Particularly, when the glass plates 611 and 612 are used for the front window of an automobile, it is preferable to use a glass with a high visible light transmittance so as not to interfere the field of view of a passenger. As a material for the glass plates 611 and 612, soda-lime glass and blue plate glass can be used. It is preferable that a transmittance of the glass plates 611 and 612 in a visible light region be equal to or higher than 90%. Here, the visible light transmittance of the glass plates 611 and 612 is specified as an average value of transmittances in respective wavelengths when the transmittance is measured by a spectrophotometer ("UV-3100PC" manufactured by SHIMADZU CORPORATION, conforming to JIS K 0115) within a measurement wavelength range of 380 nm to 780 nm. The visible light transmittance may be lowered by coloring a part of or all of the glass plates 611 and 612. In this case, direct sunlight can be shielded, and it is possible to make it difficult to visually recognize an interior of the vehicle from the outside of the vehicle.

Furthermore, it is preferable that the glass plates 611 and 612 have a thickness of equal to or more than 1 mm and equal to or less than 5 mm. With such a thickness, the glass plates 611 and 612 having excellent strength and optical characteristics can be obtained.

The glass plates 611 and 612 and the conductive pattern sheet 620 are bonded to each other via the respective bonding layers 613 and 614. As such bonding layers 613 and 614, a layer formed of a material having various adhesiveness and viscosity can be used. Furthermore, it is preferable to use a material having a high visible light transmittance for the bonding layers 613 and 614. As a typical bonding layer, a layer formed of polyvinyl butyral (PVB) can be exemplified. It is preferable that the thickness of each of the bonding layers 613 and 614 be equal to or more than 0.15 mm and equal to or less than 0.7 mm.

The heat-generating plate 610 is not limited to the illustrated example, and other function layer that is expected to perform a specific function may be provided. Furthermore, one functional layer may perform two or more functions, and for example, a function may be applied to at least one of the glass plates 611 and 612 and the bonding layers 613 and 614 of the heat-generating plate 610 and the base material 630 of the conductive pattern sheet 620 to be described later. As an example of the function that can be applied to the heat-generating plate 610, an anti-reflection (AR) function, a hard coating (HG) function having scratch resistance, an infrared ray shielding (reflection) function, an ultraviolet ray shielding (reflection) function, a polarization function, and an antifouling function can be exemplified.

Next, the conductive pattern sheet 620 will be described. The conductive pattern sheet 620 includes a sheet-like base material 630, a conductive pattern 640 provided on the base material 630, a wiring portion 615 for energizing the conductive pattern 640, and a connecting portion 616 for connecting the conductive pattern 640 to the wiring portion 615. The conductive pattern 640 is formed by arranging conductive thin wires, formed of metals and the like, in a predetermined pattern. The conductive pattern sheet 620 may have substantially the same planer dimensions as the glass plates 611 and 612 and be arranged across the entire heat-generating plate 610 and may be arranged on a part of the heat-generating plate 610 such as a front portion of a driver's seat.

The sheet-like base material 630 functions as a base material for supporting the conductive pattern 640. The base material 630 is a so-called transparent electrically insulating substrate for transmitting light with a wavelength in a visible light wavelength band (380 nm to 780 nm).

Although the resin included in the base material 630 may be any resin as long as the resin transmits visible light, a thermoplastic resin can be preferably used. As a thermoplastic resin, for example, an acrylic resin such as polymethyl methacrylate, a polyester resin such as polyvinyl chloride, polyethylene terephthalate, and amorphous polyethylene terephthalate (A-PET), a polyethylene resin, a polyolefin resin such as polypropylene, a cellulose resin such as triacetylcellulose (cellulose triacetate), polystyrene, a polycarbonate resin, and an AS resin can be exemplified. In particular, an acrylic resin and polyvinyl chloride are preferable since an acrylic resin and polyvinyl chloride are excellent in etching resistance, weather resistance property, and light resistance property.

In consideration of retention and a light transmittance of the conductive pattern 640, it is preferable that the thickness of the base material 630 be equal to or more than 0.03 mm and equal to or less than 0.3 mm.

Figure 73:
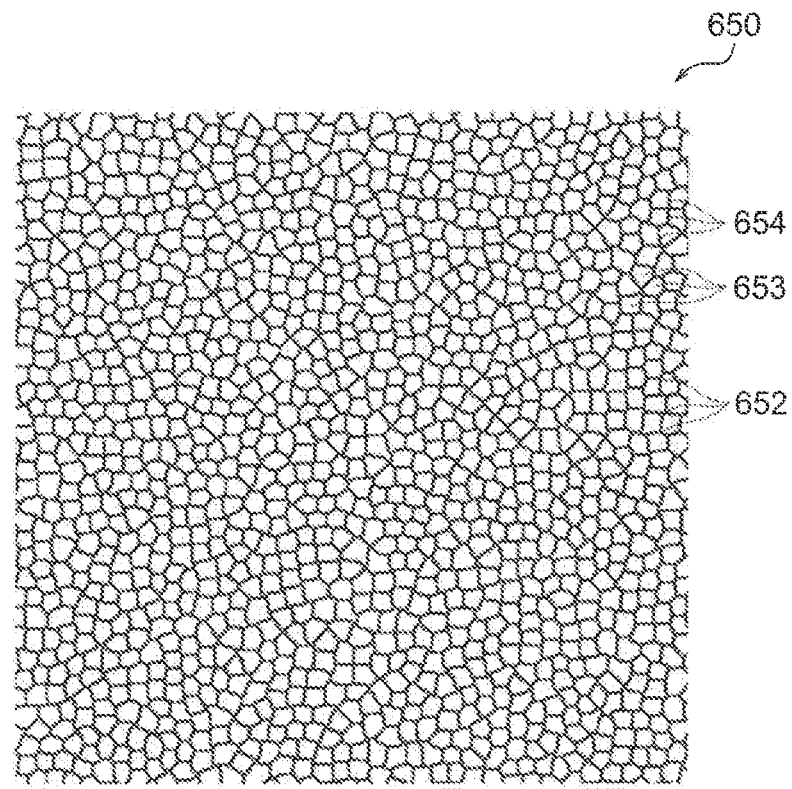
FIG. 73 is a plan view of an exemplary shape of a reference pattern to be referred to determine a conductive pattern of the heat-generating plate.
Figure 74:
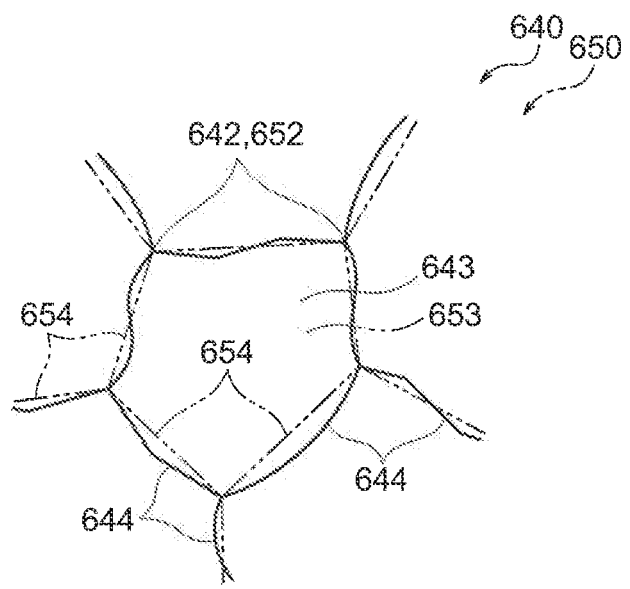
FIG. 74 is an enlarged view of a part of the conductive pattern with the reference pattern illustrated in FIG. 73.
Figure 75:
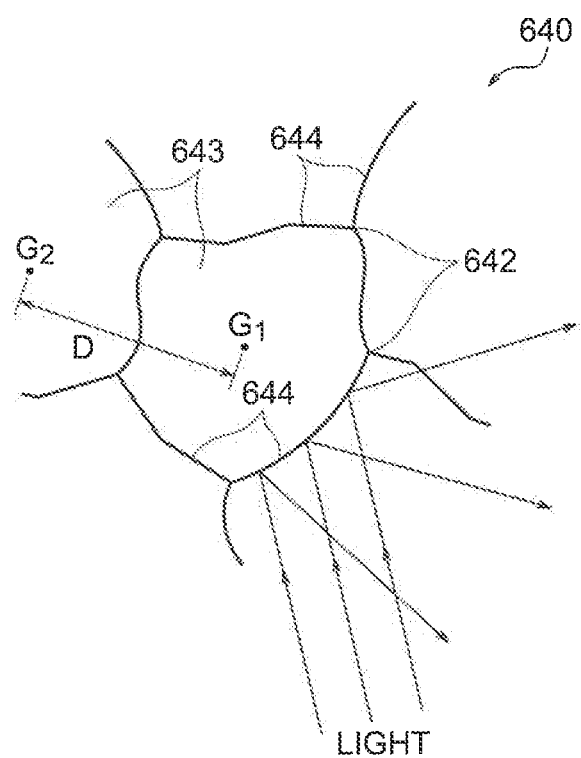
FIG. 75 is a view for explaining an action of the conductive pattern.

With reference to FIG. 73 to 75, the conductive pattern 640 will be described. The conductive pattern 640 is energized from the power supply 607 such as a battery via the wiring portion 615 and the connecting portion 616 and generates heat by resistance heating. Then, the heat is transmitted to the glass plates 611 and 612 via the bonding layers 613 and 614 so as to heat the glass plates 611 and 612.

Regarding the conductive pattern 640 according to the present embodiment, a reference pattern 650 is determined which includes a plurality of line segments 654 extending between two branch points 652 and defining an opening region 653, and subsequently, positions of branch points 642 of the conductive pattern 640 are determined based on the branch points 652 of the reference pattern 650, and after that, positions of connection elements 644 of the conductive pattern 640 are determined based on the determined branch points 642 of the conductive pattern 640 and the line segments 654 of the reference pattern 650.

FIG. 73 is a plan view illustrating the reference pattern 650. As illustrated in FIG. 73, the reference pattern 650 is a mesh pattern defining a large number of opening regions 653. The reference pattern 650 includes the plurality of line segments 654 extending between the two branch points 652 and defining the opening region 653. That is, the reference pattern 650 is formed as a group of a large number of line segments 654 having the branch points 652 formed at both ends.

In the example illustrated in FIG. 73, a large number of opening regions 653 of the reference pattern 650 are arranged with a shape and a pitch having no repeating regularity (periodic regularity). In particular, in the illustrated example, a large number of opening regions 653 are arranged so as to coincide with Voronoi regions in the Voronoi diagram generated from virtual points, that is, sites in which distances between adjacent points are randomly distributed between a predetermined upper limit and a predetermined lower limit in a planar view. In other words, each line segment 654 of the reference pattern 650 coincides with each boundary between the Voronoi regions in the Voronoi diagram. In addition, each branch point 652 of the reference pattern 650 coincides with a Voronoi point in the Voronoi diagram.

The Voronoi diagram can be obtained by a known method as disclosed in, for example, JP 2012-178556 A, JP 2011-216378 A, and JP 2012-151116 A. Therefore, detailed description on a method for creating the Voronoi diagram will be omitted.

FIG. 74 illustrates an enlarged view of a part of the conductive pattern 640 with the reference pattern 650 illustrated in FIG. 73. First, each branch point 642 of the conductive pattern 640 is arranged on each branch point 652 of the reference pattern 650. Next, each connection element 644 of the conductive pattern 640 is arranged to connect between the two branch points 642 respectively corresponding to the two branch points 652 that are both ends of the line segment 654 of the reference pattern 650. Each connection element 644 may be a straight line segment which is a part of a straight line, a curved line segment which is a part of a curved line, or a combination thereof. For example, each connection element 644 may have a shape of a straight line segment, a polygonal line, a curved line segment, or the like. Here, less than 20% of the plurality of connection elements 644 is the connection elements 644 for connecting the two branch points 642 as a straight line segment. That is, equal to or more than 80% of the plurality of connection elements 644 have a shape of a polygonal line or a curved line segment other than a straight line segment. A curved line forming the curved line segment is not particularly limited. For example, the curved line can be appropriately selected from among a circle, an ellipse, a cardioid, a sinusoidal curve, a Jacobi elliptic functional curve, a hyperbolic sine function curve, a Bessel function curve, an involute curve, a function curve of degree of n (n is an integral of two or more) other than a circle and an ellipse.

In the example illustrated in FIG. 74, the conductive pattern 640 includes the plurality of branch points 642 arranged on each branch point 652 of the reference pattern 650, and the plurality of connection elements 644 extending between the two branch points 642 and defining the opening region 643, and the connection elements 644 for connecting two branch points 642 as a straight line segment are less than 20% of the plurality of connection elements 644. The conductive pattern 640 has a mesh pattern in which the connection elements 644 are arranged in correspondence with the respective line segments 654 of the reference pattern 650.

It is not necessary to calculate and specify the ratio of the connection elements 644 for connecting between the two branch points 642 as a straight line segment relative to the plurality of connection elements 644 by examining the entire region of the conductive pattern 640. In actual, in one section having an area expected to reflect overall tendencies of the ratio of the connection elements 644 for connecting the two branch points 642 as a straight line segment relative to the plurality of connection elements 644, the ratio can be calculated and specified by examining an appropriate number of targets in consideration of variation in the numbers to be examined. The value specified in this way can be used as a ratio of the connection elements 644 for connecting the two branch points 642 as a straight line segment relative to the plurality of connection elements 644. In the conductive pattern 640 according to the present embodiment, by observing 100 points included in a region of 300 mm×300 mm by an optical microscope or an electron microscope, the ratio of the connection elements 644 for connecting two branch points 642 as a straight line segment relative to the plurality of connection elements 644 can be specified.

As a material of such a conductive pattern 640, for example, one or more of gold, silver, copper, platinum, aluminum, chromium, molybdenum, nickel, titanium, palladium, indium, tungsten, and an alloy thereof can be exemplified.

In the example illustrated in FIG. 72, the connection element 644 includes a surface 644a on the side of the base material 630, a surface 644b opposite to the base material 630, and side surfaces 644c and 644d, and has a substantially rectangular cross section as a whole. It is preferable that a width W of the connection element 644, that is, a width W of the base material 630 along the sheet surface be equal to or more than 1 μm and equal to or less than 15 μm. It is preferable that the width W of the base material 630 along the sheet surface be equal to or more than 1 μm and equal to or less than 7 μm. According to the connection element 644 having such a width W, since the connection element 644 is sufficiently thinned, the conductive pattern 640 can be effectively made invisible. In addition, since a sufficient width W of the connection element 644, that is, mechanical strength and an electric conductivity (reciprocal of electric resistance) are ensured, the connection element 644 is hardly disconnected during a manufacturing process and during usage of the connection element 644 as a heat-generating plate, and a sufficient heating value can be secured. In addition, it is preferable that a height (thickness) H of the connection element 644, that is, the height (thickness) H along the normal direction to the sheet surface of the base material 630 be equal to or more than 1 μm and equal to or less than 20 μm. In addition, it is more preferable that the height H of the connection element 644 be equal to or more than 2 μm and equal to or less than 14 μm. The height (thickness) H of the connection element 644 can be the height (thickness) of the conductive pattern 640. According to the connection element 644 having such a height (thickness) H, sufficient conductivity can be secured while having an appropriate resistance value.

According to the conductive pattern 640 as described above, as illustrated in FIG. 75, light entering the side surface of the connection element 644 having the shape of a curved line segment, a polygonal line, and the like other than a straight line segment is diffusely reflected by the side surface. As a result, the light entering the side surface of the connection element 644 from a certain direction can be prevented from being reflected by the side surface in a certain direction in correspondence with the incident direction. Therefore, it is possible to prevent that the reflected light is observed by an observer and the conductive pattern 640 having the connection element 644 is visually recognized by the observer. In particular, in a case where the connection elements 644 for connecting between the two branch points 642 as a straight line segment are less than 20% of the plurality of connection elements 644, that is, in a case where more than 80% of the plurality of connection elements 644 have shapes such as a curved line segment or a polygonal line other than a straight line segment, it can be more effectively prevented that the light reflected by the side surface of the connection element 644 is visually recognized by the observer and the conductive pattern 640 including the connection element 644 is visually recognized by the observer.

In a case where the height (thickness) H of the connection element 644 is equal to or more than 1 μm, in particular, in a case where the height H of the connection element 644 is equal to or more than 2 μm, a possibility such that the light reflected by the side surface of the connection element 644 is observed by the observer is increased.

Therefore, in this case, to prevent that the light reflected by the side surface of the connection element 644 is visually recognized by the observer, it is especially more effective that the connection elements for connecting the two branch points 642 as a straight line segment are less than 20% of the plurality of connection elements 644.

In addition, when the distribution of the opening regions 643 is coarse and an average distance $D_{ave}$ between median points of the two adjacent opening regions 643 becomes longer, each connection element 644 is lengthened. When each connection element 644 is lengthened, the light reflected by the side surface of the connection element 644 in a predetermined direction is easily and visually recognized. As a result of examination by the inventors of the present invention, in a case where the average distance $D_{ave}$ between the median points of the two adjacent opening regions 643 is equal to or longer than 50 μm, and especially, in a case where the average distance $D_{ave}$ is equal to or longer than 70 μm, the light reflected by the side surface of the connection element 644 is visually recognized by the observer with high possibility. Therefore, in this case, to prevent that the light reflected by the side surface of the connection element 644 is visually recognized by the observer, it is especially more effective that the connection elements for connecting the two branch points 642 as a straight line segment are less than 20% of the plurality of connection elements 644. Here, the two adjacent opening regions 643 are two adjacent opening regions 643 that share a single connection element 644. As illustrated in FIG. 75, a distance D between median points $G_1$ and $G_2$ is a linear distance D between the median points $G_1$ and $G_2$.

It is preferable that the average distance $D_{ave}$ between the median points of the two adjacent opening regions 643 of the conductive pattern 640 be equal to or shorter than 800 μm. When the distance $D_{ave}$ is equal to or shorter than 800 μm, the conductive pattern 640 can be effectively made invisible. When the distance $D_{ave}$ is equal to or shorter than 300 μm, the conductive pattern 640 can be more effectively made invisible. It is considered that human eyes hardly separate and resolve the opening region 643 of the conductive pattern 640 with such a small $D_{ave}$ from the adjacent opening region 643. On the other hand, it is preferable that the distance $D_{ave}$ be equal to or longer than 50 μm. When the distance $D_{ave}$ is equal to or longer than 50 μm, an opening rate sufficient for allowing light passing through the region where the conductive pattern 640 is arranged can be ensured, and an excellent light transmittance can be applied to the conductive pattern 640 and the heat-generating plate 610. When the $D_{ave}$ is equal to or longer than 50 μm, for example, when the width W of the connection element is equal to or less than 5 μm, the light transmission rate of the heat-generating plate 610 can be equal to or more than 70% as an example.

In a case where the average distance $D_{ave}$ between the median points of the two adjacent opening regions 643 of the conductive pattern 640 is equal to or longer than 50 μm and equal to or shorter than 800 μm, an excellent light transmittance can be applied to the conductive pattern 640 and the heat-generating plate 610, and the conductive pattern 640 can be effectively made invisible. In a case where the average distance $D_{ave}$ between the median points of the two adjacent opening regions 643 of the conductive pattern 640 is equal to or longer than 50 μm and equal to or shorter than 800 μm, and especially, in a case where the average distance $D_{ave}$ is equal to or longer than 70 μm and equal to or shorter than 800 μm, by setting the connection elements for connecting two branch points 642 as a straight line segment to be less than 20% of the plurality of connection elements 644, it can be effectively prevented that the light reflected by the side surface of the connection element 644 is visually recognized by an observer, and the conductive pattern 640 can be effectively made invisible. Furthermore, in a case where the average distance $D_{ave}$ between the median points of the two adjacent opening regions 643 of the conductive pattern 640 is equal to or longer than 50 μm and equal to or shorter than 300 μm, an excellent light transmittance can be applied to the conductive pattern 640 and the heat-generating plate 610, and the conductive pattern 640 can be more effectively made invisible. In addition, in a case where the average distance $D_{ave}$ between the median points of the two adjacent opening regions 643 of the conductive pattern 640 is equal to or longer than 50 μm and equal to or shorter than 300 μm, and especially, in a case where the average distance $D_{ave}$ is equal to or longer than 70 μm and equal to or shorter than 800 μm, by setting the connection elements for connecting two branch points 642 as a straight line segment to be less than 20% of the plurality of connection elements 644, it can be effectively prevented that the light reflected by the side surface of the connection element 644 is visually recognized by an observer, and the conductive pattern 640 can be more effectively made invisible.

In the example illustrated in FIG. 72, the connection element 644 includes the first dark color layer 663 provided on the base material 630, the conductive metal layer 661 provided on the first dark color layer 663, and the second dark color layer 664 provided on the conductive metal layer 661. In other words, a surface of the conductive metal layer 661 on the side of the base material 630 is covered with the first dark color layer 663, and a surface of the conductive metal layer 661 opposite to the base material 630 and both side surfaces are covered with the second dark color layer 664. It is preferable that the dark color layers 663 and 664 be layers having lower reflectance of visible light than the conductive metal layer 661, for example, the dark color layers 663 and 664 are layers of dark colors such as black. With the dark color layers 663 and 664, the conductive metal layer 661 is hardly and visually recognized, and a passenger's visibility is more preferably secured.

Next, an example of a manufacturing method for the heat-generating plate 610 will be described with reference to FIGS. 76 to 82. FIGS. 76 to 82 are cross-sectional views sequentially illustrating the example of the manufacturing method for the heat-generating plate 610.

First, a sheet-like base material 630 is prepared. The base material 630 is a so-called transparent electrically insulating resin base material for transmitting light with a wavelength in a visible light wavelength band (380 nm to 780 nm).

Figure 76:
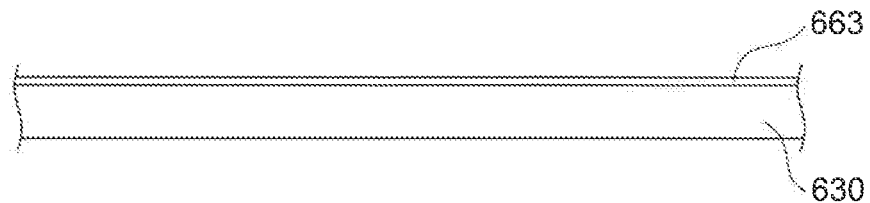
FIG. 76 is a view for explaining an example of a manufacturing method for the heat-generating plate.

Next, as illustrated in FIG. 76, a first dark color layer 663 is provided on the base material 630. For example, the first dark color layer 663 can be provided on the base material 630 by a plating method including electroplating and electroless plating, a sputtering method, a CVD method, a PVD method, and an ion plating method or a method of combination of two or more methods described above. As a material of the first dark color layer 663, various known materials can be used. For example, copper nitride, copper oxide, copper oxynitride, and nickel nitride can be exemplified.

Figure 77:
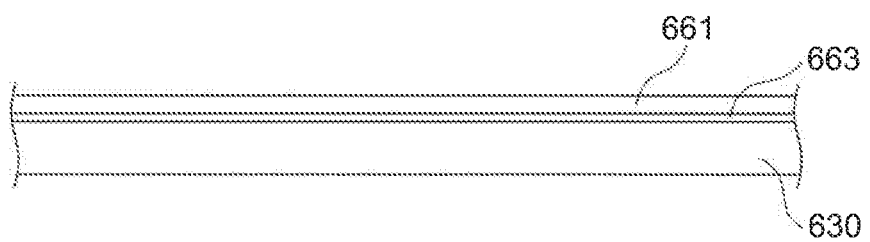
FIG. 77 is a view for explaining an example of the manufacturing method for the heat-generating plate.

Next, as illustrated in FIG. 77, a conductive metal layer (conductive layer) 61 is provided on the first dark color layer 663. As described above, the conductive metal layer 661 is a layer formed of one or more of gold, silver, copper, platinum, aluminum, chromium, molybdenum, nickel, titanium, palladium, indium, tungsten, and alloys thereof. The conductive metal layer 661 may be formed by a known method. For example, a method of bonding a metal foil such as a copper foil with an adhesive having weather resistance property, a plating method including electroplating and electroless plating, a sputtering method, a CVD method, a PVD method, an ion plating method, or a method of combination of two or more methods described above can be employed.

In a case where the conductive metal layer 661 is formed of a metal foil such as a copper foil, the first dark color layer 663 is formed on one surface of the metal foil in advance, and the metal foil on which the first dark color layer 663 is formed may be laminated on the base material 630, for example, via an adhesive layer or a viscosity layer so that the first dark color layer 663 faces to the base material 630. In this case, for example, by performing darkening processing (blackening processing) on a part of the material forming the metal foil, the first dark color layer 663 formed of metal oxide or metal sulfide can be formed from a part of the material that has formed the metal foil Furthermore, the first dark color layer 663 may be provided on the surface of the metal foil such as a coating film of a dark color material and a plating layer of nickel or chromium. In addition, the first dark color layer 663 may be provided by roughening the surface of the metal foil.

Figure 78:
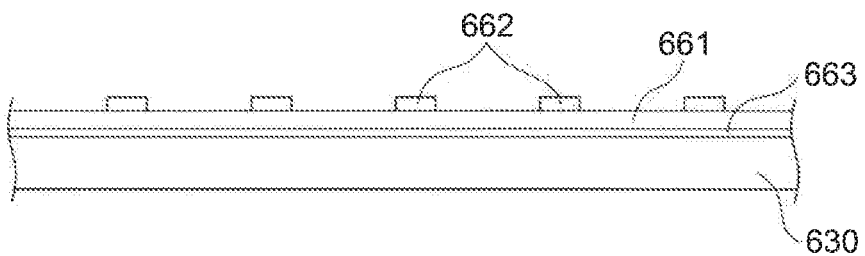
FIG. 78 is a view for explaining an example of the manufacturing method for the heat-generating plate.

Next, as illustrated in FIG. 78, a resist pattern 662 is provided on the conductive metal layer 661. The resist pattern 662 is a pattern corresponding to the pattern of the conductive pattern 640 to be formed. In the method described here, the resist pattern 662 is provided only on a portion finally forming the conductive pattern 640. The resist pattern 662 can be formed by patterning using a known photolithography technique.

Figure 79:
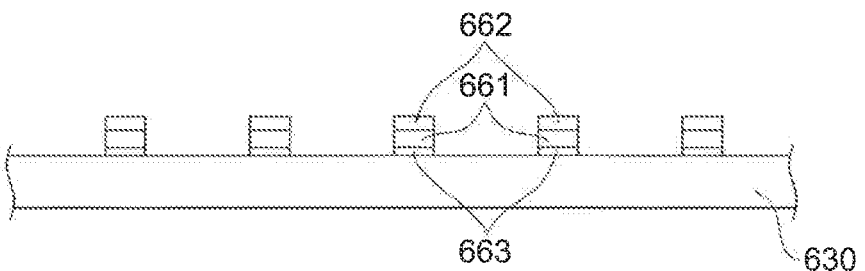
FIG. 79 is a view for explaining an example of the manufacturing method for the heat-generating plate.
Figure 80:
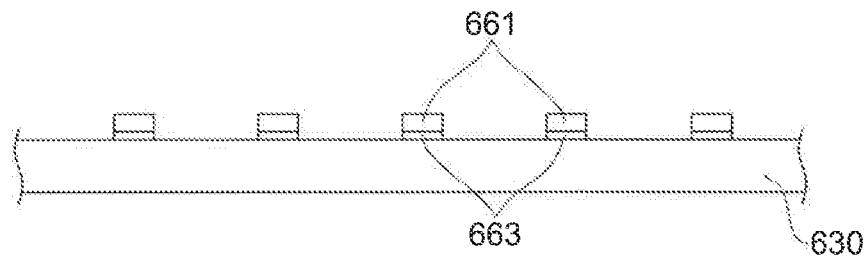
FIG. 80 is a view for explaining an example of the manufacturing method for the heat-generating plate.

Next, as illustrated in FIG. 79, the conductive metal layer 661 and the first dark color layer 663 are etched using the resist pattern 662 as a mask. By this etching, the conductive metal layer 661 and the first dark color layer 663 are patterned to substantially the same pattern as the resist pattern 662. An etching method is not particularly limited, and a known method can be employed. As a known method, for example, wet etching using an etchant and plasma etching can be exemplified. After that, as illustrated in FIG. 80, the resist pattern 662 is removed.

Figure 81:
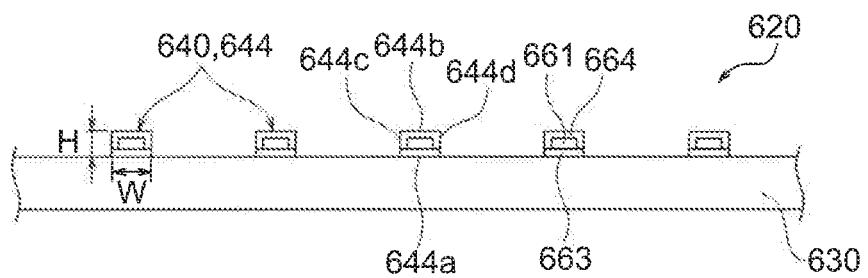
FIG. 81 is a view for explaining an example of the manufacturing method for the heat-generating plate.
Figure 82:
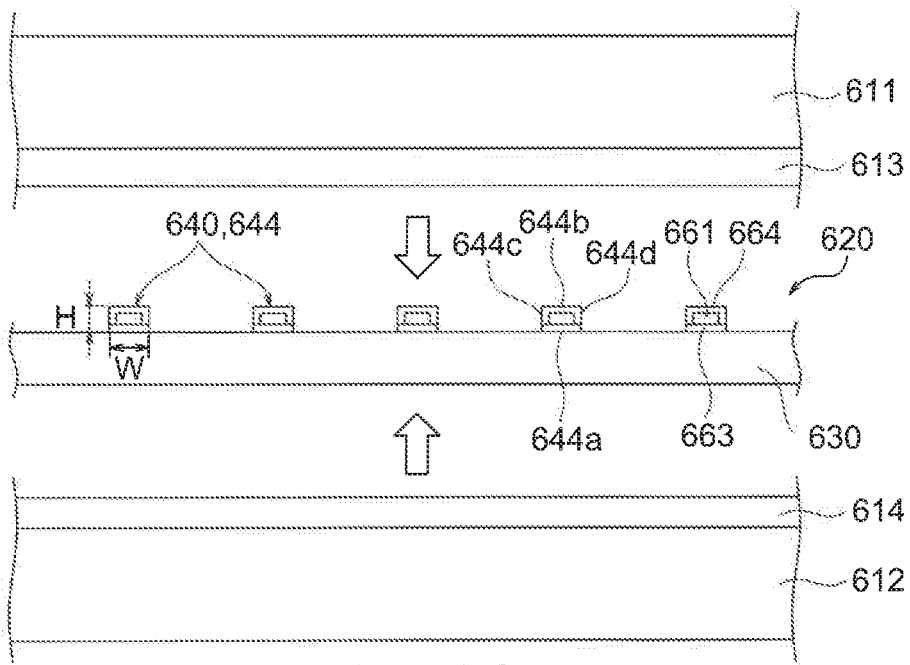
FIG. 82 is a view for explaining an example of the manufacturing method for the heat-generating plate.
Figure 83:
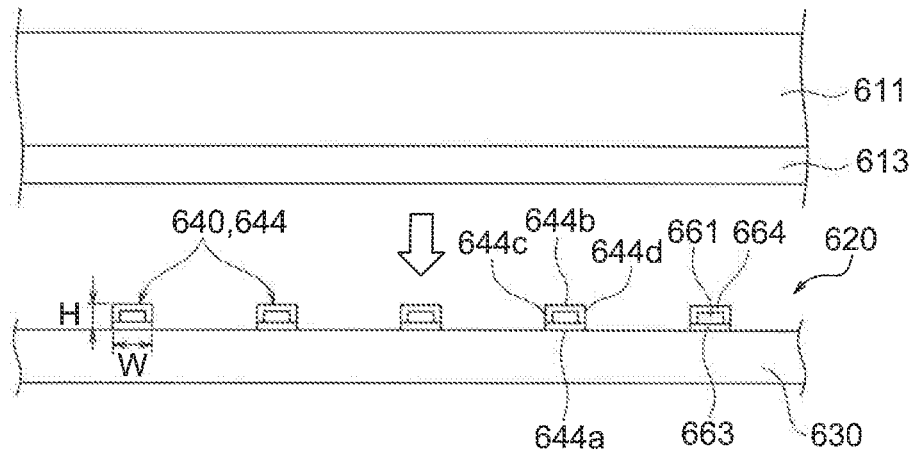
FIG. 83 is a view for explaining a modification of the manufacturing method for the heat-generating plate.

Thereafter, as illustrated in FIG. 81, the second dark color layer 664 is formed on the surface 644b of the conductive metal layer 661 opposite to the base material 630 and the side surfaces 644c and 644d. For example, by performing darkening processing (blackening processing) on a part of the material forming the conductive metal layer 661, the second dark color layer 664 formed of metal oxide or metal sulfide can be formed from a part of the conductive metal layer 661. Furthermore, the second dark color layer 664 may be provided on the surface of the conductive metal layer 661 as a coating film of a dark color material and a plating layer of nickel or chromium. In addition, the second dark color layer 664 may be provided by roughening the surface of the conductive metal layer 661.

As described above, the conductive pattern sheet 620 illustrated in FIG. 81 is produced.

Finally, the glass plate 611, the bonding layer 613, the conductive pattern sheet 620, the bonding layer 614, and the glass plate 612 are laminated in this order and heated and pressurized. In the example illustrated in FIG. 82, first, the bonding layer 613 is temporarily bonded to the glass plate 611, and the bonding layer 614 is temporarily bonded to the glass plate 612. Next, the glass plate 611 to which the bonding layer 613 is temporarily bonded, the conductive pattern sheet 620, and the glass plate 612 to which the bonding layer 614 is temporarily bonded are laminated in this order and heated and pressurized so that the sides of the glass plates 611 and 612 to which the bonding layers 613 and 614 are respectively and temporarily bonded face to the conductive pattern sheet 620. With this structure, the glass plate 611, the conductive pattern sheet 620, and the glass plate 612 are bonded via the bonding layers 613 and 614, and the heat-generating plate 610 illustrated in FIG. 72 is manufactured.

The heat-generating plate 610 according to the present embodiment described above includes the pair of glass plates 611 and 612, the conductive pattern 640 arranged between the pair of glass plates 611 and 612 and defining the plurality of opening regions 643, and the bonding layers 613 and 614 arranged between the conductive pattern 640 and at least one of the pair of glass plates 611 and 612, and the conductive pattern 640 includes the plurality of connection elements 644 extending between the two branch points 642 and defining the opening region 643, and the connection elements for connecting the two branch points 642 as a straight line segment are less than 20% of the plurality of connection elements 644.

According to such a heat-generating plate 610, as illustrated in FIG. 75, light entering the side surface of the connection element 644 having the shape of a polygonal line, a curved line segment, and the like other than a straight line segment is diffusely reflected by the side surface. As a result, the light entering each point in the side surface of the connection element 644 from a certain direction can be prevented from being reflected by the side surface in a certain direction in correspondence with the incident direction. Therefore, it is possible to prevent that the reflected light is observed by an observer and the conductive pattern 640 having the connection element 644 is visually recognized by the observer.

Note that various modifications can be made to the embodiment. Hereinafter, modifications will be described as appropriately referring to the drawings. In the following description and the drawings used in the following description, parts which are similarly formed to those in the embodiments are denoted with the same reference numerals as those used for corresponding parts of the embodiment, and overlapped description will be omitted.

A modification of a manufacturing method for a heat-generating plate 610 will be described with reference FIGS. 83 to 87. FIGS. 83 to 87 are cross-sectional views sequentially illustrating the modification of the manufacturing method for the heat-generating plate 610.

First, a conductive pattern sheet 620 is produced. The conductive pattern sheet 620 can be manufactured by the method described in the example of the manufacturing method for the heat-generating plate 610 described above.

Figure 84:
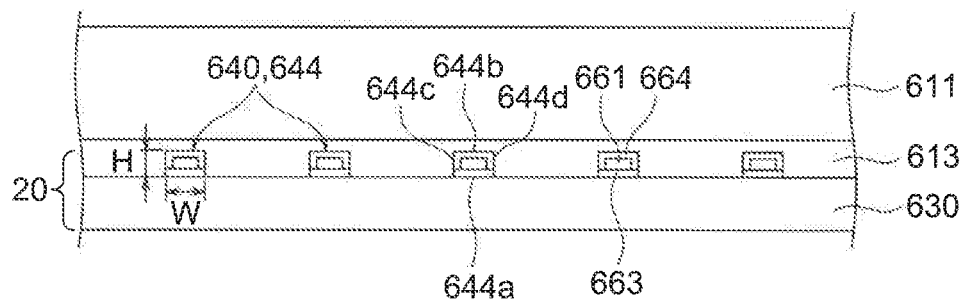
FIG. 84 is a view for explaining the modification of the manufacturing method for the heat-generating plate.

Next, a glass plate 611, a bonding layer 613, and the conductive pattern sheet 620 are laminated in this order and heated and pressurized. In the example illustrated in FIG. 83, first, the bonding layer 613 is temporarily bonded to the glass plate 611. Next, the glass plate 611 to which the bonding layer 613 is temporarily bonded is laminated from the side of the conductive pattern sheet 620 of the conductive pattern 640 and heated and pressurized so that the side of the glass plate 611 to which the bonding layer 613 is temporarily bonded faces to the conductive pattern sheet 620. With this structure, as illustrated in FIG. 84, the glass plate 611 and the conductive pattern sheet 620 are bonded to each other (temporarily bonded or completely bonded) via the bonding layer 613.

Figure 85:
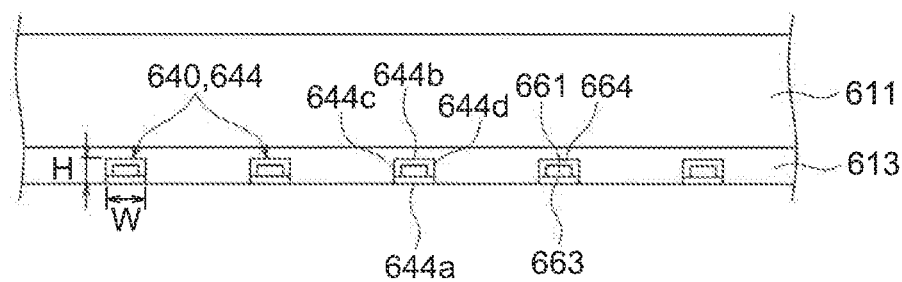
FIG. 85 is a view for explaining the modification of the manufacturing method for the heat-generating plate.
Figure 86:
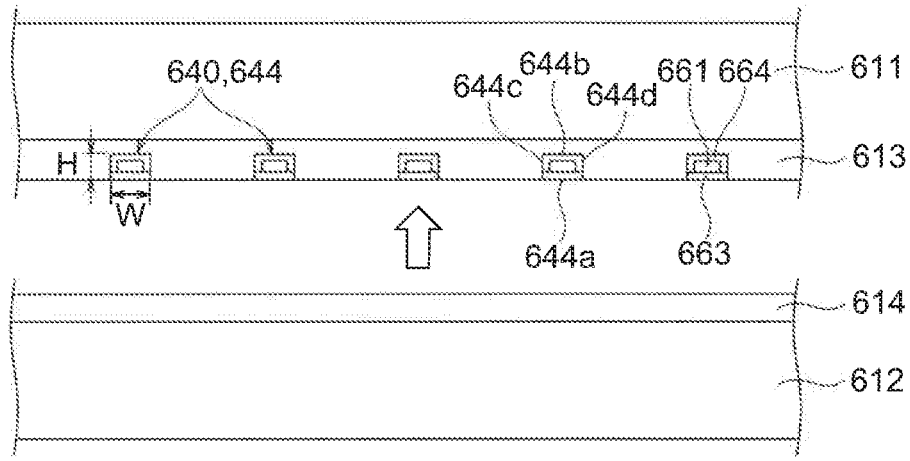
FIG. 86 is a view for explaining the modification of the manufacturing method for the heat-generating plate.

Next, as illustrated in FIG. 85, a base material 630 of the conductive pattern sheet 620 is removed. For example, when the conductive pattern sheet 620 is produced, a peeling layer is formed on the base material 630 in advance, and the conductive pattern 640 is formed on the peeling layer. It is preferable that the peeling layer be not removed in a process for etching the conductive metal layer 661 and the first dark color layer 663. In this case, the base material 630 is bonded to the conductive pattern 640 and the bonding layer 613 via the peeling layer. Then, in a process for removing the base material 630 of the conductive pattern sheet 620, the base material 630 of the conductive pattern sheet 620 is peeled off from the conductive pattern 640 and the bonding layer 613 by using the peeling layer.

As a peeling layer, for example, an interface peeling type peeling layer, an interlayer peeling type peeling layer, and an aggregation peeling type peeling layer can be used. As an interface peeling type peeling layer, a peeling layer having relatively lower adhesion with the conductive pattern 640 and the bonding layer 613 than the adhesion with the base material 630 can be preferably used. As such a layer, a silicone resin layer, a fluororesin layer, and a polyolefin resin layer, and the like can be exemplified. A peeling layer having relatively lower adhesion with the base material 630 than the adhesion with the conductive pattern 640 and the bonding layer 613 can be used. As an interlayer peeling type peeling layer, a peeling layer including a plurality of layers and having relatively lower adhesion between the plurality of layers than the adhesion with the conductive pattern 640, the bonding layer 613, and the base material 630 can be exemplified. As an aggregation peeling type peeling layer, a peeling layer in which a filler as a dispersed phase is dispersed in a base resin as a continuous phase can be exemplified.

In a case where an interface peeling type peeling layer having relatively lower adhesion with the conductive pattern 640 and the bonding layer 613 than the adhesion with the base material 630 is used, the peeling layer is peeled off from the conductive pattern 640 and the bonding layer 613. In this case, it is possible to prevent the peeling layer from remaining on the side of the conductive pattern 640 and the bonding layer 613. That is, the base material 630 and the peeling layer are removed. When the base material 630 and the peeling layer are removed, the bonding layer 613 is exposed in an opening region 643 of the conductive pattern 640.

On the other hand, in a case where an interface peeling type peeling layer having relatively lower adhesion with the base material 630 than the adhesion with the conductive pattern 640 and the bonding layer 613 is used as a peeling layer, the peeling layer is peeled off from the base material 630. In a case where an interlayer peeling type peeling layer including a plurality of layers of films and having relatively lower adhesion between the plurality of layers than the adhesion with the conductive pattern 640, the bonding layer 613, and the base material 630 is used as a peeling layer, the plurality of layers is peeled off from each other. In a case where an aggregation peeling type peeling layer in which a filler as a dispersed phase is dispersed in a base resin as a continuous phase is used as a peeling layer, peeling phenomenon due to cohesive failure in the peeling layer occurs.

Finally, the glass plate 611, the bonding layer 613, the conductive pattern 640, the bonding layer 614, and the glass plate 612 are laminated in this order and heated and pressurized. In the example illustrated in FIG. 86, first, the bonding layer 614 is temporarily bonded to the glass plate 612. Next, the glass plate 611, the conductive pattern 640, the bonding layer 613, and the glass plate 612 to which the bonding layer 614 is temporarily bonded are laminated in this order and heated and pressurized so that the side of the glass plate 612 to which the bonding layer 614 is temporarily bonded faces to the conductive pattern 640 and the bonding layer 613. With this structure, the glass plate 611, the conductive pattern 640, and the glass plate 612 are bonded (completely bonded) via the bonding layers 613 and 614, and the heat-generating plate 610 illustrated in FIG. 87 is manufactured.

Figure 87:
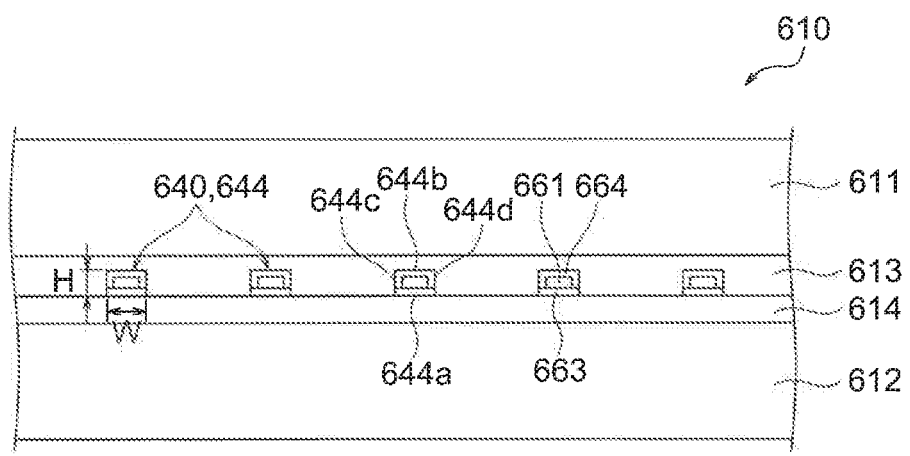
FIG. 87 is a view for explaining the modification of the manufacturing method for the heat-generating plate.

According to the heat-generating plate 610 illustrated in FIG. 87, it is possible that the heat-generating plate 610 does not include the base material 630. With this structure, the thickness of the entire heat-generating plate 610 can be reduced. In addition, the number of interfaces in the heat-generating plate 610 can be reduced. Therefore, deterioration in optical characteristics, that is, deterioration in visibility can be prevented.

Figure 88:
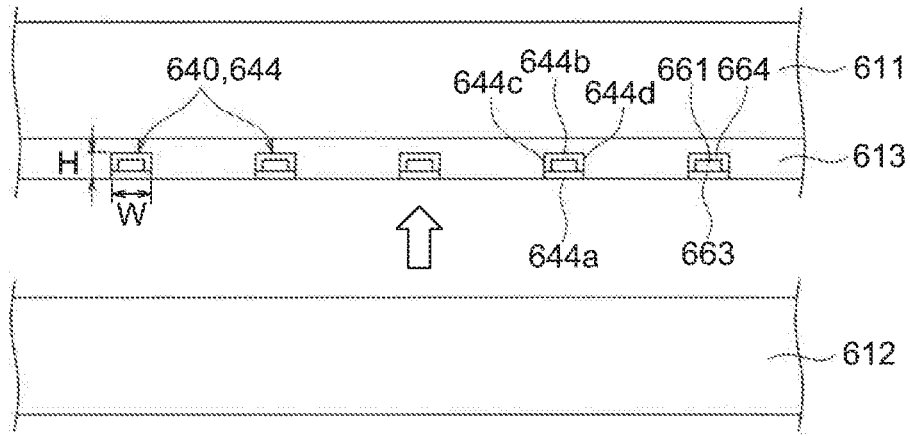
FIG. 88 is a view for explaining another modification of the manufacturing method for the heat-generating plate.
Figure 89:
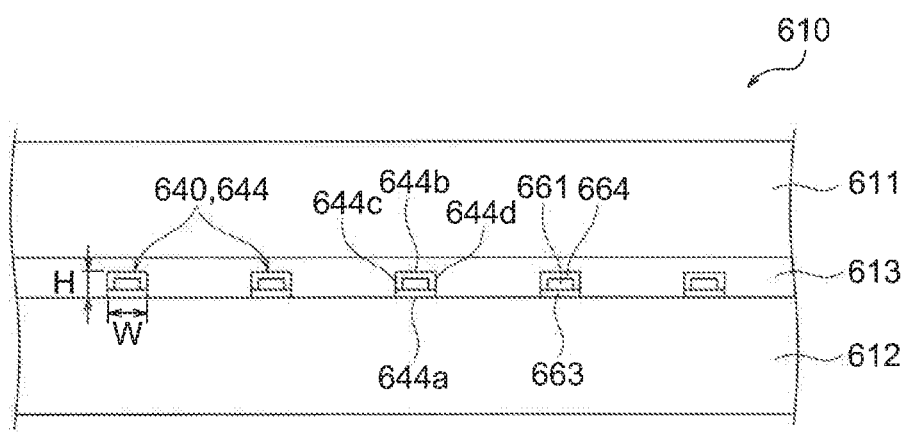
FIG. 89 is a view for explaining another modification of the manufacturing method for the heat-generating plate.

Next, another modification of a manufacturing method for the heat-generating plate 610 will be described with reference to FIGS. 88 and 89. FIGS. 88 and 89 are cross-sectional views sequentially illustrating another modification of the manufacturing method for the heat-generating plate 610.

First, according to a process similar to that in the modification of the manufacturing method for the heat-generating plate 610, a structure in which a glass plate 611 and a conductive pattern sheet 620 are bonded (temporarily bonded) via a bonding layer 613 is produced, and a base material 630 is removed from the structure. That is, a laminate, in which the glass plate 611, the conductive pattern 640, and the bonding layer 613 are laminated, described in the modification of the manufacturing method for the heat-generating plate 610 with reference to FIG. 85 is obtained.

Next, as illustrated in FIG. 88, the glass plate 611, the bonding layer 613, the conductive pattern 640, and the glass plate 612 are laminated in this order and heated and pressurized. As a result, the glass plate 611 is bonded (completely bonded) to the conductive pattern 640 via the bonding layer 613, and the glass plate 611 is bonded (completely bonded) to the glass plate 612 via the bonding layer 613. Then, the heat-generating plate 610 illustrated in FIG. 89 is manufactured.

According to the heat-generating plate 610 illustrated in FIG. 89, it is possible that the heat-generating plate 610 does not include the base material 630 and the bonding layer 614. With this structure, the thickness of the entire heat-generating plate 610 can be more reduced. In addition, the number of interfaces in the heat-generating plate 610 can be more reduced. Therefore, deterioration in optical characteristics, that is, deterioration in visibility can be more effectively prevented. In addition, since the conductive pattern 640 has contact with the glass plate 612, a heating efficiency of the glass plate 612 by the conductive pattern 640 can be enhanced.

Figure 90:
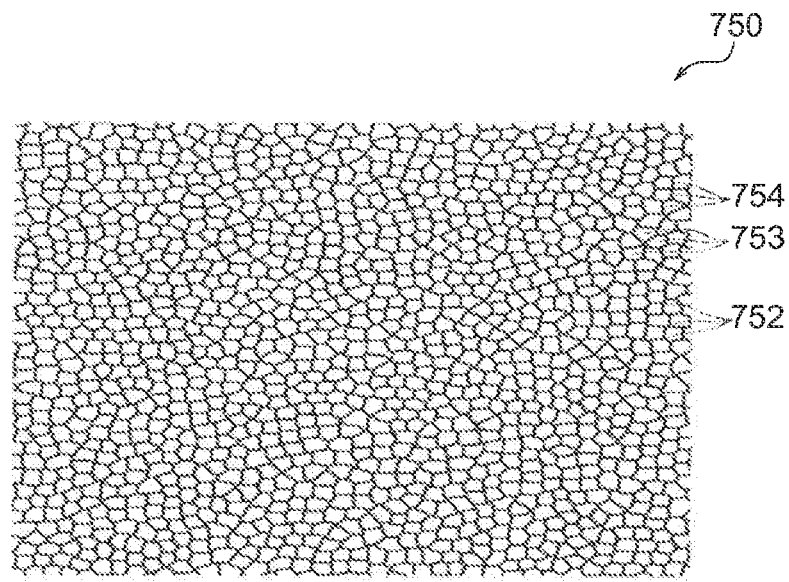
FIG. 90 is a plan view illustrating a modification of the reference pattern.

As another modification, FIG. 90 illustrates a modification of a reference pattern. As illustrated in FIG. 90, a reference pattern 750 is a mesh pattern defining a large number of opening regions 753. The reference pattern 750 includes a plurality of line segments 754 extending between the two branch points 752 and defining the opening regions 753. That is, the reference pattern 750 is formed as a group of a large number of line segments 754 forming the branch points 752 at both ends. Especially, in the illustrated example, the reference pattern 750 has a shape obtained by extending the reference pattern 650 illustrated in FIG. 73 along a first direction (X), in other words, a shape obtained by compressing the reference pattern 650 illustrated in FIG. 73 along a second direction (Y) perpendicular to the first direction (X).

A part of the conductive pattern 740 determined by the method described with reference to FIG. 74 based on the reference pattern 750 is enlarged and illustrated in FIG. 91 together with a part of the corresponding reference pattern 750. In the example illustrated in FIG. 91, the conductive pattern 740 includes the plurality of branch points 742 arranged on each branch point 752 of the reference pattern 750, and the plurality of connection elements 744 extending between the two branch points 742 and defining the opening region 743, and the connection elements for connecting two branch points 742 as straight line segments are less than 20% of the plurality of connection elements 744. The conductive pattern 740 has a mesh pattern in which the connection elements 744 are arranged in correspondence with the respective line segments 754 of the reference pattern 750.

Figure 91:
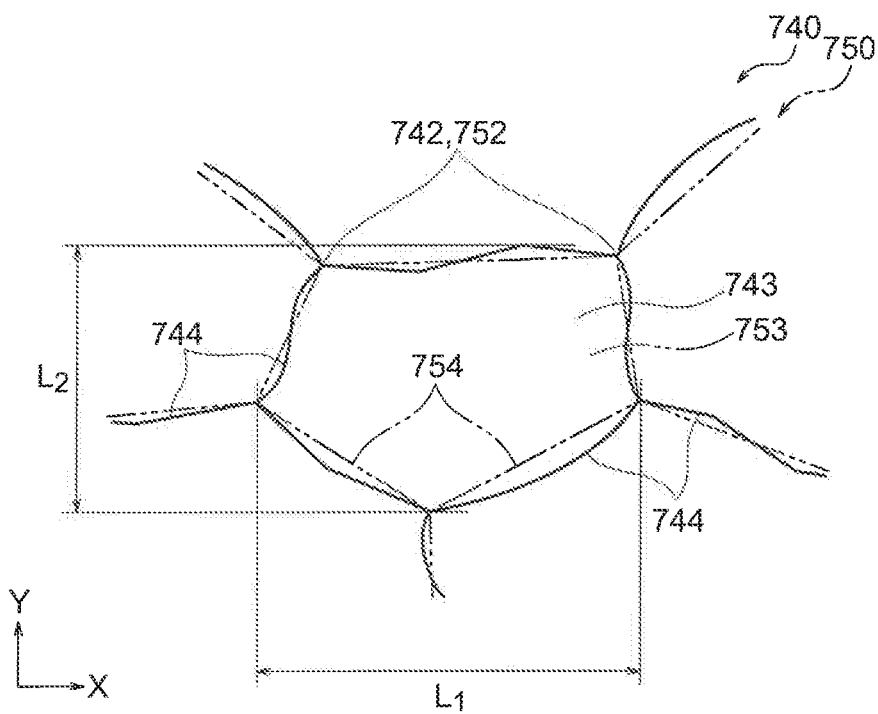
FIG. 91 is an enlarged view of a part of the conductive pattern with the reference pattern illustrated in FIG. 90.
Figure 92:
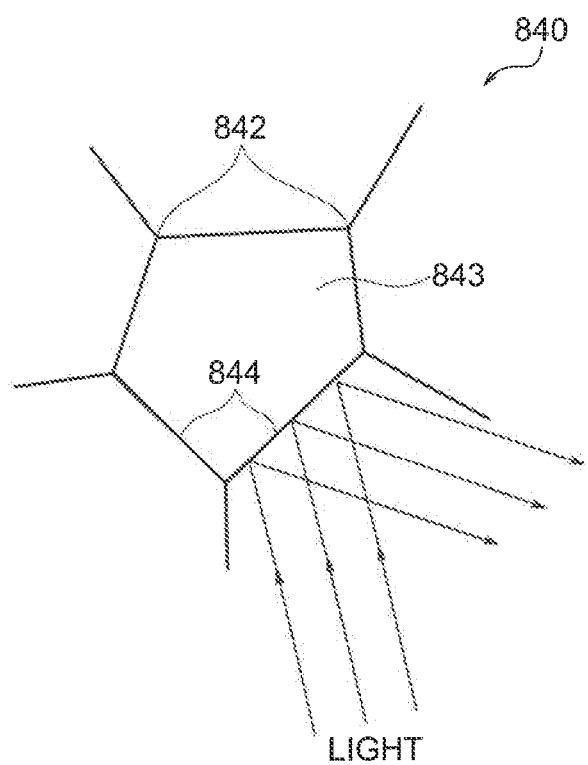
FIG. 92 is a diagram for explaining the related art.

In the example illustrated in FIG. 91, an average of a ratio ($L_1/L_2$) of a length $L_1$ of each opening region 743 of the conductive pattern 740 along the first direction (X) relative to a length $L_2$ of the opening region 743 along the second direction (Y) perpendicular to the first direction (X) is equal to or more than 1.3 and equal to or less than 1.8. In a case where the conductive pattern 740 includes the opening region 743 having such a size, a possibility such that light reflected by the side surface of the connection element 744 is visually recognized by an observer is increased. Therefore, in this case, to prevent that the light reflected by the side surface of the connection element 744 is visually recognized by the observer, it is especially more effective that the connection elements for connecting the two branch points 742 as a straight line segment are less than 20% of the plurality of connection elements 744.

Each size of the conductive patterns 640 and 740 such as the average distance $D_{ave}$ between the median points of the two adjacent opening regions 643 and the average of the ratio ($L_1/L_2$) of the length $L_1$ of each opening region 743 of the conductive pattern 740 along the first direction (X) relative to the length $L_2$ of the opening region 743 along the second direction (Y) perpendicular to the first direction (X) are not necessarily specified by examining the entire regions of the conductive patterns 640 and 740 and calculating average values. In actual, in a single section having an area which is expected to reflect overall tendencies of values to be examined (the average distance $D_{ave}$ between the median points of the two adjacent opening regions 643 and the average of the ratio ($L_1/L_2$) of the length $L_1$ of each opening region 743 of the conductive pattern 740 along the first direction (X) relative to the length $L_2$ of the opening region 743 along the second direction (Y) perpendicular to the first direction (X)), each size can be calculated and specified by examining an appropriate number of targets in consideration of variation in the numbers to be examined. The values specified in this way are respectively used as the average distance $D_{ave}$ between the median points of the two adjacent opening regions 643 and the average of the ratio ($L_1/L_2$) of the length $L_1$ of each opening region 743 of the conductive pattern 740 along the first direction (X) relative to the length $L_2$ of the opening region 743 along the second direction (Y) perpendicular to the first direction (X). In the conductive patterns 640 and 740 according to the present embodiment, by measuring 100 points included in the region of 300 mm×300 mm by an optical microscope or an electron microscope and calculating an average, the sizes of the conductive patterns 640 and 740 can be specified.

As another modification, in the embodiment described above, the conductive patterns 640 and 740 have a pattern determined based on the Voronoi diagram generated from sites randomly distributed in a planar surface, that is, in which a large number of opening regions 653 and 753 are arranged with shapes and pitches with no repeating regularity (periodic regularity). However, the pattern is not limited to this, and patterns such as a pattern in which opening regions having the same shapes such as a triangle, a rectangle, and a hexagon are regularly arranged, a pattern in which opening region having different shapes are regularly arranged may be used.

In the examples illustrated in FIGS. 76 to 89, the second dark color layer 664 forms the surface 644b opposite to the base material 630 of the connection element 644 and the side surfaces 644c and 644d. However, the modification is not limited to this, and the second dark color layer 664 may form only the surface 644b opposite to the base material 630 of the connection element 644 or only the side surfaces 644c and 644d of the connection element 644. In a case where the second dark color layer 664 forms only the surface 644b opposite to the base material 630 of the connection element 644, for example, after the process illustrated in FIG. 77, the second dark color layer 664 and the resist pattern 662 are provided on the conductive metal layer (conductive layer) 661 in this order. Thereafter, it is preferable that the second dark color layer 664, the conductive metal layer 661, and the first dark color layer 663 be etched by using the resist pattern 662 as a mask. In a case where the second dark color layer 664 forms only the side surfaces 644c and 644d of the connection element 644, for example, after the process illustrated in FIG. 79, the second dark color layer 664 is formed without removing the resist pattern 662, and the resist pattern 662 may be removed after that. In a case where it is not necessary to provide the first dark color layer 663, the process for providing the first dark color layer 663 on the base material 630 illustrated in FIG. 76 may be omitted.

The heat-generating plate 610 may be used for a rear window, a side window, or a sunroof of an automobile 601. In addition, the heat-generating plate 610 may be used for a window or a door of a vehicle, such as a railway vehicle, an aircraft, a ship, and a spacecraft, other than an automobile.

In addition to vehicles, the heat-generating plate 610 can be used for a window or a door of a building such as a shop and a house, especially in a place where indoor and outdoor is divided, a window material (cover or protection glass plate) of various traffic lights, a window material of a headlamp of various vehicles, and the like.

Although some modifications regarding the embodiment have been described above, naturally, a plurality of modifications can be appropriately combined and applied.

EXAMPLES

Hereinafter, although the present invention will be described in more detail with reference to examples, the present invention is not limited to the examples.

Example 4

A laminated glass in Example 4 is produced as follows. First, as a base material 630, a biaxially stretched polyethylene terephthalate (PET) film (manufactured by TOYOBO CO., LTD. A4300) with the thickness of 100 µm, the width of 98 cm, and the length of 100 m is prepared. A two-liquid mixed curable type urethane ester type adhesive is laminated on the base material 630 by a gravure coater so that a dried thickness of the laminate at the time when the laminate is cured is 7 µm. Then, an electrolytic copper foil with the thickness of 3 µm, the width of 97 cm, and the length of 80 m is laminated as the conductive metal layer 661 on the base material 630 via adhesive, and this state is maintained for four days under an environment with an ambient temperature of 50° C., and the electrolytic copper foil is fixed to the base material 630.

Thereafter, a layer of a photosensitivity resist material is laminated on the electrolytic copper foil (conductive metal layer 661) with a mercury lamp via a photomask having a pattern including the plurality of connection elements determined based on the reference pattern 650 having a large number of opening regions 653 arranged so as to coincide with the Voronoi regions in the Voronoi diagram generated from the sites of which the distance between the adjacent sites are randomly distributed between the predetermined upper limit and the predetermined lower limit in the planar surface described with reference to FIGS. 73 and 74. Then, the resist pattern 662 is formed by cleaning (removing) an extra photosensitivity resist material, and the electrolytic copper foil is etched by using corrosive liquid of aqueous ferric chloride solution using the resist pattern 662 as a mask. Then, the resist pattern 662 is cleaned with pure water and the remaining resist pattern 662 is removed so as to obtain the conductive pattern sheet 620 having the conductive pattern 640 including the plurality of connection elements 644 determined based on the reference pattern 650 having a large number of opening regions 653 arranged so as to coincide with the Voronoi regions in the Voronoi diagram. In the conductive pattern sheet 620, the width W of the connection element 644 of the conductive pattern 640 is 7 μm, and the height (thickness) of the connection element 644, that is, the height (thickness) H of the conductive pattern 640 is 3 μm. The ratio of the connection elements 644 for connecting the two branch points 642 of the conductive pattern 640 as a straight line segment relative to the all of the connection elements 644 is 15%. The average distance $D_{ave}$ between the median points of the two adjacent opening regions 643 of the conductive pattern 640 is 50 μm. The ratio of the connection elements 644 for connecting the two branch points 642 of the conductive pattern 640 as a straight line segment relative to all the connection elements 644 is specified by observing 100 points in the region of 300 mm×300 mm in the conductive pattern 640 with an optical microscope.

Then, the conductive pattern sheet 620 obtained as described above is cut into a substantially trapezoidal shape having an upper base of 125 cm, a bottom base of 155 cm, and a height of 96 cm. Then, the conductive pattern sheet 620 is arranged between the substantially trapezoidal glass plates 611 and 612 having the shape and the size with the upper base of 120 cm, and the lower base of 150 cm, and the height of 95 cm in a case of being observed from the normal direction of the surfaces (pair of surface having the largest area) via the bonding layers 613 and 614 including a PVB adhesive sheet having the same as the glass plates 611 and 612. Then, the laminate is heated and pressurized (vacuum lamination). Then, the bonding layers 613 and 614 and the conductive pattern sheet 620 protruding from the peripheries of the glass plates 611 and 612 are trimmed, and the heat-generating plate 610 in Example 4 is obtained.

When the heat-generating plate 610 according to Example 4 is visually checked, the conductive pattern 640 is not visually recognized at a distance of 60 cm from the heat-generating plate 610. Furthermore, the conductive pattern 640 cannot be visually recognized at a distance equal to or more than 60 cm. As a result, it can be confirmed that the conductive pattern 640 of the heat-generating plate 610 according to Example 4 is sufficiently invisible. A light transmittance of the heat-generating plate 610 according to Example 4 is evaluated as an average value of a light transmittance rate in a measurement wavelength of 380 nm to 780 nm. When the light transmittance is measured by a spectrophotometer ("UV-3100PC" manufactured by SHIMADZU CORPORATION, conforming to JIS K 0115), the light transmission rate is 71%. As a result, it is confirmed that the heat-generating plate 610 of Example 4 has a sufficient light transmittance.

(Example 5) to (Example 9) and (Comparative Example 3) to (Comparative Example 5)

A heat-generating plates 610 according to Examples 5 to 9 and Comparative Examples 3 to 5 are produced by a process similar to that of the heat-generating plate 610 of Example 4, and the obtained heat-generating plate 610 is similar to the heat-generating plate 610 according to Example 4 except that the average distance $D_{ave}$ between the median points of the two adjacent opening regions 643 of the conductive pattern 640 and the width W of the connection element 644 are changed as indicated in Table 2.

Table 2 collectively indicates the average distance $D_{ave}$ between the median points of the two adjacent opening regions 643 of the conductive pattern 640, the width W of the connection element 644 of the conductive pattern 640, invisibility of the conductive pattern 640 in visual recognition, the light transmittance of the heat-generating plate 610, and the light transmittance rate of the heat-generating plate 610 in Examples 4 to 9 and Comparative Examples 3 to 5. The invisibility of the conductive pattern 640 in visual recognition is indicated in a column of "invisibility" in Table 2 as A, B, and C. In the column of "invisibility", A indicates that the conductive pattern 640 is not visually recognized at a distance of 60 cm from the heat-generating plate 610, B indicates that the conductive pattern 640 is visually recognized at a distance of 60 cm from the heat-generating plate 610 and is not visually recognized at a distance of 80 cm from the heat-generating plate 610, and C indicates that the conductive pattern 640 is visually recognized at a distance of 80 cm from the heat-generating plate 610. The light transmittance of the heat-generating plate 610 is indicated by B and C in the column of "light transmittance" in Table 2. B indicates that the light transmittance of the heat-generating plate 610 is equal to or more than 70%, and C indicates that the light transmittance of the heat-generating plate 610 is less than 70%.

From Table 2, it is found that excellent invisibility of the conductive pattern 640 and an excellent light transmittance of the heat-generating plate 610 can be both achieved in a case where the width W of the connection element 644 is equal to or more than 1 μm and equal to or less than 7 μm in Examples 4 to 9 in which the average distance $D_{ave}$ is equal to or more than 50 μm and equal to or less than 800 μm in comparison with Comparative Examples 3 to 5 in which the average distance $D_{ave}$ is equal to or more than 50 μm and equal to or less than 800 μm. Furthermore, it can be found that more excellent invisibility of the conductive pattern 640 and more excellent light transmittance of the heat-generating plate 610 can be both achieved in Examples 4 to 7 in which the average distance $D_{ave}$ is equal to or more than 50 μm and equal to or less than 150 μm in comparison with Examples 8 and 9.

[Table 2]

TABLE 2

| | EX-AMPLE 4 | EX-AMPLE 5 | EX-AMPLE 6 | EX-AMPLE 7 | EX-AMPLE 8 | EX-AMPLE 9 | COMPARATIVE EX-AMPLE 3 | COMPARATIVE EX-AMPLE 4 | COMPARATIVE EX-AMPLE 5 |
|---|---|---|---|---|---|---|---|---|---|
| $D_{ave}$ (μm) | 50 | 50 | 100 | 300 | 600 | 600 | 30 | 1000 | 1000 |
| W (μm) | 7 | 1 | 5 | 5 | 1 | 7 | 7 | 1 | 7 |
| INVISIBILITY | A | A | A | A | B | B | B | C | C |
| LIGHT TRANSMISSION RATE (%) | 71 | 86 | 81 | 84 | 89 | 86 | 53 | 90 | 88 |
| LIGHT TRANSMITTANCE | B | B | B | B | B | B | C | B | B |

The invention claimed is:

1. A heat-generating plate that generates heat when a voltage is applied, comprising:
   a pair of glasses;
   a pair of bus bars to which the voltage is applied; and
   a heat-generating conductor configured to couple between the pair of bus bars, wherein
   the heat-generating conductor includes a plurality of conductive thin wires that linearly extends between the pair of bus bars and couples between the pair of bus bars,
   at least one of said conductive thin wires has a substantially trapezoidal cross section,
   a width W of at least one of said conductive thin wires is different at each position along a normal direction of a sheet with the heat-generating conductor, and
   an average $Wa_ve$ of the width W of at least one of said conductive thin wires is within a range of the following formula(a) relative to a standard deviation δ of distribution of the width W:

$$0 \leq 4\delta/W_{ave} \leq 0.3 \quad \text{Formula(a)},$$

wherein at least one of said conductive thin wires includes a large curvature portion and a small curvature portion having a smaller curvature than a curvature of the large curvature portion, and
   the width W of the conductive thin wire is thin in the large curvature portion and thick in the small curvature portion.

* * * * *